US011019890B2

(12) United States Patent
Dobashi

(10) Patent No.: US 11,019,890 B2
(45) Date of Patent: Jun. 1, 2021

(54) DECORATIVE COMPONENT AND ARTICLE INCLUDING THE SAME

(71) Applicant: Crossfor Co., Ltd., Yamanashi (JP)

(72) Inventor: Hidetaka Dobashi, Yamanashi (JP)

(73) Assignee: Crossfor Co., Ltd., Yamanashi (JP)

( * ) Notice: Subject to any disclaimer, the term of this patent is extended or adjusted under 35 U.S.C. 154(b) by 6 days.

(21) Appl. No.: 16/474,685

(22) PCT Filed: Dec. 11, 2018

(86) PCT No.: PCT/JP2018/045554
§ 371 (c)(1),
(2) Date: Jun. 28, 2019

(87) PCT Pub. No.: WO2019/124168
PCT Pub. Date: Jun. 27, 2019

(65) Prior Publication Data
US 2020/0121041 A1 Apr. 23, 2020

(30) Foreign Application Priority Data
Dec. 19, 2017 (JP) .............................. JP2017-242773

(51) Int. Cl.
*B44C 5/00* (2006.01)
*A44C 17/02* (2006.01)
(Continued)

(52) U.S. Cl.
CPC ................ *A44C 17/02* (2013.01); *A45C 1/06* (2013.01); *A45C 3/06* (2013.01); *A45C 13/08* (2013.01);
(Continued)

(58) Field of Classification Search
CPC .......... A44C 17/02; A45C 13/08; G02C 11/02
See application file for complete search history.

(56) References Cited

U.S. PATENT DOCUMENTS

2003/0188550 A1 10/2003 Oki et al.
2009/0016175 A1\* 1/2009 Anderson .............. G04B 47/04
368/223
(Continued)

FOREIGN PATENT DOCUMENTS

CN 204763786 U 11/2015
EP 2 656 744 A1 10/2013
(Continued)

OTHER PUBLICATIONS

International Search Report dated Feb. 12, 2019, in connection with corresponding international Application No. PCT/JP2018/045554 (2 pgs.).
(Continued)

*Primary Examiner* — Seth Dumbris
*Assistant Examiner* — Kim S. Horger
(74) *Attorney, Agent, or Firm* — Maier & Maier, PLLC

(57) ABSTRACT

A decorative component includes: a frame fixed to an article; a body-to-be-suspended; and a suspending portion provided to the frame. The suspending portion suspends the body-to-be-suspended such that the body-to-be-suspended is swingable about an imaginary swing axis. The body-to-be-suspended and the suspending portion are held in contact with each other at two contact points located on the imaginary swing axis. The frame covers a part of a periphery of one of the two contact points in one of outer ranges, and covers a part of a periphery of another one of the two contact points in another one of the outer ranges, the parts being not covered with the article.

12 Claims, 33 Drawing Sheets

(51) Int. Cl.
  *A45C 1/06* (2006.01)
  *A45C 3/06* (2006.01)
  *A45C 13/08* (2006.01)
  *A63B 57/30* (2015.01)
  *A63H 3/02* (2006.01)
  *G02C 11/02* (2006.01)
  *G10G 7/00* (2006.01)

(52) U.S. Cl.
  CPC .............. *A63B 57/353* (2015.10); *A63H 3/02* (2013.01); *G02C 11/02* (2013.01); *G10G 7/00* (2013.01)

(56) References Cited

U.S. PATENT DOCUMENTS

| | | | |
|---|---|---|---|
| 2012/0151963 A1* | 6/2012 | Dobashi | A44C 17/0258 63/26 |
| 2015/0075220 A1* | 3/2015 | Dobashi | A44C 17/00 63/26 |
| 2016/0066662 A1* | 3/2016 | Rosenberg | B32B 15/20 428/13 |

FOREIGN PATENT DOCUMENTS

| | | | |
|---|---|---|---|
| EP | 3 446 589 A1 | 2/2019 | |
| JP | S60-103313 U | 7/1985 | |
| JP | H05-29413 U | 4/1993 | |
| JP | 2003-299513 A | 10/2003 | |
| JP | 2006-192054 A | 7/2006 | |
| JP | 3165917 U | 2/2011 | |
| JP | 3175111 U | 4/2012 | |
| JP | 2015-54162 A | 3/2015 | |
| JP | 2015-071025 A | 4/2015 | |
| JP | 2017-124052 A | 7/2017 | |
| WO | WO-2013011698 A1 * | 1/2013 | ......... A44C 17/0275 |

OTHER PUBLICATIONS

Written Opinion of the International Searching Authority dated Feb. 12, 2019, in connection with corresponding international Application No. PCT/JP2018/045554 (4 pgs.).

European Extended Search Report dated Nov. 30, 2020, in connection with corresponding EP Application No. 18890237.3; 11 pages.

* cited by examiner

DECORATIVE COMPONENT AND ARTICLE INCLUDING THE SAME

FIELD

The present disclosure relates to a decorative component that decorates various articles, and to an article that includes such a decorative component.

BACKGROUND

As examples of personal ornaments such as a pendant (necklace) and a pierced earring, there have been known ones in which a gemstone such as a diamond is held by a mount portion, and the gemstone and the mount portion are arranged to minutely swing. When the gemstone held by the mount portion minutely swings, the gemstone looks more sparkly than in being stationary. Thus, beauty of the gemstone can be further emphasized.

One of the examples of the personal ornaments in which the gemstone is arranged to be swingable is described in Japanese Patent Application Laid-open No. 2015-54162 (Patent Literature 1), in which a charm to be attached to a chain of a pendant is disclosed as an embodiment. Below, the charm of Patent Literature 1 is briefly described with reference to FIG. 32 and FIG. 33.

A charm 70 illustrated in FIG. 32 and FIG. 33 includes a mount portion 72 that fixes and holds a diamond 71 being the gemstone, and a frame portion 81 that supports the mount portion 72. The mount portion 72 includes a mount body portion 73 that holds the diamond (gemstone) 71, right-and-left arm portions 74 that extend from both right-and-left sides of the mount body portion 73 to an outside in a width direction, and right-and-left annular mount-side engaging ring portions 75 that are arranged at distal end portions of the arm portions 74. Further, a plurality of claw portions 76 for fixing the diamond 71 are provided to the mount body portion 73.

The right-and-left arm portions 74 and the right-and-left mount-side engaging ring portions 75 are arranged such that, in the side view of the charm 70, orientations of a front and a rear of each of the ring portions 75 are inclined with respect to a table surface of the diamond 71 that is held by the mount portion 72. In particular, in Patent Literature 1, the right-and-left arm portions 74 and the right-and-left mount-side engaging ring portions 75 are arranged such that the table surface of the diamond 71 that is held by the mount portion 72 is oriented obliquely upward when the front and the rear of each of the mount-side engaging ring portions 75 are parallel to a gravity direction (when a central opening portion of each of the mount-side engaging ring portions 75 is oriented in a horizontal direction).

Further, the mount portion 72 of Patent Literature 1 is formed such that, when the mount-side engaging ring portions 75 are supported by the frame portion 81 by being coupled to frame-side engaging ring portions 82 described below of the frame portion 81, in the side view of the charm 70, a position of a contact point where the mount-side engaging ring portion 75 is held in contact with the frame-side engaging ring portion 82 is arranged above a position of a center of gravity of the diamond 71 and the mount portion 72 as a whole in the gravity direction.

The frame portion 81 of Patent Literature 1 includes a frame body portion 83 that has an inverted V-shape in the front view, and the right-and-left frame-side engaging ring portions 82 that are provided on back surfaces of right-and-left lower end portions of the frame body portion 83. Further, a chain-link hole portion 84 for coupling a chain of a pendant is provided in a right-and-left direction (width direction of the charm 70) through an upper end portion of the frame body portion 83.

The right-and-left frame-side engaging ring portions 82 are formed integrally with the frame body portion 83 such that central opening portions of the frame-side engaging ring portions 82 are oriented in the right-and-left direction when the charm 70 is suspended from the chain. The right-and-left mount-side engaging ring portions 75 of the mount portion 72 are respectively coupled to and engaged with such right-and-left frame-side engaging ring portions 82. In this case, the frame-side engaging ring portion 82 and the mount-side engaging ring portions 75 are engaged with each other such that these ring portions pass through the central opening portions on mating sides each other, and that inner rim portions on the mating sides are held in contact with each other.

In such a charm 70 of Patent Literature 1, the mount portion 72 is held by the frame portion 81 in a manner that the inner rim portions of the right-and-left mount-side engaging ring portions 75 are held in contact with and hooked to the inner rim portions of the right-and-left frame-side engaging ring portions 82 of the frame portion 81. With this, for example, when the charm 70 is shifted or swung, the mount portion 72 and the diamond 71 held by the mount portion 72 can be minutely swung in a front-and-rear direction in a state of being suspended from the frame portion 81. When the diamond 71 minutely swings in this way, brilliance of the diamond 71 can be beautifully enhanced.

In particular, in the charm 70 of Patent Literature 1, the mount portion 72 is supported by the frame portion 81 such that the table surface of the diamond 71 is oriented obliquely upward when the pendant is formed. With this, on the chest of a user wearing the pendant, the brilliance of the diamond 71 can be more advantageously enhanced such that the table surface of the diamond 71 is likely to catch eyes of others.

Further, Patent Literature 1 describes that any one or both of the mount-side engaging ring portion 75 and the frame-side engaging ring portion 82 are formed to have a shape tapered toward an inner rim in cross-section orthogonal to its circumferential direction. With this, a contact area of the mount-side engaging ring portion 75 and the frame-side engaging ring portion 82 at the time when both the members are engaged with each other can be reduced. Thus, frictional resistance during the swing of the mount portion 72 can be reduced. As a result, a duration for which the diamond 71 swings can be prolonged.

[PTL 1] Japanese Patent Application Laid-open No. 2015-54162

SUMMARY

In the charm 70 described in Patent Literature 1, as described above, the mount portion 72 is supported by the frame portion 81 through intermediation of the mount-side engaging ring portions 75 and the frame-side engaging ring portions 82. With this, the diamond 71 held by the mount portion 72 can be minutely swung.

However, as for the charm 70 of Patent Literature 1, the mount-side engaging ring portions 75 of the mount portion 72 are each arranged in a bare state of being exposed in directions of a forward side (front side), a backward side (rear side), an upper side, a lower side, outer lateral sides in the width direction (right-and-left direction) of the charm 70. Further, the frame-side engaging ring portions 82 of the frame portion 81 are each arranged under a state in which a front surface (front) side of each of the frame-side engaging ring portions 82 is covered with the frame body portion 83, and in which a backward side (rear side), an upper side, a lower side, an outer lateral side in the width direction of the same are exposed.

Thus, when this charm 70 is used as a pendant by attaching the chain thereto, the mount-side engaging ring portions 75 and the frame-side engaging ring portions 82 are exposed to the outside, and hence may hit or collide against other objects (articles). As a result, the mount-side engaging ring portions 75 and the frame-side engaging ring portions 82 may locally receive unexpected load (external force), or may receive high load by being forcefully pressed by accident.

Meanwhile, in this charm 70, the structure that makes the diamond 71 swing through intermediation of the mount-side engaging ring portions 75 and the frame-side engaging ring portions 82 is formed delicately and in a small size, and hence has properties of being vulnerable to deformation. Thus, when the mount-side engaging ring portions 75 and the frame-side engaging ring portions 82 locally or forcefully receive the force (external force) from the outside as described above, the mount-side engaging ring portions 75 and the frame-side engaging ring portions 82 are liable to be deformed, for example, to warp. As a result, for example, a problem that the minute swinging movement of the diamond 71 as described above cannot be smoothly performed or cannot be performed any longer, and a problem that the mount portion 72 is disengaged from the frame portion 81 may be caused.

Further, when the mount-side engaging ring portions 75 and the frame-side engaging ring portions 82 of the charm 70 are exposed to the outside, it is conceivable that hair strands and threads of clothes, a scarf, or the like of the user may be entangled in these mount-side engaging ring portions 75 and frame-side engaging ring portions 82. Also when the mount-side engaging ring portions 75 and the frame-side engaging ring portions 82 with the threads and the like being entangled in this way are left as they are, the minute swinging movement of the diamond 71 may be hindered.

In addition, when the mount-side engaging ring portions 75 and the frame-side engaging ring portions 82 are arranged in the state of being exposed to the outside, there is a disadvantage that variations in design of the charm 70 are restricted.

Also when external appearances of various articles (such as sunglasses and a wristwatch) are decorated with the decorative component having the structure that makes a gemstone or the like swing, there are disadvantages similar to those in the case of the above-described personal ornament.

In view of such circumstances, the present disclosure has been made to achieve an object to provide a decorative component capable of preventing unnecessary external force from being applied to a mechanism that suspends and makes jewelry swing, and to provide an article including such a decorative component.

A first aspect of the present disclosure relates to a decorative component that decorates an external appearance of an article. This decorative component includes:
 a frame fixed to the article;
 a body-to-be-suspended including two first ring portions; and
 a suspending portion provided to the frame and including two second ring portions.

One of the two first ring portions and one of the two second ring portions are coupled to each other and held in contact with each other at one of two contact points, and
 another one of the two first ring portions and another one of the two second ring portions are coupled to each other and held in contact with each other at another one of the two contact points.

The suspending portion suspends the body-to-be-suspended such that the body-to-be-suspended is swingable about an imaginary swing axis.

The body-to-be-suspended and the suspending portion are held in contact with each other at the two contact points located on the imaginary swing axis.

Predetermined two planes that are located between the two contact points and that are perpendicular to the imaginary swing axis divide three ranges including two ranges which respectively include one of the two contact points and the other one of the two contact points and which are respectively defined as outer ranges.

The frame
 covers at least an entirety of a part of a periphery of the one of the two contact points as viewed from one of the outer ranges, the one of the two contact points being included in the one of the outer ranges, the part of the periphery of the one of the two contact points being not covered with the article, and
 covers at least an entirety of a part of a periphery of the other one of the two contact points as viewed from another one of the outer ranges, the other one of the two contact points being included in the other one of the outer ranges, the part of the periphery of the other one of the two contact points being not covered with the article.

In this decorative component according to the first aspect, the body-to-be-suspended suspended from the suspending portion enters the state of being swingable about the imaginary swing axis. In this swingable state, the body-to-be-suspended and the suspending portion are held in contact with each other at the two contact points located on the swing axis. In other words, the body-to-be-suspended enters the state of being swingable about the swing axis that extends through the contact point of the one of the first ring portions and the one of the second ring portions coupled to each other, and through the contact point of the other one of the first ring portions and the other one of the second ring portions coupled to each other. On the premise that the two predetermined planes are located between the two contact points and are perpendicular to the swing axis, of the three ranges divided by these two planes, the two ranges each including corresponding one of the contact points are defined as the outer ranges, respectively. The contact points included respectively in these two outer ranges are different from each other. In the one of the outer ranges, the part of the periphery of the one of the contact points, which is not covered with the article, is covered with the frame. In other words, in the one of the outer ranges, the article and the frame cover the periphery of the one of the contact points. With this, the one of the contact points is protected from an object that approaches from the one of the outer ranges. Thus, unnecessary external force is prevented from being applied to the one of the contact points. Further, in the other one of the outer ranges, the part of the periphery of the other one of the contact points, which is not covered with the article, is covered with the frame. In other words, in the other one of the outer ranges, the article and the frame cover the periphery of the other one of the contact points. With this, the other one of the contact points is protected from an object that approaches from the other one of the outer ranges. Thus, the unnecessary external force is prevented from being applied to the other one of the contact points.

Preferably, when one of directions perpendicular to the imaginary swing axis is defined as an upper-and-lower direction, when a direction parallel to the imaginary swing axis is defined as a lateral direction, and when a direction perpendicular to the upper-and-lower direction and the lateral direction is defined as a front-and-rear direction, the body-to-be-suspended may be visible at least from a front side in the front-and-rear direction, and the frame may cover an entirety of the body-to-be-suspended from a left-hand side and a right-hand side in the lateral direction.

With this, the body-to-be-suspended is visible at least from the front side in the front-and-rear direction, and at the same time, the body-to-be-suspended is protected from objects that approach from the left-hand side and the right-hand side in the lateral direction. Thus, the unnecessary external force is prevented from being applied to the body-to-be-suspended itself, and to the two contact points of the body-to-be-suspended and the suspending portion.

Preferably, the frame may cover the entirety of the body-to-be-suspended from an upper side and a lower side in the upper-and-lower direction.

With this, the body-to-be-suspended is protected from objects that approach from the upper side and the lower side in the upper-and-lower direction. Thus, the unnecessary external force is prevented from being applied to the body-to-be-suspended itself, and to the two contact points of the body-to-be-suspended and the suspending portion.

Preferably, in arbitrary planes that include the two second ring portions and that are perpendicular to the imaginary swing axis, the frame may cover entireties of parts of peripheries of the two second ring portions, the parts being not covered with the article.

With this, the second ring portions are protected from objects that approach in directions perpendicular to the swing axis. Thus, the unnecessary external force is prevented from being applied to the second ring portions.

Preferably, in arbitrary planes that include the two first ring portions and that are perpendicular to the imaginary swing axis, the frame may cover entireties of parts of peripheries of the two first ring portions, the parts being not covered with the article.

With this, the second ring portions are protected from the objects that approach in directions perpendicular to the swing axis. Thus, the unnecessary external force is prevented from being applied to the second ring portions themselves, and to the contact points of the first ring portions and the second ring portions.

Preferably, the two second ring portions may be provided to an inner surface of the frame that covers the two contact points.

In this way, support for the second ring portions by the frame, and the protection of the contact points by the frame can be performed with a simple structure.

Preferably, the frame may include a base portion fixed to the article, and an attachable/detachable portion that covers the two contact points and that is fixed in an attachable/detachable manner to the base portion, and the suspending portion may be provided to the base portion or the attachable/detachable portion.

With this, the attachable/detachable portion and the body-to-be-suspended can be replaced or repaired.

Preferably, the attachable/detachable portion may include an attachable/detachable-portion body that overall has a shape formed by bisecting a doughnut-shaped hollow body along a plane parallel to a radial direction, and a ring-shaped first coupling portion fixed to a rim of a circular cut surface of the plane of the attachable/detachable-portion body, the base portion may include a recess portion recessed in a columnar shape, and a ring-shaped second coupling portion formed along a rim of an opening portion of the recess portion, the attachable/detachable-portion body may include an opening portion that allows a part of the body-to-be-suspended to be exposed to an outside, and the ring-shaped first coupling portion and the ring-shaped second coupling portion may be coupled to each other with a screw structure.

With this, the attachable/detachable portion can be easily detached from the article. Thus, the suspending portion and the body-to-be-suspended can be easily replaced or repaired.

Preferably, the frame may include an opening portion that allows the part of the body-to-be-suspended to be exposed to the outside.

With this, the part of the body-to-be-suspended to swing is easily viewed in the opening portion.

Preferably, when one of directions perpendicular to the imaginary swing axis is defined as an upper-and-lower direction, when a direction parallel to the imaginary swing axis is defined as a lateral direction, and when a direction perpendicular to the upper-and-lower direction and the lateral direction is defined as a front-and-rear direction, the opening portion may allow the part of the body-to-be-suspended to be exposed forward, and a rim of the opening portion that allows the part of the body-to-be-suspended to be exposed forward may protrude backward on the inner surface side of the frame that covers the two contact points.

With this, as viewed from a forward side of the opening portion, the contact points of the body-to-be-suspended and the suspending portion are covered with the rim of the opening portion. Thus, the contact points are likely to be protected from an object that approaches from the forward side of the opening portion.

Preferably, the frame may include at least a transparent part, and at least a part of the body-to-be-suspended may be visible through the transparent part of the frame.

With this, without hindering the body-to-be-suspended from being viewed, a range in which the frame covers the body-to-be-suspended is easily expanded.

When the frame includes the transparent part, for example, the frame may cover an entirety of a part of the body-to-be-suspended, the part being not covered with the article.

With this, without hindering the body-to-be-suspended from being viewed, the body-to-be-suspended is protected from the objects that approach from the outside.

A second aspect of the present disclosure relates to an article including the decorative component according to the above-described first aspect.

Preferably, this article may be eyeglasses, a wristwatch,
a clock,
a stamp,
a bag,
a wallet,
stationery,
a key,
a smartphone,
a music box,
a toy,
a musical instrument, or
sports equipment.

According to the present disclosure, it is possible to provide the decorative component capable of preventing the unnecessary external force from being applied to the mechanism that suspends and makes the jewelry swing, and to provide the article including such a decorative component.

DETAILED DESCRIPTION

Below, several embodiments of the present invention are described with reference to the drawings. Note that, these embodiments of the present invention are not limited to embodiments described below, and encompass variations that have substantially the same configurations, exert similar functions, and provide similar advantages.

First Embodiment

Figure 1:
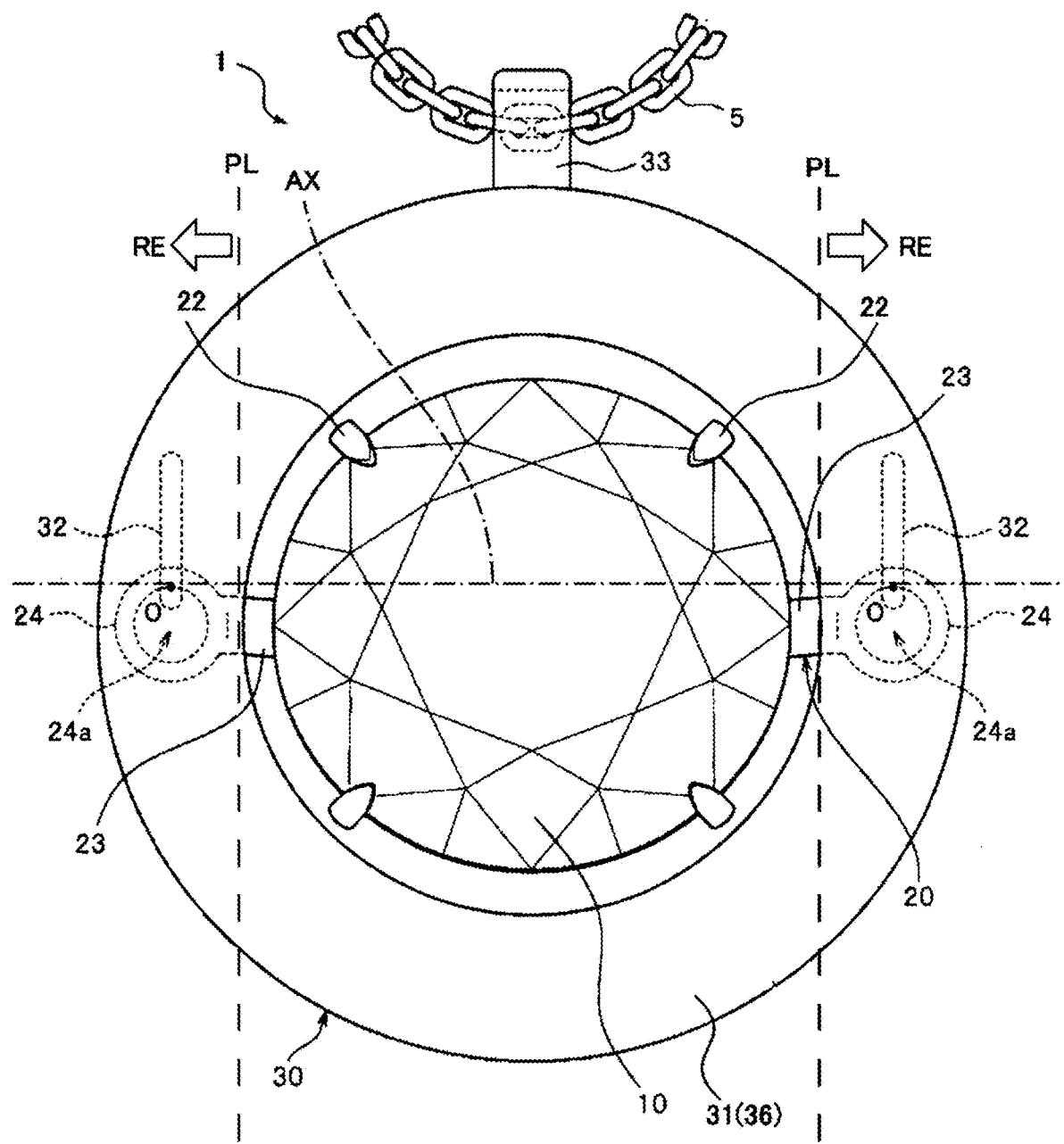
FIG. 1 is a front view illustrating an example of a charm according to a first embodiment.
Figure 2:
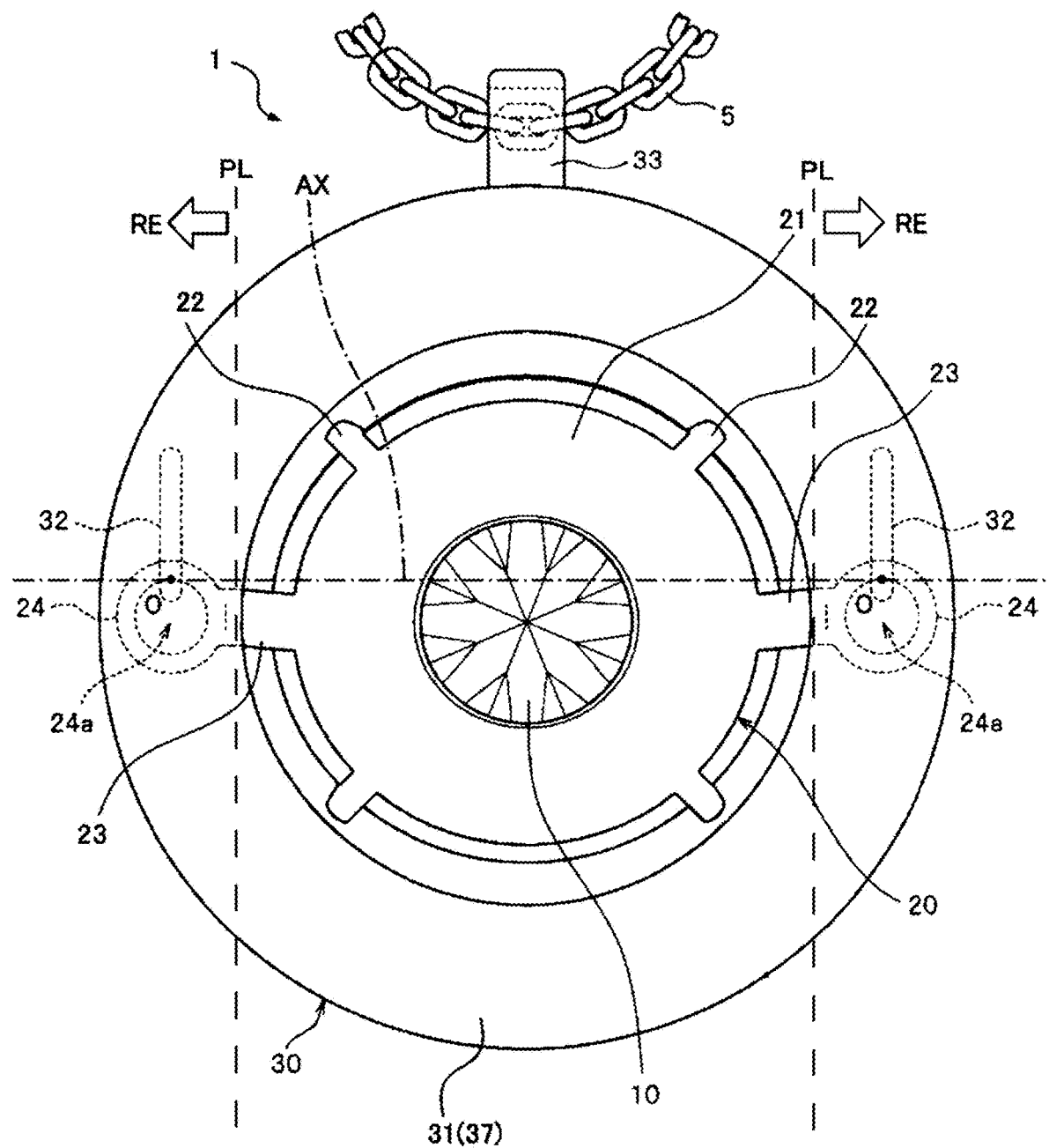
FIG. 2 is a rear view of the charm illustrated in FIG. 1.
Figure 3:
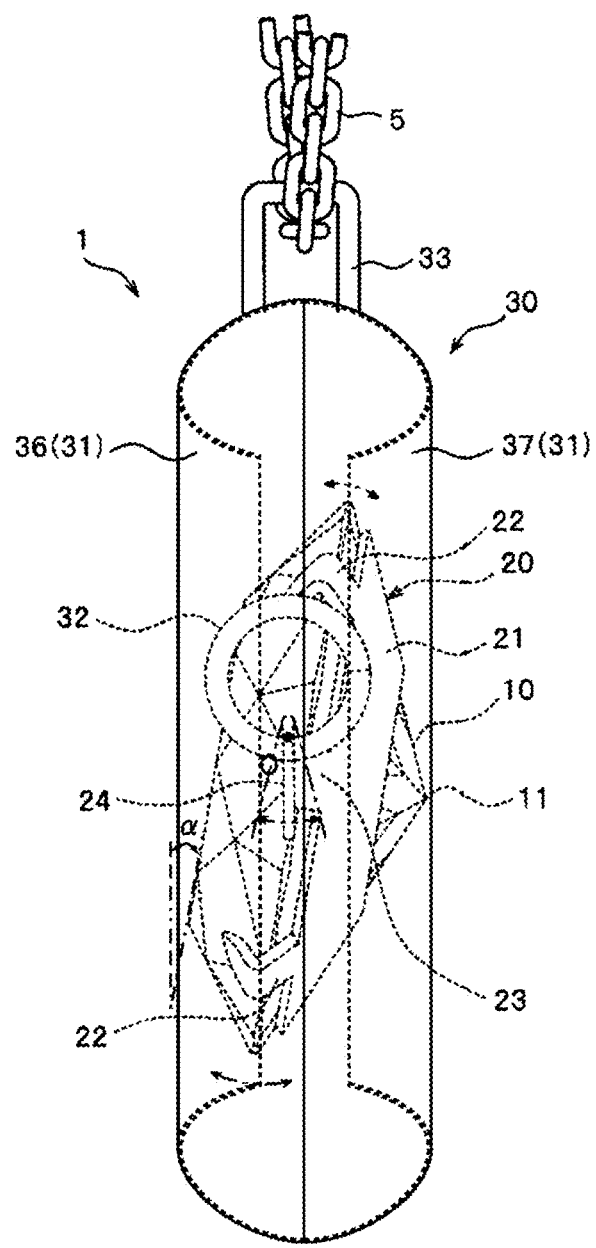
FIG. 3 is a side view of the charm illustrated in FIG. 1.

FIG. 1 is a front view illustrating an example of a charm according to a first embodiment. FIG. 2 and FIG. 3 are respectively a rear view and a side view of a charm 1 illustrated in FIG. 1. The charm 1 according to this embodiment is attached to string-like members such as a chain 5. With this, the pendant (or necklace) as a personal ornament is formed.

Note that, in the description of the charm hereinbelow, in order that relative positional relationships between components of the charm are indicated, three directions (upper-and-lower direction, lateral direction, and front-and-rear direction) are defined. The upper-and-lower direction refers to one of directions perpendicular to a swing axis AX described below, specifically, a direction same as an upper-and-lower direction of the drawing sheets of FIG. 1 and FIG. 2 illustrating the charm 1. The lateral direction refers to a direction parallel to the swing axis AX described below, specifically, a direction same as a lateral direction of the drawings sheets of FIG. 1 and FIG. 2 illustrating the charm 1. The front-and-rear direction refers to a direction perpendicular to the upper-and-lower direction and the lateral direction, specifically, a direction perpendicular to the drawing sheets of FIG. 1 and FIG. 2 illustrating the charm 1. Under a state in which the charm 1 is attached to the chain 5 of the pendant and picked up (that is, state illustrated in FIG. 1 and FIG. 2), the upper-and-lower direction is substantially parallel to a vertical direction, and the lateral direction is substantially parallel to a horizontal direction. A forward direction in the front-and-rear direction refers to a direction from a depth side toward a near side of the charm 1 illustrated in FIG. 1, and a backward direction in the front-and-rear direction refers to a direction from the near side toward the depth side of the charm 1 illustrated in FIG. 1.

As illustrated, for example, in FIG. 1 to FIG. 3, the charm 1 according to the first embodiment includes a frame portion 30 and a mount portion 20 that fixes and holds a gemstone 10 such as a diamond. The frame portion 30 includes a frame body portion 31, and two frame-side engaging ring portions 32 provided to the frame body portion 31. The mount portion 20 includes two mount-side engaging ring portions 24. As illustrated in FIG. 1 and FIG. 2, one of the mount-side engaging ring portions 24 and one of the frame-side engaging ring portions 32 are coupled to each other, and another one of the mount-side engaging ring portions 24 and another one of the frame-side engaging ring portions 32 are coupled to each other. The mount-side engaging ring portions 24 and the frame-side engaging ring portions 32 coupled to each other are held in contact with each other at contact points O.

Note that, in the charm 1 according to the first embodiment, the frame body portion 31 is also referred to as a "frame." A part including the gemstone 10 and the mount portion 20 is also referred to as a "body-to-be-suspended." A part including the two frame-side engaging ring portions 32 are also referred to as a "suspending portion." The mount-side engaging ring portions 24 are also referred to as "first ring portions." The frame-side engaging ring portions 32 are also referred to as "second ring portions."

As illustrated in FIG. 1 and FIG. 2, the suspending portion (two frame-side engaging ring portions 32) suspends the body-to-be-suspended (gemstone 10 and mount portion 20) such that the body-to-be-suspended is swingable about the imaginary swing axis AX. The suspending portion (two frame-side engaging ring portions 32) and the body-to-be-suspended (gemstone 10 and mount portion 20) are held in contact with each other at the two contact points O located on the swing axis AX.

In FIG. 1 and FIG. 2, "PL" represents planes perpendicular to the swing axis AX, and "RE" represents ranges (outer ranges) divided by the two planes PL. The two planes PL, which are planes defined with respect to the frame (frame body portion 31), are located between the two contact points O. Of three ranges divided by the two planes PL, two ranges each including corresponding one of the contact points O are outer ranges RE, respectively. The two outer ranges RE are separated from each other with the two planes PL being interposed therebetween.

As illustrated in FIG. 1 to FIG. 3, in one of the outer ranges RE, which includes one of the contact points O, the frame (frame body portion 31) covers a periphery of the one of the contact points O. Further, in another one of the outer ranges RE, which includes another one of the contact points O, the frame (frame body portion 31) covers a periphery of the other one of the contact points O.

Specifically, the frame (frame body portion 31) covers at least an entirety of the periphery of the one of the contact points O as viewed from the one of the outer ranges RE, the one of the contact points O being included in the one of the outer ranges RE. Further, the frame (frame body portion 31) covers at least an entirety of the periphery of the other one of the contact points as viewed from the other one of the outer ranges, the other one of the contact points O being included in the other one of the outer ranges RE.

In this way, in the charm 1 according to the first embodiment, the body-to-be-suspended (gemstone 10 and mount portion 20) suspended from the suspending portion (two frame-side engaging ring portions 32) enters a state of being swingable about the imaginary swing axis AX. In this swingable state, the body-to-be-suspended (gemstone 10 and mount portion 20) and the suspending portion (two frame-side engaging ring portions 32) are held in contact with each other at the two contact points O located on the swing axis AX. On a premise that the two planes PL include two predetermined planes PL located between the two contact points O and perpendicular to the swing axis AX, of three ranges divided by these two planes PL, two ranges each including corresponding one of the contact points O are defined as the outer ranges RE, respectively. The contact points O included respectively in these two outer ranges RE are different from each other. In the one of the outer ranges RE, which includes the one of the contact points O, the frame (frame body portion 31) covers the periphery of the one of the contact points O. With this, the one of the contact points O is protected from an object that approaches from the one of the outer ranges RE. Thus, unnecessary external force is prevented from being applied to the one of the contact points O. Further, in the other one of the outer ranges RE, which includes the other one of the contact points O, the frame (frame body portion 31) covers the periphery of the other one of the contact points O. With this, the other one of the contact points O is protected from an object that approaches from the other one of the outer ranges RE. Thus, the unnecessary external force is prevented from being applied to the other one of the contact points O. In other words, the charm 1 according to the first embodiment is capable of protecting the two contact points O respectively from the objects that approach from the two outer ranges RE, and of preventing the unnecessary external force from being applied to these contact points O.

Further, in the charm 1 according to the first embodiment, the body-to-be-suspended (gemstone 10 and mount portion 20) is visible at least from a front side in the front-and-rear direction, and the frame (frame body portion 31) covers an entirety of the body-to-be-suspended (gemstone 10 and mount portion 20) from a left-hand side and a right-hand side in the lateral direction.

With this, the body-to-be-suspended (gemstone 10 and mount portion 20) is visible at least from the front side in the front-and-rear direction, and at the same time, the body-to-be-suspended (gemstone 10 and mount portion 20) is protected from the objects that approach from the left-hand side and the right-hand side in the lateral direction. Thus, the unnecessary external force is prevented from being applied to the body-to-be-suspended (gemstone 10 and mount portion 20) itself, and to the two contact points O of the body-to-be-suspended (gemstone 10 and mount portion 20) and the suspending portion (two frame-side engaging ring portions 32).

Still further, in the charm 1 according to the first embodiment, the frame (frame body portion 31) covers the entirety of the body-to-be-suspended (gemstone 10 and mount portion 20) from an upper side and a lower side in the upper-and-lower direction.

With this, the body-to-be-suspended (gemstone 10 and mount portion 20) is protected from objects that approach from the upper side and the lower side in the upper-and-lower direction. Thus, the unnecessary external force is prevented from being applied to the body-to-be-suspended (gemstone 10 and mount portion 20) itself, and to the two contact points O of the body-to-be-suspended (gemstone 10 and mount portion 20) and the suspending portion (two frame-side engaging ring portions 32).

Yet further, in the charm 1 according to the first embodiment, in arbitrary planes that include the second ring portions (frame-side engaging ring portions 32) and that are perpendicular to the swing axis AX, the frame (frame body portion 31) covers entireties of peripheries of the second ring portions (frame-side engaging ring portions 32).

With this, the second ring portions (frame-side engaging ring portions 32) are protected from objects that approach in arbitrary directions perpendicular to the swing axis AX. Thus, the unnecessary external force is prevented from being applied to the second ring portions (frame-side engaging ring portions 32).

In addition, in the charm 1 according to the first embodiment, in arbitrary planes that include the first ring portions (mount-side engaging ring portions 24) and that are perpendicular to the swing axis AX, the frame (frame body portion 31) covers entireties of peripheries of the first ring portions (mount-side engaging ring portions 24).

With this, the first ring portions (mount-side engaging ring portions 24) are protected from the objects that approach in the arbitrary directions perpendicular to the swing axis AX. Thus, the unnecessary external force is prevented from being applied to the first ring portions (mount-side engaging ring portions 24) themselves, and to the contact points O of the first ring portions (mount-side engaging ring portions 24) and the second ring portions (frame-side engaging ring portions 32).

Next, the configuration of the charm 1 according to the first embodiment is more specifically described.

(Mount Portion 20)

Figure 4:
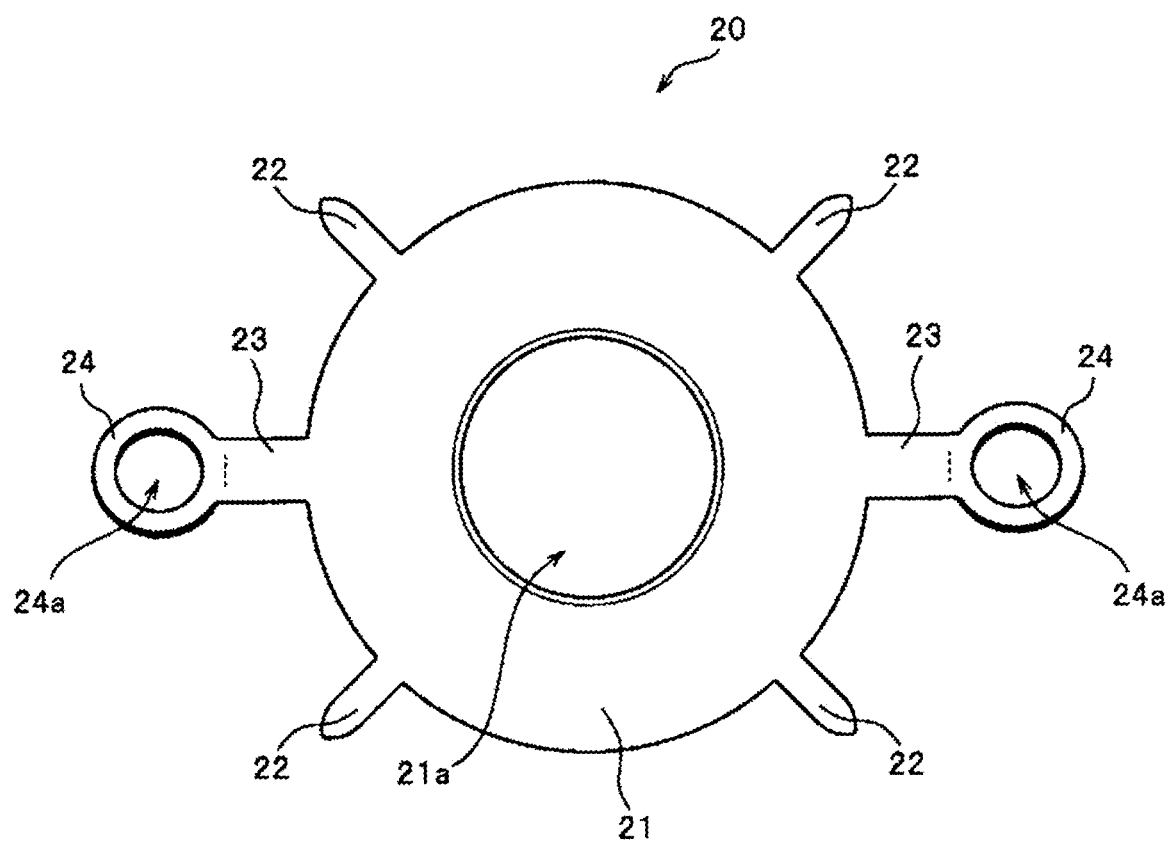
FIG. 4 is a schematic view in which a mount portion to be arranged in the charm is viewed from a rear (back surface) side of a side on which a gemstone is held, the mount portion being viewed under a state in which the gemstone is not held.

As illustrated in FIG. 4, the mount portion 20 includes amount body portion 21 on which the gemstone 10 is set, a plurality of claw portions 22 that are provided to protrude from the mount body portion 21 and fix the gemstone 10, right-and-left arm portions 23 that extend from right-and-left lateral rim portions (lateral end portions) of the mount body portion 21 to an outside in a width direction of the mount portion 20, and the right-and-left mount-side engaging ring portions 24 that are arranged at distal end portions of the right-and-left arm portions 23.

An entirety of the mount portion 20 is integrally formed as a single member, for example, by performing press working (punch press working) or the like on a sheet made of a precious metal such as gold, platinum, or silver. In this case, materials of and preparation methods for the mount portion 20 are not particularly limited. In addition, for example, shapes of the mount body portion 21 and the claw portions 22, and the number of the claw portions 22 to be arranged are not limited as well, and may be arbitrarily changed.

As illustrated in FIG. 4, a circular opening portion 21a is formed at a central portion of the mount body portion 21, and the gemstone 10 is fixed and held by the mount portion 20 with its culet portion 11 being protruded backward through the opening portion 21a of the mount body portion 21. The right-and-left arm portions 23 of the mount portion 20 are coupling parts that couple the mount body portion 21 and the right-and-left mount-side engaging ring portions 24 to each other. The right-and-left arm portions 23 have shapes right-left symmetrical with each other, extend to the outside in the lateral direction from the mount body portion 21, and are arranged with a forward inclination. Such right-and-left arm portions 23 are adjustable in coupling length in accordance, for example, with design of the charm 1, and, when necessary, the mount portion 20 may be formed without providing the right-and-left arm portions 23.

The right-and-left mount-side engaging ring portions 24 of the mount portion 20 are each formed into an annular shape, and circular central-opening portions 24a are provided at their central portions. The right-and-left mount-side engaging ring portions 24 are provided at positions corresponding to each other respectively on right-and-left lateral sides of the mount body portion 21 such that the gemstone 10 is arranged therebetween in the front view of the charm 1. In this embodiment, the right-and-left mount-side engaging ring portions 24 are formed integrally with the mount body portion 21 through intermediation of the right-and-left arm portions 23. Note that, in this embodiment, the right-and-left mount-side engaging ring portions 24 may be formed as members separate from the mount body portion 21, and may be connected thereto through intermediation of the right-and-left arm portions 23.

Figure 6:
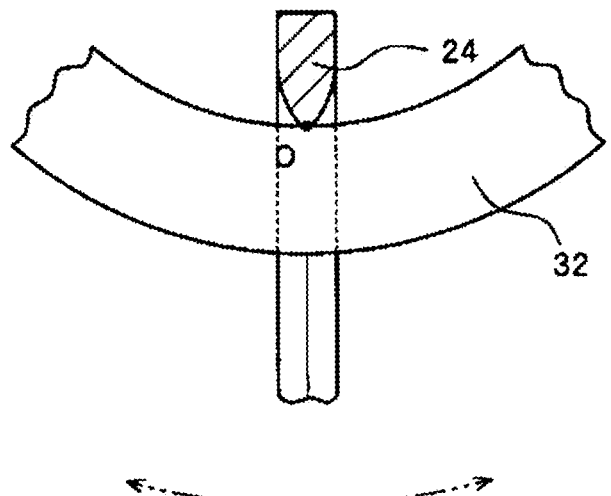
FIG. 6 is an explanatory view schematically illustrating a state in which a mount-side engaging ring portion of the mount portion is engaged with a frame-side engaging ring portion of the frame portion.

Such right-and-left annular mount-side engaging ring portions 24 and the frame-side engaging ring portions 32 described below of the frame portion 30 are engaged with each other such that these ring portions pass through central opening portions on mating sides each other, and that inner rim portions on the mating sides are held in contact with each other. Further, the mount-side engaging ring portions 24 are each formed into a modified cross-sectional shape other than the circular shape in cross-section orthogonal to a circumferential direction of the mount-side engaging ring portions 24. Specifically, as illustrated in FIG. 6, for example, the mount-side engaging ring portions 24 are each formed such that a distal end portion on an inner peripheral side of the mount-side engaging ring portion 24 is sharpened, more specifically, the mount-side engaging ring portions 24 are each formed into a tapered shape gradually narrowed toward the inner rim in the cross-section orthogonal to the circumferential direction.

With this, when the mount-side engaging ring portion 24 is coupled to the frame-side engaging ring portion 32 of the frame portion 30, a contact area of the mount-side engaging ring portion 24 at the contact point O where the mount-side engaging ring portion 24 and the frame-side engaging ring portion 32 intersect and are held in contact with each other can be reduced. As a result, when the mount portion 20 swings in the front-and-rear direction with respect to the frame portion 30, frictional resistance of the mount-side engaging ring portion 24 against the frame-side engaging ring portion 32 can be reduced. Thus, the mount portion 20 and the gemstone 10 can be swung minutely and smoothly with respect to the frame portion 30. Further, the swinging movement of the mount portion 20 and the gemstone 10 can be continued relatively long without interruption, and hence their swing duration can be prolonged. Note that, in this embodiment, the cross-sectional shape of the mount-side engaging ring portion 24 is not limited, and the mount-side engaging ring portion 24 may be formed into other shapes such as a circular shape in cross-section.

In the mount portion 20, orientations and the positions of the mount-side engaging ring portions 24 with respect to the mount portion 20 are set such that, when the gemstone 10 and the mount portion 20 are supported by the frame portion 30 through intermediation of the mount-side engaging ring portions 24 and the frame-side engaging ring portions 32, a table surface of the gemstone 10 is oriented obliquely upward, and that, in the side view of the charm 1, a position of the contact point O of the mount-side engaging ring portion 24 and the frame-side engaging ring portion 32 is arranged above a position of a center of gravity of the mount portion 20 and the gemstone 10 as a whole. At this time, the mount portion 20 is supported by the frame portion 30 in a posture that the central opening portions 24a of the mount-side engaging ring portions 24 are oriented in the front-and-rear direction.

Further, in this case, in the side view of the charm 1, the mount portion 20 is formed such that, for example, when the gemstone portion 10 is oriented to the front such that the table surface of the gemstone 10 is parallel to the upper-and-lower direction, in the side view of the charm 1, the position of the center of gravity of the mount portion 20 and the gemstone 10 as a whole is arranged on the rear side (backward side) with respect to the position of the contact point O of the mount-side engaging ring portion 24 and the frame-side engaging ring portion 32. Further, the right-and-left mount-side engaging ring portions 24 are formed such that the central opening portions 24a thereof are oriented obliquely downward when the gemstone 10 is oriented to the front such that the table surface thereof is parallel to the upper-and-lower direction. Note that, it is preferred that the mount portion 20 be formed such that the table surface of the gemstone 10 is inclined obliquely upward on the forward side under a state in which a posture of the frame portion 30 is maintained such that the upper-and-lower direction is parallel to the vertical direction (that is, state of the posture illustrated in FIG. 1 and FIG. 2). Specifically, the mount portion 20 is formed such that an inclination angle α of the table surface of the gemstone 10 with respect to the vertical direction is 5° or more and 45° or less, or preferably 10° or more and 20° or less.

(Frame Body Portion 31)

The frame portion 30 includes the frame body portion 31 that is arranged to surround the mount portion 20 and the gemstone 10 in the front view of the charm 1 and that is provided as a protective member, the right-and-left frame-side engaging ring portions 32 that are fixed to an inner surface of the frame body portion 31, and a chain link portion 33 (also referred to as "pendant bail") that is provided to protrude upward at an upper end portion of the frame body portion 31, and coupled to the chain 5 of the pendant. In this case, the chain link portion 33 is fixed to the frame body portion 31, for example, by brazing with laser or the like (welding).

In the front view of the charm 1, the frame body portion 31 has a doughnut shape which surrounds the mount portion 20 and the gemstone 10 as a whole from the outside. Specifically, in this doughnut shape, in order that the mount portion 20 and the gemstone 10 do not come into contact with the frame body portion 31 even when swinging, the frame body portion 31 is spaced apart from the gemstone 10 held by the mount portion 20 to the outside, whereby a gap is formed between the gemstone 10 and the frame body portion 31. In this case, the frame body portion 31 has the same doughnut-like front-back symmetrical shape whether being viewed from the front side or the rear side.

Further, in the side view of the charm 1, the frame body portion 31 has a thickness in the front-and-rear direction at which a back-surface-side distal end portion arranged on a rearmost side of the gemstone 10 (that is, culet portion 11) is located at a position on a front surface side with respect to a position of a back surface of the frame body portion 31. In other words, under the state illustrated in FIG. 3, the back surface of the frame body portion 31 is arranged at a position further on the back side with respect to the position of the culet portion 11 of the gemstone 10 in the front-and-back direction (front-and-rear direction) of the charm 1. With this, when the charm 1 is worn as described below (refer to FIG. 7), the gemstone 10 can be held stably at a position on the front surface side of the charm 1 away from clothes or the like. Thus, the minute swing of the gemstone 10 can be advantageously prevented from being hindered by contact with the clothes or the like.

Figure 5:
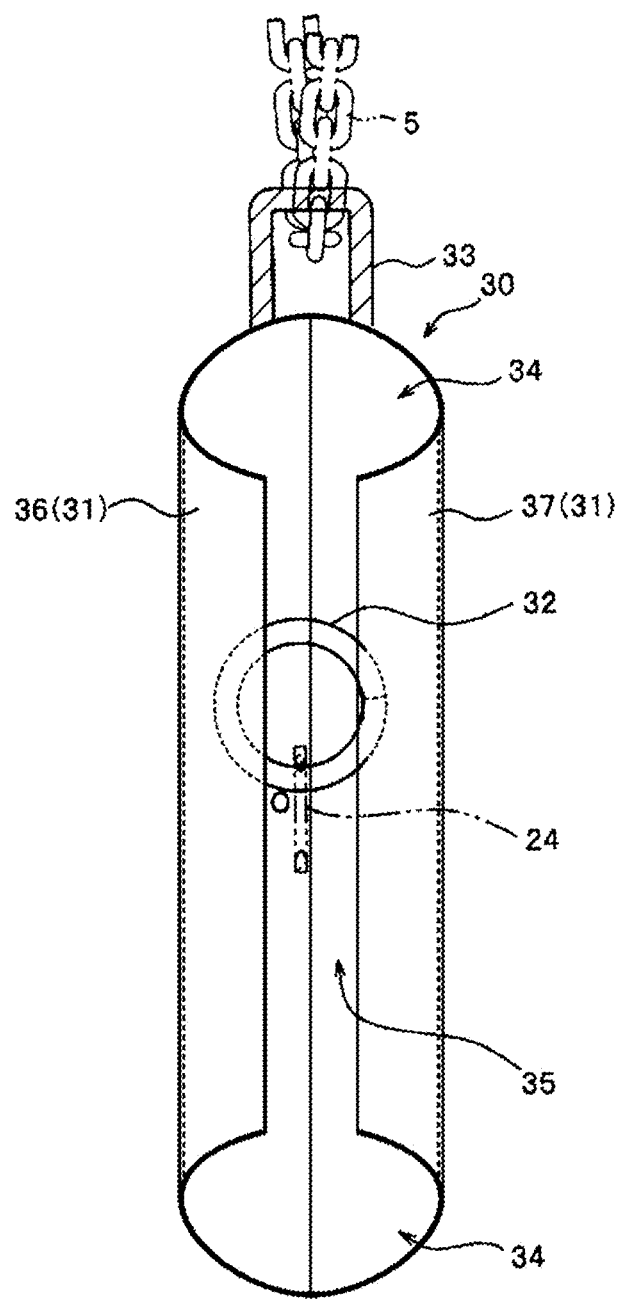
FIG. 5 is a cross-sectional view illustrating a frame portion (protective member) that is arranged in the charm.

Further, as illustrated, for example, in the cross-sectional view of FIG. 5 illustrating a central portion in the lateral direction of the frame body portion 31, which is taken along a plane orthogonal to the lateral direction, the frame body portion 31 is formed to have a predetermined thickness. With this, the frame body portion 31 secures an appropriate strength. Further, the frame body portion 31 has a hollow shape, that is, an interior space (housing compartment 34) is formed in the frame body portion 31.

This frame body portion 31 is not only a component that forms a part of the frame portion 30, but also the protective member that surrounds and protects the frame-side engaging ring portions 32 and the mount-side engaging ring portions 24 from the outside. In other words, the protective member that protects the frame-side engaging ring portions 32 and the mount-side engaging ring portions 24 is formed as the frame body portion 31 that supports the mount portion 20 and the gemstone 10.

In particular, in this case, the frame body portion 31 (protective member) is formed as a single member capable of protecting, at once, one of the frame-side engaging ring portions 32 and one of the mount-side engaging ring portions 24, which are coupled to each other on the left-hand side, and another one of the frame-side engaging ring portions 32 and another one of the mount-side engaging ring portions 24, which are coupled to each other on the right-hand side.

Thus, the housing compartment 34 being the interior space of the frame body portion 31 (protective member) has a size capable of housing the frame-side engaging ring portions 32 and the mount-side engaging ring portions 24 under the state in which the frame-side engaging ring portion 32 and the mount-side engaging ring portion 24 are engaged with each other on each of the right and left within the frame body portion 31. In this size, the frame-side engaging ring portions 32 and the mount-side engaging ring portions 24 do not interfere (not collide) even when the mount portion 20 and the gemstone 10 swing. In other words, the interior space of the frame body portion 31 (protective member) is formed as the housing compartment 34 that houses therein the frame-side engaging ring portion 32 and the mount-side engaging ring portion 24 in a pair on each of the right and left under the state in which the frame-side engaging ring portion 32 and the mount-side engaging ring portion 24 are engaged with each other.

Figure 8:
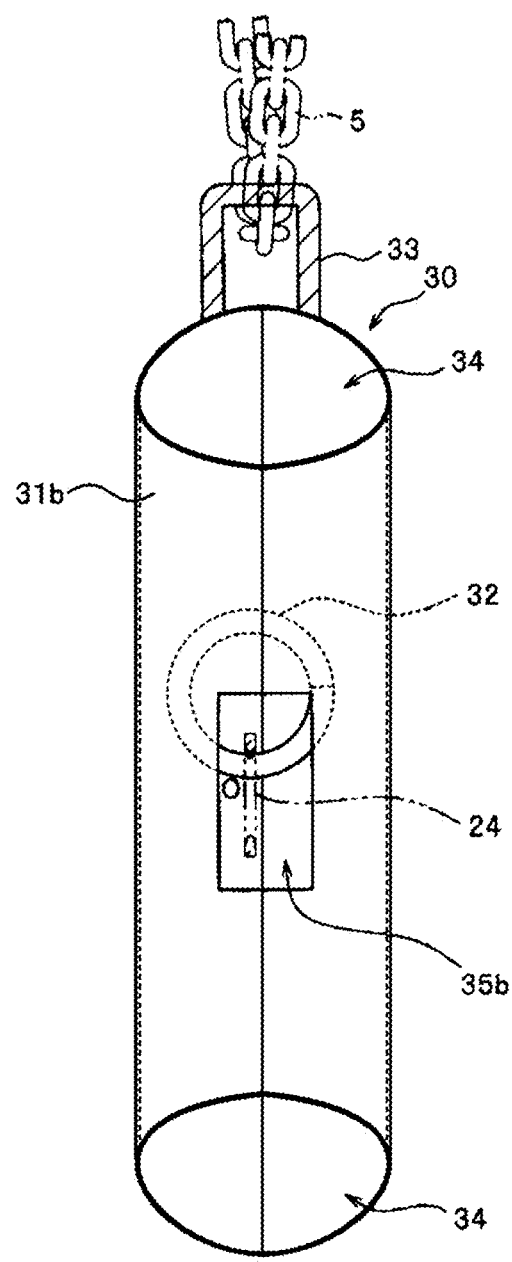
FIG. 8 is a cross-sectional view illustrating a frame portion (protective member) of a modification of the first embodiment.

Further, the frame body portion 31 has, uniformly over its entire circumference, a substantially C-shape elongated in the front-and-rear direction in cross-section orthogonal to its circumferential direction. An inner peripheral slot 35 opened toward the mount portion 20 and the gemstone 10 is formed along an inner rim portion of the frame body portion 31. This inner peripheral slot 35 is formed all over the circumferential direction (over entire circumference) of the ring-shaped frame body portion 31 along the inner rim portion of the frame body portion 31. Parts of the inner peripheral slot 35 of the frame body portion 31 serve as insertion opening portions that allow the right-and-left arm portions 23 of the mount portion 20 to be inserted therethrough. Further, the frame-side engaging ring portion 32 is held in contact with a curved part of the inner surface of the frame body portion 31, and is fixed thereto in this state. Note that, in this embodiment, for example, as in a modification of the frame body portion 31, which is illustrated in FIG. 8, inner peripheral slots 35b of a frame body portion 31b may be formed to open toward the mount portion 20 and the gemstone 10 only within predetermined ranges where the mount portion 20 and the gemstone 10 securely swing.

Further, although the inner peripheral slot 35 of the frame body portion 31 is provided such that a center position in the front-and-rear direction of the inner peripheral slot 35 matches a center position in the front-and-rear direction of the frame body portion 31, in this embodiment, the inner peripheral slot 35 may be provided such that the center position in the front-and-rear direction of the inner peripheral slot 35 is shifted forward or backward from the center position in the front-and-rear direction of the frame body portion 31.

In such a frame body portion 31 (protective member), the annular frame-side engaging ring portions 32 that are fixed to the inner surface of the frame body portion 31, and the mount-side engaging ring portions 24 are coupled to and engaged with these frame-side engaging ring portions 32. In this coupled state, these engaging ring portions 32 and 24 are arranged in the above-described housing compartment 34 of the frame body portion 31, thereby being housed in the frame body portion 31 (protective member). In this way, the frame body portion 31 (protective member) covers, from the outside, at least a front (front surface), a rear (back surface), an upper surface, a lower surface, and an outer lateral surface in the width direction (lateral direction) of each of the frame-side engaging ring portions 32, and at least a front (front surface), a rear (back surface), an upper surface, a lower surface, and an outer lateral surface in the width direction (lateral direction) of each of the mount-side engaging ring portions 24 in the coupled state. With this, the frame-side engaging ring portions 32 and the mount-side engaging ring portions 24 can be protected overall.

Further, the right-and-left arm portions 23 of the mount portion 20 are inserted through the inner peripheral slot 35 of the frame body portion 31, that is, the parts of the inner peripheral slot 35 are formed as the insertion opening portions for the arm portions 23. In this case, the inner peripheral slot 35 of the frame body portion 31 is formed to have a size (clearance) in which the right-and-left arm portions 23 are not liable to interfere (or do not interfere) even when the mount portion 20 and the gemstone 10 swing, for example, in an angular range of approximately 20° in the front-and-rear direction with respect to the frame portion 30 (specifically, even when mount portion 20 and gemstone 10 in the state of FIG. 3 swing in an angular range of approximately 10° forward and backward each) during normal use of the pendant.

Further, by the size of the inner peripheral slot 35 that is formed in the frame body portion 31, the swing range of the mount portion 20 and the gemstone 10 is restricted such that the mount portion 20 and the gemstone 10 properly swing at a predetermined angle with respect to the frame portion 30. In other words, when an amount of the swing of the mount portion 20 and the gemstone 10 exceeds a certain amount, the mount portion 20 and the gemstone 10 abut against the frame body portion 31 (front part 36 or rear part 37 described below), whereby the swing range of the mount portion 20 and the gemstone 10 is restricted. With this, the swing range of the mount portion 20 and the gemstone 10 can be kept within a range in which the charm 1 looks beautifully sparkly as viewed from the front. Thus, a decorative effect by the swing of the gemstone 10 can be more advantageously obtained.

Still further, the doughnut-shaped frame body portion 31 includes the front part 36 that protects the fronts of the frame-side engaging ring portions 32 and the fronts of the mount-side engaging ring portions 24, and the rear part 37 that protects the rears of the frame-side engaging ring portions 32 and the rears of the mount-side engaging ring portions 24. In this case, the front part 36 and the rear part 37 of the frame body portion 31 have the front-back symmetrical shape. Such a front part 36 and a rear part 37 are fixed to each other by brazing with laser or the like. Note that, in this embodiment, means for fixing the front part 36 and the rear part 37 to each other is not particularly limited.

Yet further, the front part 36 and the rear part 37 of the frame body portion 31 are prepared to have a thickness of, for example, 0.5 mm or less (preferably, 0.1 mm or less) by performing press working (punch press working) or the like on the sheet made of the precious metal such as gold, platinum, or silver.

By forming the hollow frame-body portion 31 with use of two components of the front part 36 and the rear part 37 in this way, the right-and-left mount-side engaging ring portions 24 are respectively joined to and engaged with the right-and-left frame-side engaging ring portions 32, and then the front part 36 and the rear part 37 can be fixed by being combined with each other in a manner that the right-and-left frame-side engaging ring portions 32 and the right-and-left mount-side engaging ring portions 24 coupled to each other are wrapped. In this way, the frame body portion 31 can be easily assembled, and the right-and-left frame-side engaging ring portions 32 and the right-and-left mount-side engaging ring portions 24 coupled to each other can be stably housed within the frame body portion 31 (protective member), specifically, within the above-described housing compartment 34 of the frame body portion 31.

In addition, since the front part 36 and the rear part 37 have the front-back symmetrical shapes, the same components having the uniform doughnut shape can be used as the front part 36 and the rear part 37. With this, the front part 36 and the rear part 37 can be prepared at low cost. In addition, the front part 36 and the rear part 37 are not confused with each other. Thus, the operation of combining and fixing the front part 36 and the rear part 37 to each other can be prevented from being complicated, and hence the operation can be efficiently performed.

Note that, shapes and materials of the front part 36 and the rear part 37 of the frame body portion 31 to serve as the protective member are not limited to the shapes and the materials exemplified in this embodiment, and may be arbitrarily changed as described, for example, in a second embodiment below.

(Frame-Side Engaging Ring Portion 32)

The right-and-left frame-side engaging ring portions 32 are each formed, for example, by cutting a metal linear member having a circular shape in cross-section into a predetermined length, and then by bending this cut linear member into a ring shape. Further, the frame-side engaging ring portions 32 before being coupled to the mount-side engaging ring portions 24 each have a jump-ring shape having a gap that allows the mount-side engaging ring portion 24 to be inserted thereinto.

Thus, when the mount-side engaging ring portion 24 is coupled to the frame-side engaging ring portion 32, before the front part 36 and the rear part 37 of the frame body portion 31 are fixed to each other, first, the mount-side engaging ring portion 24 is inserted into the gap of the jump-ring-like frame-side engaging ring portion 32 such that the frame-side engaging ring portion 32 is inserted through the central opening portion 24a of the mount-side engaging ring portion 24, and intersected with the mount-side engaging ring portion 24. Then, under the state in which the frame-side engaging ring portion 32 has been inserted through the central opening portion 24a of the mount-side engaging ring portion 24, both end portions of the frame-side engaging ring portion 32 are fitted and pressed to each other such that the gap is closed. In this way, the frame-side engaging ring portion 32 is plastically deformed (swaged) into the annular shape.

In this way, the right-and-left annular mount-side engaging ring portions 24 can be respectively and easily coupled to and engaged with the right-and-left frame-side engaging ring portions 32. At this time, the mount-side engaging ring portion 24 and the frame-side engaging ring portion 32 are joined to each other such that the inner rim portions are held in contact with each other. Further, after the frame-side engaging ring portion 32 is plastically deformed as described above, when necessary, the end portions of the frame-side engaging ring portion 32, which are fitted to each other, may be fixed to each other by brazing.

In addition, the frame-side engaging ring portion 32 is formed into the circular shape in cross-section orthogonal to its circumferential direction. In this embodiment, the cross-sectional shape of the frame-side engaging ring portion 32 is not particularly limited. There may be employed other shapes such as the tapered shape of the mount-side engaging ring portion 24.

Such right-and-left frame-side engaging ring portions 32 are fixed by brazing with laser or the like at predetermined positions on an inner surface (inner wall surface) of the front part 36 of the frame body portion 31 in the posture parallel to the upper-and-lower direction in the front view (FIG. 1) of the charm 1 such that central opening portions of the frame-side engaging ring portions 32 are oriented in the lateral direction. When the right-and-left frame-side engaging ring portions 32 are fixed to the front part 36 of the frame body portion 31, the mount portion 20 and the gemstone 10 can be held stably at a position closer to the front side of the charm 1. With this, the gemstone 10 can be made further eye-catching.

Note that, in this embodiment, means for fixing the frame-side engaging ring portions 32 to the frame body portion 31 is not limited, and fixing means other than brazing may be employed. Further, although the frame-side engaging ring portions 32 are fixed to the frame body portion 31 in the posture parallel to the upper-and-lower direction in the example illustrated in FIG. 1 and FIG. 2, in this embodiment, the orientation and the posture of the frame-side engaging ring portions 32 that are fixed to the frame body portion 31 are not particularly limited. For example, as illustrated in a front view of a charm 1c in FIG. 10, which is described below, frame-side engaging ring portions 32c in a posture inclined with respect to the upper-and-lower direction may be fixed to the frame body portion 31. In addition, the frame-side engaging ring portions 32 are formed as members separate from the frame body portion 31, and need not necessarily be fixed to the frame body portion 31 with use of the fixing means. As another example of this embodiment, the frame-side engaging ring portions 32 and the frame body portion 31 may be formed integrally with each other as a single member.

Further, in this embodiment, the right-and-left frame-side engaging ring portions 32 need not necessarily be fixed to the inner surface of the front part 36 of the frame body portion 31, and may be fixed to an inner surface of the rear part 37 of the same. In addition, a size of the frame-side engaging ring portions 32 may be increased such that the frame-side engaging ring portions 32 are fixed to the inner surfaces of both the front part 36 and the rear part 37. Alternatively, for example, protruding piece portions for fixing-position adjustment may be provided to the frame-side engaging ring portions 32 such that the fixing positions with respect to the front part 36 can be adjusted. Further, the operation of coupling the mount-side engaging ring portions 24 to the frame-side engaging ring portions 32 as described above may be performed after fixing the frame-side engaging ring portions 32 to the frame body portion 31 (before fixing the front part 36 and the rear part 37 to each other), or may be performed before the frame-side engaging ring portions 32 are fixed to the frame body portion 31.

SUMMARY

In the charm 1, which includes the frame portion 30 including the frame body portion 31 (protective member) as described above, and which includes the mount portion 20 holding the gemstone 10, the mount portion 20 is supported with respect to the frame portion 30 through intermediation of the mount-side engaging ring portions 24 and the frame-side engaging ring portions 32.

Figure 7:
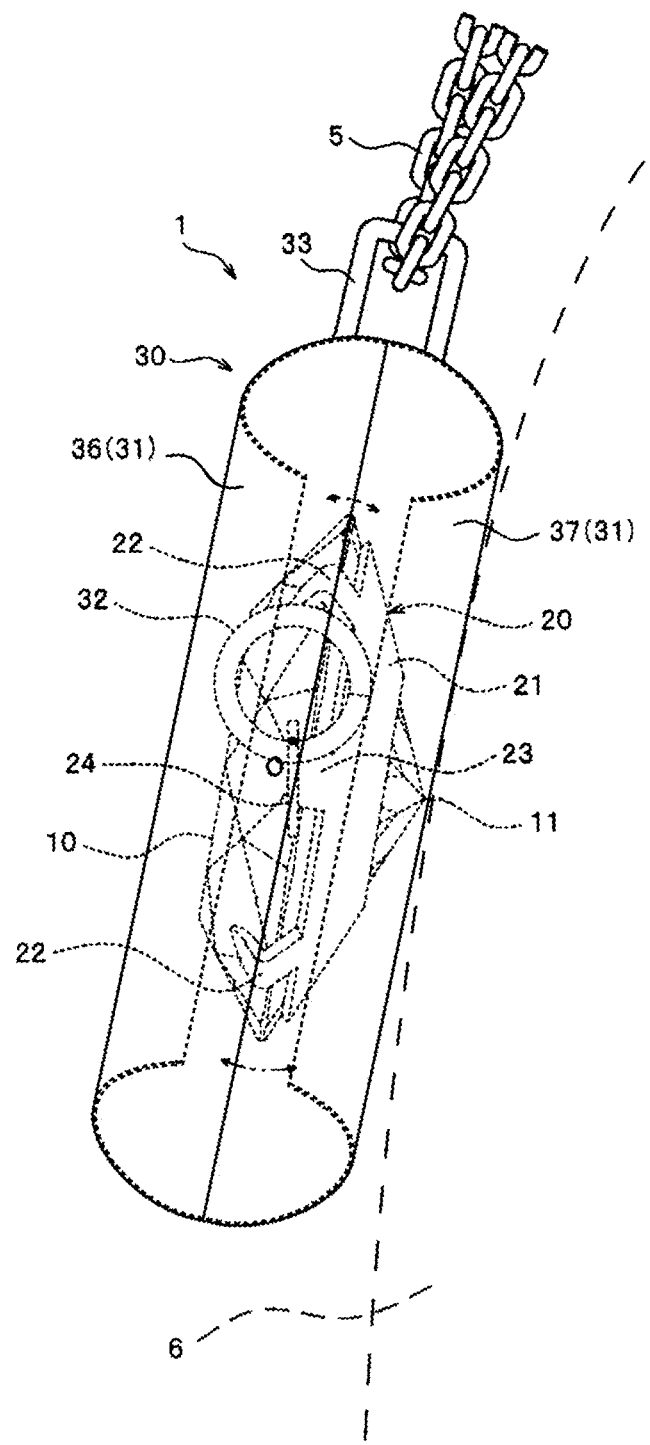
FIG. 7 is a schematic view schematically illustrating a state in which the charm illustrated in FIG. 1 is worn on the chest.

Thus, in a case where a user 6 wears the pendant including this charm 1 in a manner that the pendant is suspended from his/her neck as illustrated, for example, in FIG. 7, when the charm 1 is shifted or swung, the mount portion 20 and the gemstone 10 can be minutely and continuously swung in the front-and-rear direction in the state of being suspended from the frame portion 30. With this, brilliance of the gemstone 10 can be beautifully enhanced. In this case, in the side view of the charm 1, the mount portion 20 and the gemstone 10 minutely swing in the front-and-rear direction with respect to the position of the contact point O of the mount-side engaging ring portion 24 and the frame-side engaging ring portion 32. Further, when the mount portion 20 and the gemstone 10 swing, the position of the contact point O also may shift back and forth along the inner rim of the frame-side engaging ring portion 32.

In particular, in the front view of the charm 1, the mount portion 20 and the gemstone 10 swing substantially at a central portion of a circular central-opening portion that is formed in the frame portion 30. Thus, the frame portion 30, which has the simple doughnut shape, looks simple but beautiful. Further, the gemstone 10 looks floating in the air with respect to the frame portion 30, and the swing of the mount portion 20 and the gemstone 10 with respect to the frame portion 30 therearound can be advantageously emphasized. With this, the brilliance of the gemstone 10 fixed to the mount portion 20 can be more beautifully exhibited, and the charm 1 is enabled to give an unprecedented brand-new image (sense of beauty).

Further, during use of the pendant, the doughnut-shaped frame portion 30 prevents the mount portion 20 and the gemstone 10 from coming into direct contact with the clothes, a scarf, or the like that the user 6 wears. Thus, the state in which the mount portion 20 and the gemstone 10 are swingable is stably secured. In particular, as described above, the frame body portion 31 is formed to be thick in the front-and-rear direction such that the back surface arranged on a rearmost side of the frame body portion 31 is located further on the backward side (rear side) with respect to the culet portion 11 of the gemstone 10. With this, not only in the state illustrated in FIG. 3, but also in the state illustrated in FIG. 7, the culet portion 11 of the gemstone 10 does not protrude further to the backward side with respect to the back surface of the frame body portion 31. The gemstone 10 is held at a position away from the clothes, the scarf, or the like that the user 6 wears to the front surface side of the charm 1. Thus, when the mount portion 20 and the gemstone 10 swing within the swing range in the inner peripheral slot 35 of the frame body portion 31, the minute swing of the mount portion 20 and the gemstone 10 can be advantageously prevented from being hindered by the contact with the clothes, the scarf, or the like. With this, the swing of the mount portion 20 and the gemstone 10 can be stably continued.

Still further, not only when the frame body portion 31 is held along the vertical direction as illustrated, for example, in FIG. 3, but also when the frame body portion 31 is held with a slight inclination with respect to the vertical direction on the chest of the user 6 as illustrated, for example, in FIG. 7, the gemstone 10 and the mount portion 20 are supported by the frame portion 30 such that the table surface of the gemstone 10 is oriented obliquely upward. Thus, the charm 1 according to this embodiment is capable of more advantageously enhancing the brilliance of the gemstone 10 on the chest of the user 6 wearing the pendant such that the table surface of the gemstone 10 is likely to catch eyes of others.

Yet further, in the charm 1 according to this embodiment, the right-and-left frame-side engaging ring portions 32 and the right-and-left mount-side engaging ring portions 24 are formed delicately and in a small size, and hence have properties of being vulnerable to deformation. However, the entireties of the right-and-left frame-side engaging ring portions 32, and the entireties of the right-and-left mount-side engaging ring portions 24 are covered with the frame body portion 31 to serve as the protective member (in other words, entireties of the right-and-left frame-side engaging ring portions 32, and entireties of the right-and-left mount-side engaging ring portions 24 are protected by being housed in the housing compartment 34 of the frame body portion 31). With this, the mount-side engaging ring portions 24 and the frame-side engaging ring portions 32 are not exposed to the outside. Thus, during normal use of the pendant, the mount-side engaging ring portions 24 and the frame-side engaging ring portions 32 can be prevented from colliding directly against or being forcefully pressed by accident directly onto other objects.

In this way, in the charm 1 according to the first embodiment, the mount-side engaging ring portions 24 and the frame-side engaging ring portions 32 do not directly receive unexpected external force (load) from the outside. Thus, the mount-side engaging ring portions 24 and the frame-side engaging ring portions 32 can be advantageously prevented from being deformed or damaged by such external force. As a result, the state in which the gemstone 10 is minutely and smoothly swingable can be stably maintained for a long duration.

Further, by protecting the mount-side engaging ring portions 24 and the frame-side engaging ring portions 32 with the frame body portion 31 (protective member), it is also possible to prevent hair strands, threads, and the like from being entangled in the mount-side engaging ring portions 24 and the frame-side engaging ring portions 32. With this, handling properties of the pendant can be increased, and the minute swing of the gemstone 10 can be prevented from being hindered by the entanglement of the threads and the like.

In particular, the mount-side engaging ring portions 24 and the frame-side engaging ring portions 32 are covered with the frame body portion 31, and hence are invisible from the outside. Thus, for example, the frame-side engaging ring portions 32 may be further increased in diameter without degrading quality of an external appearance of the charm 1. With this, for example, a bonding strength of the frame-side engaging ring portions 32 with respect to the frame body portion 31 can be increased, and durability of the charm 1 can be increased.

In addition, the protective member that covers the mount-side engaging ring portions 24 and the frame-side engaging ring portions 32 is formed as the precious-metal frame body portion 31 of the frame portion 30. With this, despite provision of an additional member for protecting the ring portions, which is not provided to related-art charms, a feel of an entirety of the charm 1 is enhanced. As a result, the quality of the external appearance can be enhanced. Further, the frame body portion 31 to serve as the protective member is formed to be thin and into the hollow shape as described above. Thus, an amount of a raw material to be used for the frame body portion 31 can be reduced. As a result, manufacturing cost of the frame portion 30 can be significantly reduced. Specifically, manufacturing cost of the frame body portion 31 can be reduced to half or less than that in a case where the frame body portion is formed to be solid.

Further, since the mount-side engaging ring portions 24 and the frame-side engaging ring portions 32 are covered with the frame body portion 31 (protective member), influence of the provision of the mount-side engaging ring portions 24 and the frame-side engaging ring portions 32 on design of the charm 1 is reduced. Thus, a degree of freedom in design can be increased. Further, the frame body portion 31 (protective member) itself may be variously designed.

Figure 9:
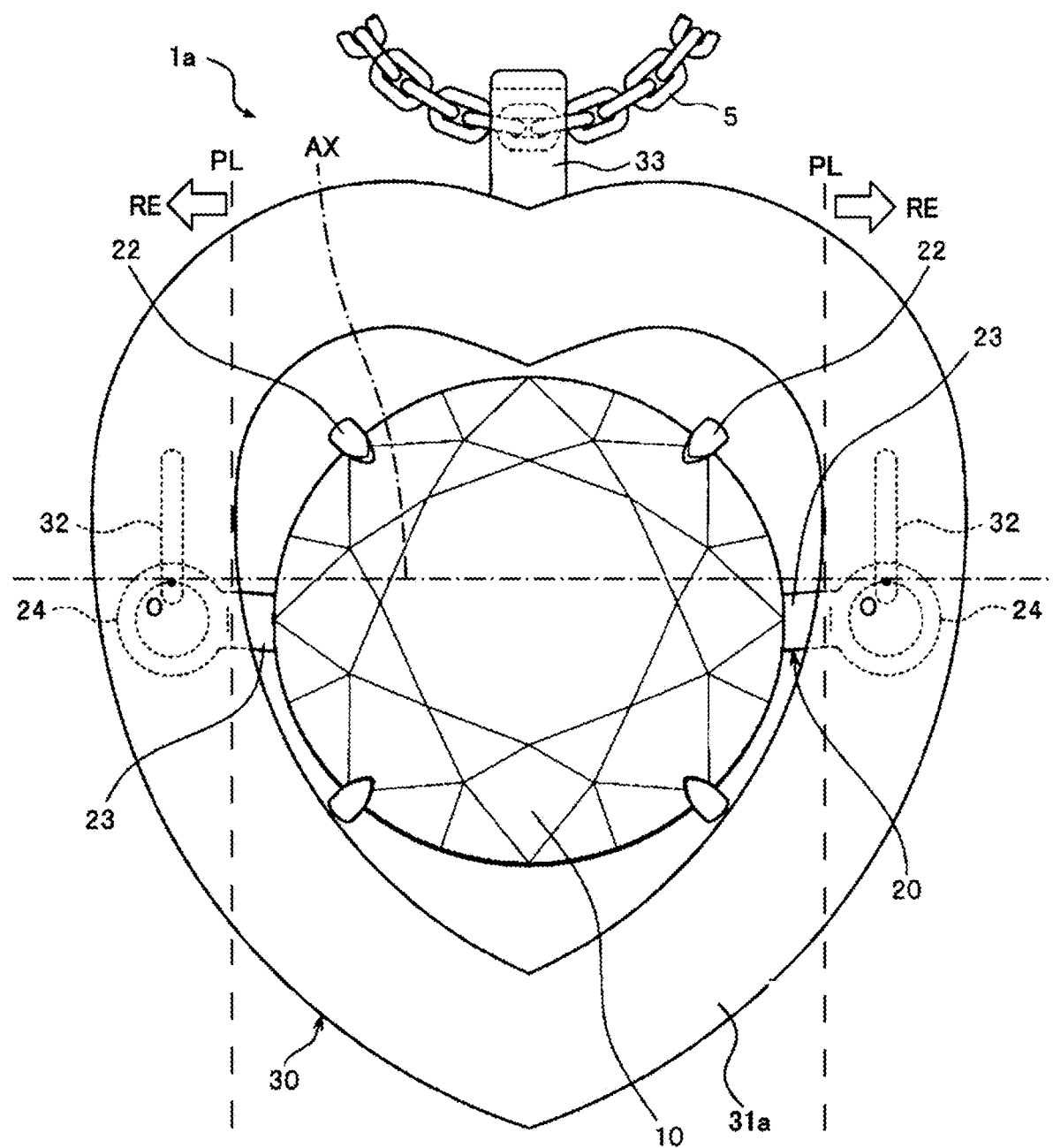
FIG. 9 is a front view illustrating another modification of the first embodiment.

Thus, for example, as in a charm 1a according to another modification exemplified in FIG. 9, in which the shape of the frame body portion (protective member) is changed, a shape of a frame body portion 31a (protective member) may be formed into arbitrary shapes including a shape of a frame such as a heart-shaped frame, shapes of other frames such as a rhombic frame, or shapes like flowers or animals. In this case, for example, a size and the thickness of the frame body portion (protective member), and the size of the frame-side engaging ring portions may be arbitrarily changed.

As a result, the charm is enabled to give, for example, a charming impression or a sophisticated impression, whereby value to be added to the pendant can be further enhanced. Note that, in the charm 1a illustrated in FIG. 9, shapes of portions other than the frame body portion 31a (protective member) are formed similar to those in the above-described charm 1 illustrated in FIG. 1 to FIG. 8. Thus, in FIG. 9 and FIG. 10 according to still another modification described below, parts or members having the same configurations as those in the above description are denoted by the same reference symbols.

Note that, in the example of the above-described charm, the entireties of the right-and-left frame-side engaging ring portions 32 of the frame portion 30, and the entireties of the right-and-left mount-side engaging ring portions 24 of the mount portion 20 are covered with the frame body portion 31 to serve as the protective member. However, in this embodiment, it is only necessary that at least the entireties of the right-and-left frame-side engaging ring portions 32 of the frame portion 30, and coupling parts of the right-and-left mount-side engaging ring portions 24 with respect to the frame-side engaging ring portions 32 are protected by the frame body portion 31.

Figure 10:
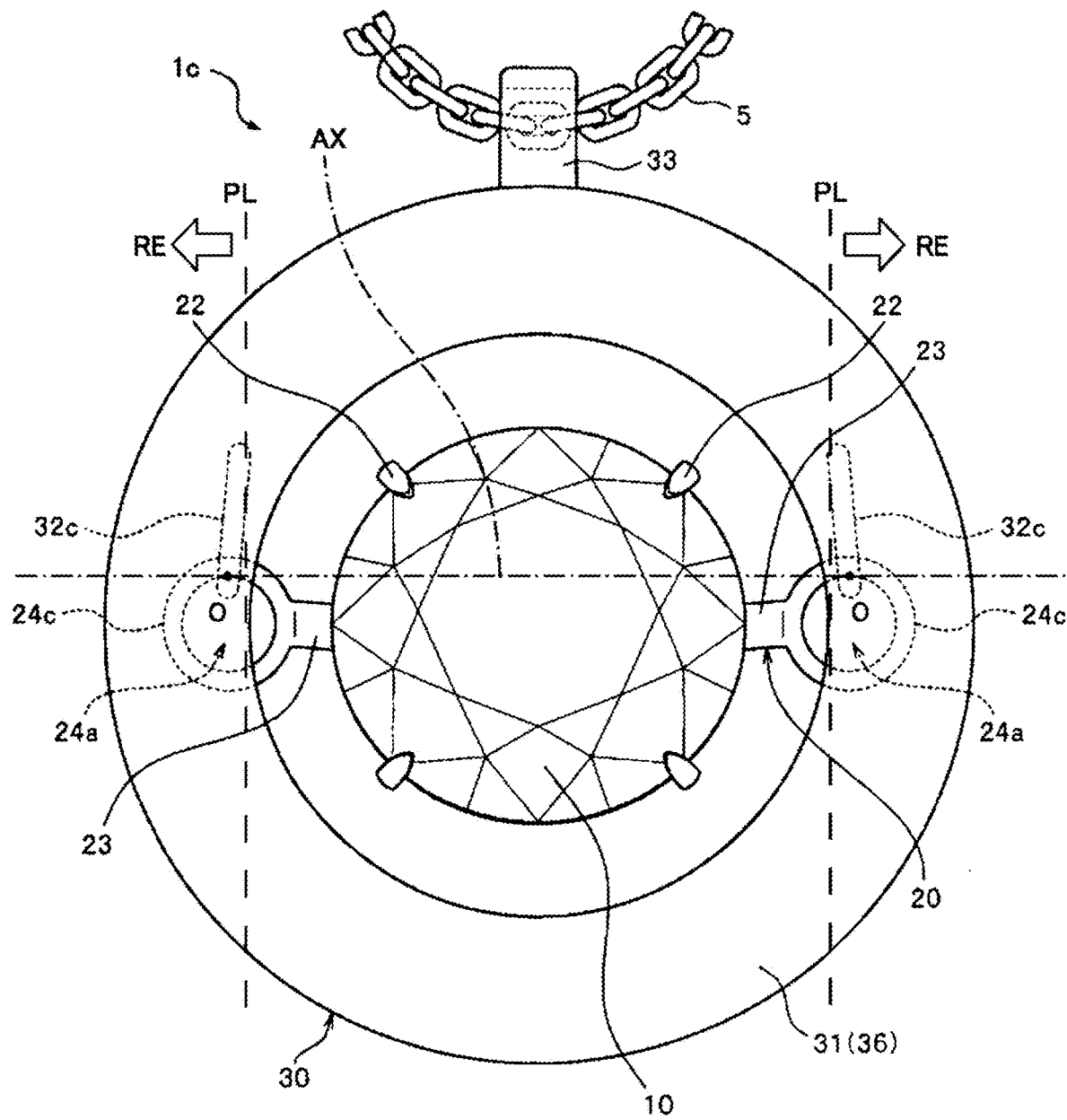
FIG. 10 is a front view illustrating still another modification of the first embodiment.

For example, in the charm 1c of the still other modification illustrated in FIG. 10, right-and-left mount-side engaging ring portions 24c are formed to be larger than the counterparts of the charm 1 illustrated in FIG. 1 and FIG. 2, and ring parts out of coupling parts of the right-and-left mount-side engaging ring portions 24c with respect to the frame-side engaging ring portions 32c are partially exposed. Further, at the same time, entireties of the frame-side engaging ring portions 32c and at least the coupling parts of the mount-side engaging ring portions 24c are covered with the frame body portion 31.

Also in such a charm 1c according to the still other modification, the mount-side engaging ring portions 24c and the frame-side engaging ring portions 32c can be prevented from being deformed or damaged by the unexpected external force (load) from the outside, and the state in which the gemstone 10 is minutely swingable can be stably maintained for along duration. Further, hair strands, threads, and the like are prevented from being entangled in the mount-side engaging ring portions 24c and the frame-side engaging ring portions 32c.

Second Embodiment

Figure 11:
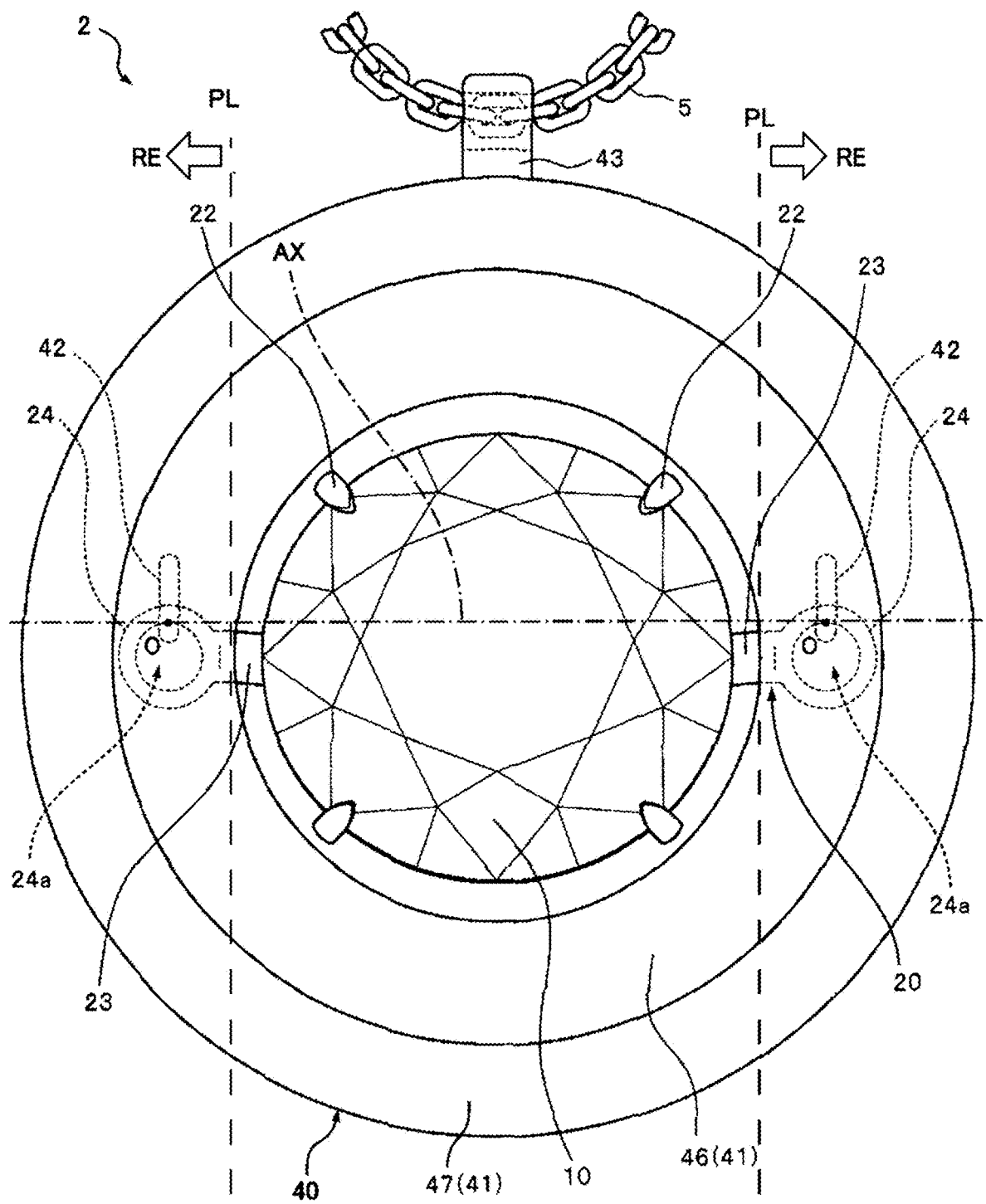
FIG. 11 is a front view illustrating an example of a charm according to a second embodiment.
Figure 12:
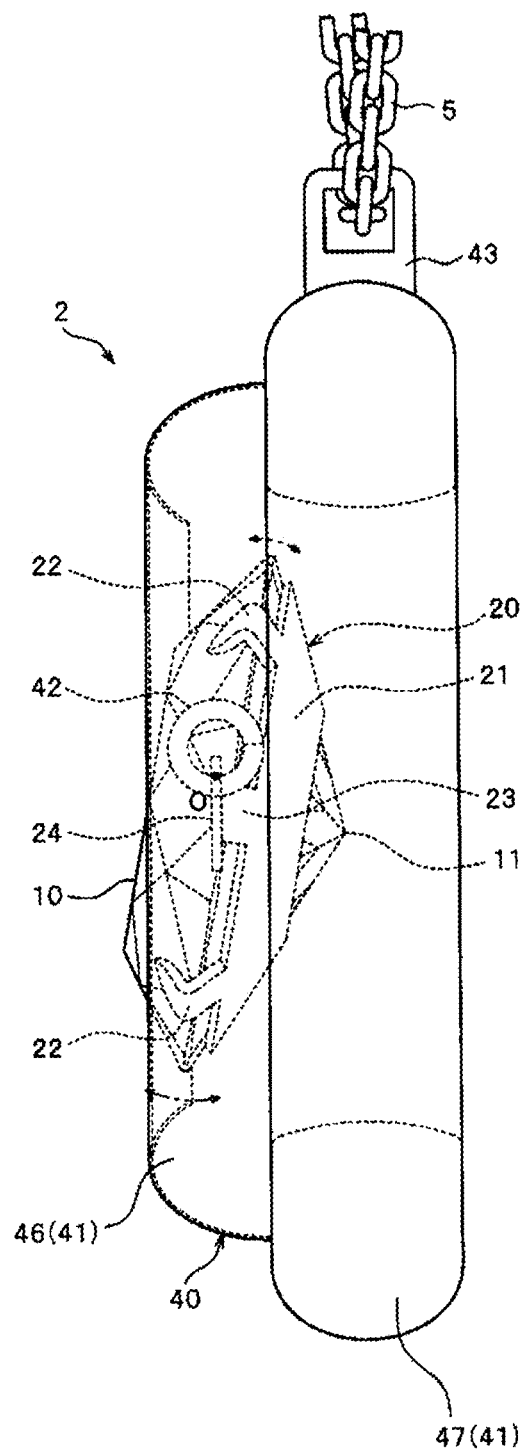
FIG. 12 is a side view of the charm illustrated in FIG. 11.

FIG. 11 is a front view illustrating an example of a charm according to the second embodiment. FIG. 12 is a side view of a charm 2 illustrated in FIG. 11. As in the first embodiment, the charm 2 according to the second embodiment also forms the pendant (or necklace) as a personal ornament.

Similar to the three directions with respect to the charm 1 illustrated in FIG. 1, three directions (upper-and-lower direction, lateral direction, and front-and-rear direction) defined with respect to the charm 2 illustrated in FIG. 11 correspond to an upper-and-lower direction, a lateral direction, and a front-and-rear direction (front-and-back direction) of the drawing sheet of FIG. 11.

As illustrated, for example, in FIG. 11 and FIG. 12, the charm 2 according to the second embodiment includes a frame portion 40 and the mount portion 20 that fixes and holds the gemstone 10 such as a diamond. The frame portion 40 includes a frame body portion 41, and two frame-side engaging ring portions 42 provided to the frame body portion 41. The mount portion 20 includes the two mount-side engaging ring portions 24. As illustrated in FIG. 11, one of the mount-side engaging ring portions 24 and one of the frame-side engaging ring portions 42 are coupled to each other, and another one of the mount-side engaging ring portions 24 and another one of the frame-side engaging ring portions 42 are coupled to each other. The mount-side engaging ring portions 24 and the frame-side engaging ring portions 42 coupled to each other are held in contact with each other at the contact points O.

Note that, the charm 2 according to the second embodiment is different from the above-described charm 1 according to the first embodiment, for example, in shape of the frame portion 40, but the mount portion 20 and the gemstone 10 are formed similar to those of the above-described charm 1 according to the first embodiment. Thus, in description and drawings relating to the charm according to the second embodiment, parts or members having substantially the same configurations as those of the charm 1 of the above-described first embodiment are denoted by the same reference symbols, and detailed description thereof is omitted. The same applies to a third embodiment to an eighth embodiment described below.

In the charm 2 according to the second embodiment, the frame body portion 41 is also referred to as the "frame." The part including the gemstone 10 and the mount portion 20 is also referred to as the "body-to-be-suspended." A part including the two frame-side engaging ring portions 42 are also referred to as the "suspending portion." The mount-side engaging ring portions 24 are also referred to as the "first ring portions." The frame-side engaging ring portions 42 are also referred to as the "second ring portions."

Schematic configurations of the "frame," the body-to-be-suspended," and the "suspending portion" of the charm 2 according to the second embodiment are similar to those of the charms (1, 1a, and 1c) according to the above-described first embodiment. Thus, the charm 2 according to the second embodiment is also capable of protecting the two contact points O respectively from the objects that approach from the two outer ranges RE, and of preventing the unnecessary external force from being applied to these contact points O.

Further, in the charm 2 according to the second embodiment, in the arbitrary planes that include the second ring portions (frame-side engaging ring portions 42) and that are perpendicular to the swing axis AX, the frame (frame body portion 41) covers the peripheries of the second ring portions (frame-side engaging ring portions 32). With this, the second ring portions (frame-side engaging ring portions 42) are protected from the objects that approach in the arbitrary directions perpendicular to the swing axis AX. Thus, the unnecessary external force is prevented from being applied to the second ring portions (frame-side engaging ring portions 42).

In addition, in the charm 2 according to the second embodiment, in the arbitrary planes that include the first ring portions (mount-side engaging ring portions 24) and that are perpendicular to the swing axis AX, the frame (frame body portion 41) covers the peripheries of the first ring portions (mount-side engaging ring portions 24). With this, the first ring portions (mount-side engaging ring portions 24) are protected from the objects that approach in the arbitrary directions perpendicular to the swing axis AX. Thus, the unnecessary external force is prevented from being applied to the first ring portions (mount-side engaging ring portions 24) themselves, and to the contact points O of the first ring portions (mount-side engaging ring portions 24) and the second ring portions (frame-side engaging ring portions 42).

Next, the configuration of the charm 2 according to the second embodiment is more specifically described.

In FIG. 11 being the front view illustrating the charm 2, the frame portion 40 includes the frame body portion 41 that is arranged to surround the mount portion 20 and the gemstone 10 and is provided as the protective member, the right-and-left frame-side engaging ring portions 42 that are fixed to an inner surface of the frame body portion 41, and a chain link portion 43 that is provided to protrude upward at an upper end portion of the frame body portion 41.

The chain link portion 43 is attached to the frame body portion 41 by forming a small attachment hole (not shown) in the frame body portion 41 (specifically, rear part 47 of the frame body portion 41), and inserting and fixing a fastener (not shown) of the chain link portion 43 into this attachment hole. Note that, in this embodiment, methods of and means for attaching the chain link portion 43 to the frame body portion 41 are not particularly limited.

In FIG. 11 being the front view of the charm 2, the frame body portion 41 has a doughnut shape which surrounds the mount portion 20 and the gemstone 10 as a whole from the outside. Specifically, in this doughnut shape, in order that that the mount portion 20 and the gemstone 10 do not come into contact with the frame body portion 41 even when swinging, the frame body portion 41 is spaced apart from the mount portion 20 and the gemstone 10 to the outside, whereby the gap is formed between the gemstone 10 and the frame body portion 41.

This frame body portion 41 includes a front part 46 that protects fronts of the frame-side engaging ring portions 42 and the fronts of the mount-side engaging ring portions 24, and the rear part 47 that protects rears of the frame-side engaging ring portions 42 and the rears of the mount-side engaging ring portions 24. In this case, the front part 46 of the frame body portion 41 has substantially the same shape as that of the front part 36 of the frame body portion 31 of the charm according to the above-described first embodiment, and is formed to be smaller in size overall than the front part 36. Further, the right-and-left frame-side engaging ring portions 42 are each formed into a ring shape smaller in size than the frame-side engaging ring portion 32 of the charm according to the above-described first embodiment.

Unlike the above-described first embodiment, the rear part 47 does not have a front-back symmetrical shape with respect to the front part 46, and is formed of a ceramic member having a doughnut shape. Thus, a circular central-opening portion is formed in the front-and-rear direction through a central part in the front view of the rear part 47.

In this case, in the front view of the frame body portion 41, a size of an inner diameter of the rear part 47 (size of a diameter of the central opening portion of the rear part 47) is set smaller than a size of an outer diameter of the front part 46, and set to a size that allows the rear sides of the mount-side engaging ring portions 24 and the frame-side engaging ring portions 42 to be protected. Such a rear part 47 is fixed to the front part 46 by brazing with laser or the like, or by other bonding means.

Note that, in this embodiment, the shapes of the front part 46 and the rear part 47 may be arbitrarily changed. For example, as a modification of the rear part 47, there may be used a ceramic member without the circular central-opening portion. In this case, a back-wall portion that is arranged to close the central opening portion at a position that corresponds to a rear-side end portion of the rear part and where the mount portion 20 and the gemstone 10 to swing back and forth are not interfered with is formed integrally with the rear part according to this modification.

The frame body portion 41 has a hollow shape in which an interior space capable of housing the frame-side engaging ring portions 42 and the mount-side engaging ring portions 24 under the state in which the frame-side engaging ring portion 42 and the mount-side engaging ring portion 24 are engaged with each other on each of the right and left is formed between the front part 46 and the rear part 47. Thus, this frame body portion 41 is not only a component that forms a part of the frame portion 40, but also the protective member that surrounds and protects the frame-side engaging ring portions 42 and the mount-side engaging ring portions 24 from the outside. In other words, in the second embodiment, as in the above-described first embodiment, the interior space of the frame body portion (protective member) 41 is formed as the housing compartment that houses therein the frame-side engaging ring portions 42 and the mount-side engaging ring portions 24 in the state of being engaged with each other.

In such a frame body portion (protective member) 41, the annular frame-side engaging ring portions 42 that are fixed to the inner surface of the frame body portion 41, and the mount-side engaging ring portions 24 are coupled to and engaged with these frame-side engaging ring portions 42. In this coupled state, these engaging ring portions 42 and 24 are arranged in the above-described housing compartment of the frame body portion 41, thereby being housed in the frame body portion (protective member) 41. In this way, the frame body portion (protective member) 41 covers, from the outside, at least the front (front surface), the rear (back surface), an upper surface, a lower surface, and an outer lateral surface in the width direction (lateral direction) of each of the frame-side engaging ring portions 42, and at least the front (front surface), the rear (back surface), the upper surface, the lower surface, and the outer lateral surface in the width direction (lateral direction) of each of the mount-side engaging ring portions 24 in the coupled state. With this, the frame-side engaging ring portions 42 and the mount-side engaging ring portions 24 can be protected overall.

In other words, since the frame body portion (protective member) 41 houses the frame-side engaging ring portions 42 and the mount-side engaging ring portions 24 in the coupled state in the above-described housing compartment of the frame body portion 41 without uncoupling these engaging ring portions 42 and 24 from each other, these engaging ring portions 42 and 24 can be covered at least from their front (front surface) sides, rear (back surface) sides, upper surface sides, lower surface sides, and outer-lateral-surface sides in the width direction (lateral direction). Further, along an inner rim portion of the frame body portion 41, an inner peripheral slot (insertion opening portion) that allows the right-and-left arm portions 23 of the mount portion 20 to be inserted therethrough is formed between the front part 46 and the rear part 47.

The right-and-left frame-side engaging ring portions 42 are formed similar to those of the charm according to the above-described first embodiment, and fixed at predetermined positions on an inner surface of the front part 46 of the frame body portion 41 by brazing with laser or the like.

In the charm 2 as described above according to the second embodiment, although the shape and the material of the frame body portion 41 to serve as the protective member are different from those in the charm 1 according to the above-described first embodiment, the same advantages as those in the case of the charm 1 according to the above-described first embodiment that the state in which the gemstone 10 is minutely and smoothly swingable can be stably maintained for a long duration, and that the minute swing of the gemstone 10 can be prevented from being hindered by the entanglement of the threads and the like can be obtained.

Third Embodiment

Figure 13:
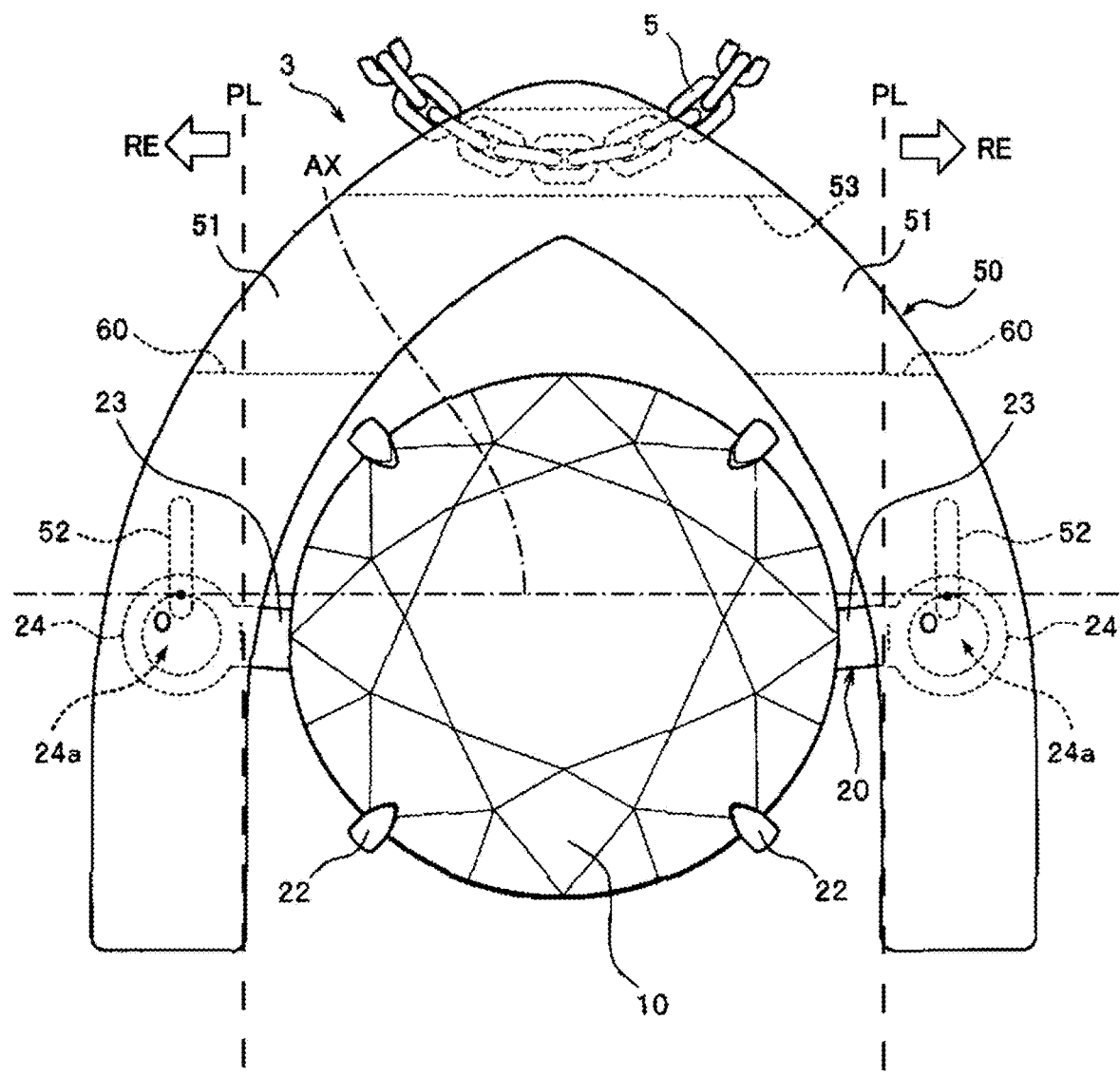
FIG. 13 is a front view illustrating an example of a charm according to a third embodiment.
Figure 14:
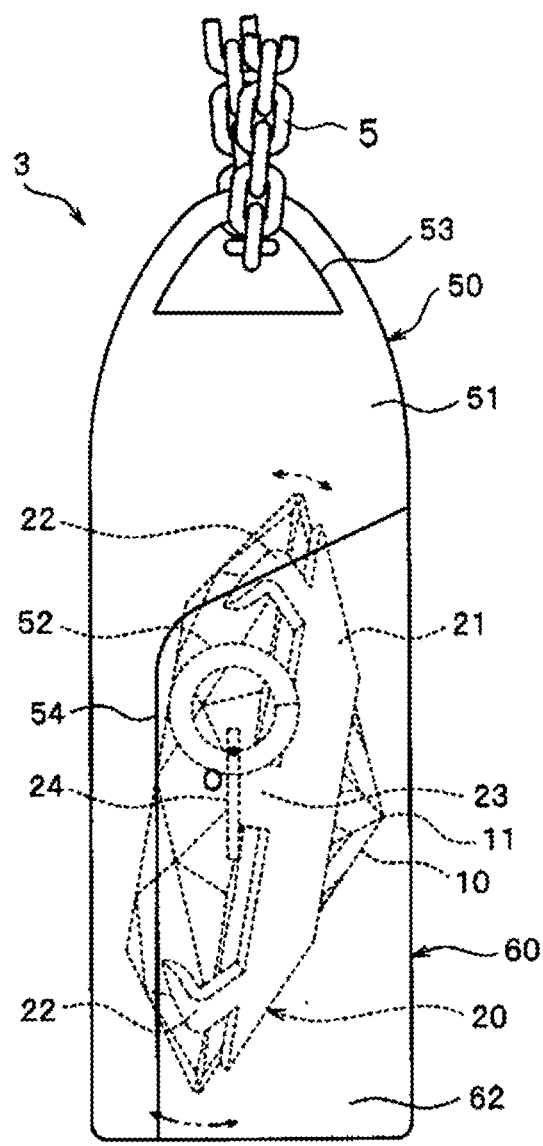
FIG. 14 is a side view of the charm illustrated in FIG. 13.
Figure 15:
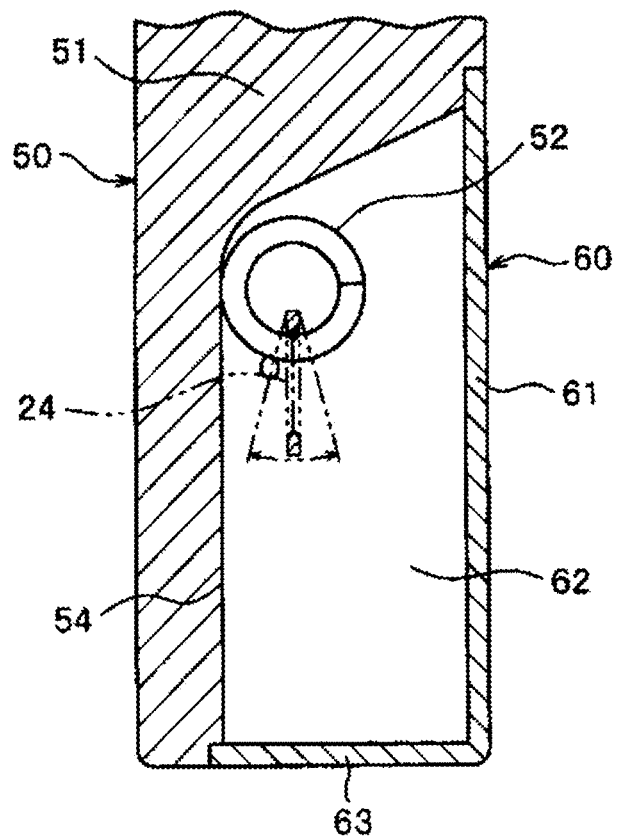
FIG. 15 is an enlarged view of a part where a protective member is fixed to a frame portion of the charm as viewed from an inside in a lateral direction.

FIG. 13 is a front view illustrating an example of a charm according to the third embodiment. FIG. 14 is a side view of a charm 3 illustrated in FIG. 13. FIG. 15 is an enlarged view illustrating, on an enlarged scale, a state in which a protective member 60 is fixed to a frame portion 50 of the charm 3 illustrated in FIG. 13. As in the first embodiment and the second embodiment, the charm 3 according to the third embodiment also forms the pendant (or necklace) as a personal ornament.

Similar to the three directions with respect to the charm 1 illustrated in FIG. 1, three directions (upper-and-lower direction, lateral direction, and front-and-rear direction) defined with respect to the charm 3 illustrated in FIG. 13 correspond to an upper-and-lower direction, a lateral direction, and a front-and-rear direction (front-and-back direction) of the drawing sheet of FIG. 13.

As illustrated, for example, in FIG. 13 to FIG. 15, the charm 3 according to the third embodiment includes the frame portion 50 and the mount portion 20 that fixes and holds the gemstone 10 such as a diamond. The frame portion 50 includes a frame body portion 51, and two frame-side engaging ring portions 52 provided to the frame body portion 51. The mount portion 20 includes the two mount-side engaging ring portions 24. As illustrated in FIG. 15, one of the mount-side engaging ring portions 24 and one of the frame-side engaging ring portions 52 are coupled to each other, and another one of the mount-side engaging ring portions 24 and another one of the frame-side engaging ring portions 52 are coupled to each other. The mount-side engaging ring portions 24 and the frame-side engaging ring portions 52 coupled to each other are held in contact with each other at the contact points O.

In the charm 3 according to the third embodiment, a part including the frame body portion 51 and the protective member 60 described below is also referred to as the "frame." The part including the gemstone 10 and the mount portion 20 is also referred to as the "body-to-be-suspended." A part including the two frame-side engaging ring portions 52 are also referred to as the "suspending portion." The mount-side engaging ring portions 24 are also referred to as the "first ring portions." The frame-side engaging ring portions 52 are also referred to as the "second ring portions."

Schematic configurations of the "frame," the body-to-be-suspended," and the "suspending portion" of the charm 3 according to the third embodiment are similar to those of the charms (1, 1a, and 1c) according to the above-described first embodiment. Thus, the charm 3 according to the third embodiment is also capable of protecting the two contact points O respectively from the objects that approach from the two outer ranges RE, and of preventing the unnecessary external force from being applied to these contact points O.

Further, in the charm 3 according to the third embodiment, the body-to-be-suspended (gemstone 10 and mount portion 20) is visible at least from the front side in the front-and-rear direction, and the frame (frame body portion 51 and protective member 60) covers the body-to-be-suspended (gemstone 10 and mount portion 20) from the left-hand side and the right-hand side in the lateral direction (FIG. 14). With this, the body-to-be-suspended (gemstone 10 and mount portion 20) is visible at least from the front side in the front-and-rear direction, and at the same time, the body-to-be-suspended (gemstone 10 and mount portion 20) is protected from the objects that approach from the left-hand side and the right-hand side in the lateral direction. Thus, the unnecessary external force is prevented from being applied to the body-to-be-suspended (gemstone 10 and mount portion 20) itself, and to the two contact points O of the body-to-be-suspended (gemstone 10 and mount portion 20) and the suspending portion (two frame-side engaging ring portions 52).

Still further, in the charm 3 according to the third embodiment, in the arbitrary planes that include the second ring portions (frame-side engaging ring portions 52) and that are perpendicular to the swing axis AX, the frame (frame body portion 51 and protective member 60) covers the peripheries of the second ring portions (frame-side engaging ring portions 52). With this, the second ring portions (frame-side engaging ring portions 52) are protected from the objects that approach in the arbitrary directions perpendicular to the swing axis AX. Thus, the unnecessary external force is prevented from being applied to the second ring portions (frame-side engaging ring portions 52).

In addition, in the charm 2 according to the second embodiment, in the arbitrary planes that include the first ring portions (mount-side engaging ring portions 24) and that are perpendicular to the swing axis AX, the frame (frame body portion 51 and protective member 60) covers the peripheries of the first ring portions (mount-side engaging ring portions 24). With this, the first ring portions (mount-side engaging ring portions 24) are protected from the objects that approach in the arbitrary directions perpendicular to the swing axis AX. Thus, the unnecessary external force is prevented from being applied to the first ring portions (mount-side engaging ring portions 24) themselves, and to the contact points O of the first ring portions (mount-side engaging ring portions 24) and the second ring portions (frame-side engaging ring portions 52).

Next, the configuration of the charm 3 according to the third embodiment is more specifically described.

The charm 3 according to the third embodiment includes the mount portion 20 that fixes and holds the gemstone 10 such as a diamond, and the frame portion 50 that supports the mount portion 20 and the gemstone 10. The frame portion 50 includes the frame body portion 51 that has an inverted V-shape in the front view of the charm 3, the right-and-left frame-side engaging ring portions 52 that are provided on back surfaces of right-and-left lower end portions of the frame body portion 51, and the protective member 60 including a pair of right-and-left protective members 60 that are fixed respectively to rear sides of the right-and-left lower end portions of the frame body portion 51.

In other words, in the charm 3 according to the third embodiment, the frame body portion 51 and the protective members 60 are formed as separate components, and fixed to each other by brazing or the like at a time of assembly. Meanwhile, the mount portion 20 and the gemstone 10 are formed similar to those in the case of the charm 1 according to the above-described first embodiment.

In the frame portion 50, a chain-link hole portion 53 for coupling the chain 5 of the pendant is provided along the lateral direction through an upper end portion of the frame body portion 51. Further, in FIG. 13 being the front view of the charm 3, the right-and-left lower end portions of the frame body portion 51 are formed to extend further downward from a lower end position of the mount portion 20 and the gemstone 10. By forming the right-and-left lower end portions of the frame body portion 51 in this way, under a state in which the charm 3 is worn, the clothes or the like that the user wears can be prevented from coming into contact with the gemstone 10 and the mount portion 20 from a lower side of the charm 3.

Right-and-left ring housing portions 54 that house the frame-side engaging ring portions 52 are provided on the rears (back surfaces) of the right-and-left lower end portions of the frame body portion 51. These ring housing portions 54 are each formed by partially reducing a thickness in the front-and-rear direction of the frame body portion 51. The frame-side engaging ring portions 52 are formed integrally and respectively with rears of the right-and-left ring housing portions 54. Note that, the frame-side engaging ring portions 52 may be formed separately from the frame body portion 51, and then fixed at predetermined positions in the frame body portion 51 by brazing or the like.

The right-and-left protective members 60 are formed as members separate from each other. Further, the right-and-left protective members 60 are fixed by brazing or the like to the right-and-left lower end portions of the frame body portion 51 such that the frame-side engaging ring portions 52 and the mount-side engaging ring portions 24 in the coupled state are covered from the outside. In this case, the protective members 60 each include a back-wall portion 61 that covers a rear side of the frame-side engaging ring portion 52 and the rear side of the mount-side engaging ring portion 24, an outer-lateral-wall portion 62 that covers an outer lateral side in the lateral direction of the frame-side engaging ring portion 52 and the outer lateral side in the lateral direction of the mount-side engaging ring portion 24, and a bottom wall portion 63 that covers a lower side of the frame-side engaging ring portion 52 and the lower side of the mount-side engaging ring portion 24. Further, in inner surface portions of the right-and-left lower end portions of the frame portion 50, the inner peripheral slots (insertion opening portions) that allow the right-and-left arm portions 23 of the mount portion 20 to be inserted therethrough are formed between the right-and-left lower end portions of the frame body portion 51 and the protective members 60.

In such a charm 3 according to the third embodiment, a front side and an upper surface side of each of the frame-side engaging ring portions 52, and the front side and the upper surface of each of the mount-side engaging ring portions 24 in the coupled state are covered with the frame body portion 51. In addition, the rear sides, the outer-lateral-surface sides, and the lower surface sides of the frame-side engaging ring portions 52, and the rear sides, the outer-lateral-surface sides, and the lower surface sides of the mount-side engaging ring portions 24 in the coupled state are covered with the protective members 60. In other words, in the charm 3 according to the third embodiment, in the frame portion 50, interior spaces that are formed in a manner of being sandwiched between the right-and-left lower end portions of the frame body portion 51 and the protective members 60 are formed as the housing compartments that house therein and protect the frame-side engaging ring portions 52 and the mount-side engaging ring portions 24 in the state of being engaged with each other.

With this, in the charm 3 according to the third embodiment, during normal use of the pendant, the same advantages as those of the charm 1 according to the above-described first embodiment that the state in which the gemstone 10 is minutely and smoothly swingable can be stably maintained for a long duration, and that the minute swing of the gemstone 10 can be prevented from being hindered by the entanglement of the threads and the like can be obtained.

Further, in the side view of the charm 3, the frame body portion 51 and the right-and-left protective members 60 are formed such that the culet portion 11 of the gemstone 10 are located at a position on the front surface side with respect to positions of the back surfaces of the frame body portion 51 and with respect to positions of back surfaces of the protective members 60. In other words, under the state illustrated in FIG. 14, the back surfaces of the frame body portion 51 and the back surfaces of the right-and-left protective members 60 are arranged at positions further on the back side from the position of the culet portion 11 of the gemstone 10 in the front-and-back direction (front-and-rear direction) of the charm 3. With this, when the charm 3 according to the third embodiment is worn, the gemstone 10 can be prevented from coming into contact with the clothes, the scarf, or the like that the user wears. Thus, the minute swing of the mount portion 20 and the gemstone 10 can be advantageously prevented from being hindered by the clothes, the scarf, or the like.

Fourth Embodiment

Figure 16:
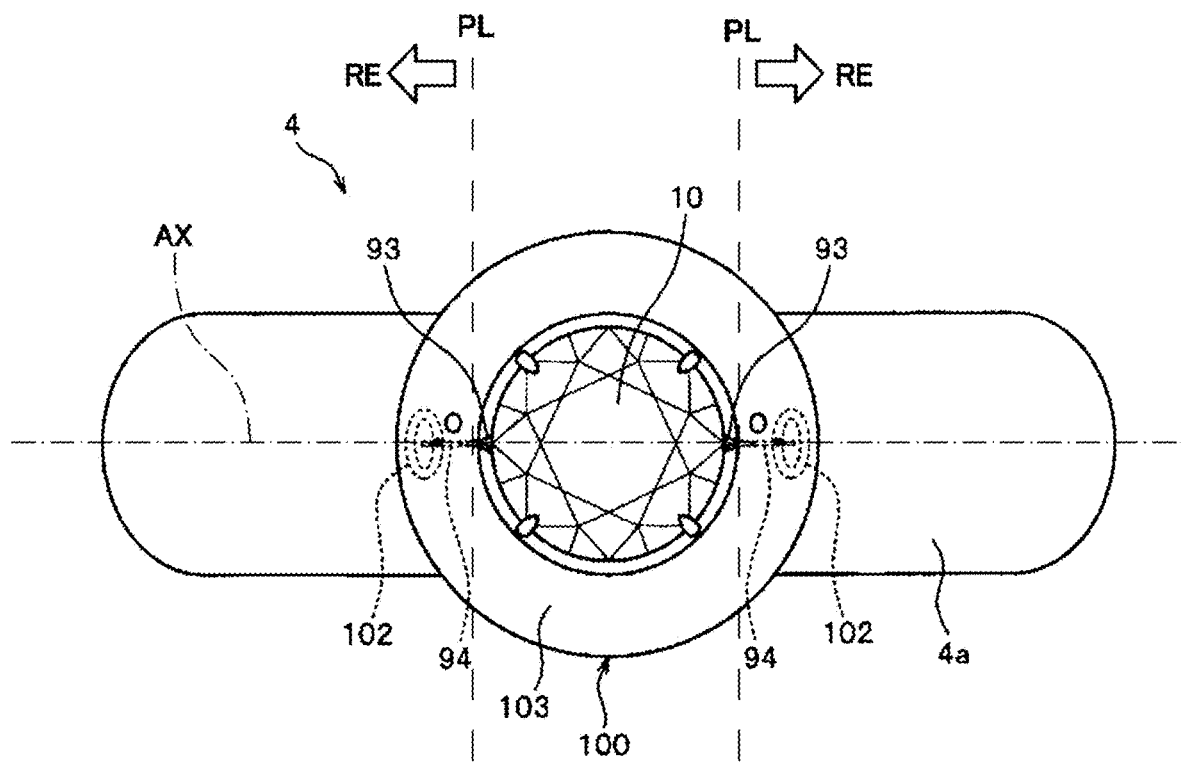
FIG. 16 is a front view illustrating an example of a ring according to a fourth embodiment.
Figure 17:
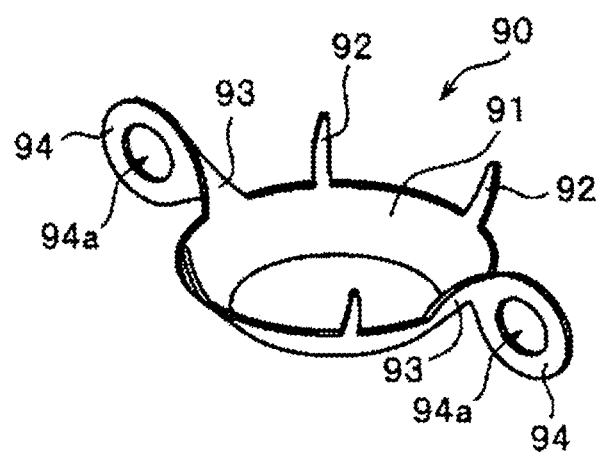
FIG. 17 is a schematic perspective view illustrating a mount portion that is used in the ring.
Figure 18:
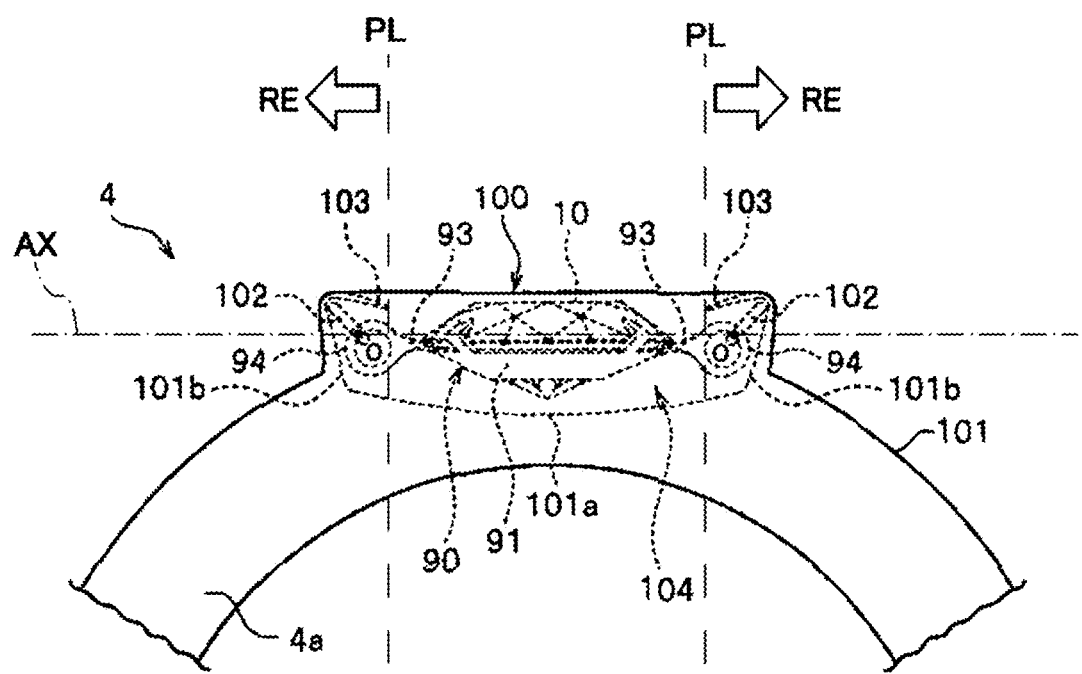
FIG. 18 is a schematic view illustrating a main part of the ring.

FIG. 16 is a front view illustrating an example of a ring according to a fourth embodiment. FIG. 17 is a schematic perspective view illustrating a mount portion 90 that is used in a ring 4 illustrated in FIG. 16. FIG. 18 is a schematic view illustrating a main part of the ring 4 illustrated in FIG. 16.

Also in the description of the ring 4 hereinbelow, as in the above description of the charm, three directions (upper-and-lower direction, lateral direction, and front-and-rear direction) that indicate relative positional relationships between components of the ring 4 are defined. The upper-and-lower direction refers to one of the directions perpendicular to the swing axis AX, specifically, a direction same as an upper-and-lower direction of the drawing sheet of FIG. 16 illustrating the ring 4. The lateral direction refers to the direction parallel to the swing axis AX, specifically, a direction same as a lateral direction of the drawing sheet of FIG. 16 illustrating the ring 4. The front-and-rear direction refers to the direction perpendicular to the upper-and-lower direction and the lateral direction, specifically, a direction perpendicular to the drawing sheet of FIG. 16 illustrating the ring 4. As illustrated in FIG. 16, the upper-and-lower direction is substantially parallel to a direction in which a finger is inserted into the ring 4. The body-to-be-suspended described below enters the swingable state when assuming a posture in which the front-and-rear direction is substantially parallel to the vertical direction. The forward direction in the front-and-rear direction refers to a direction from a depth side toward a near side of the ring 4 illustrated in FIG. 16, and the backward direction in the front-and-rear direction refers to a direction from the near side toward the depth side of the ring 4 illustrated in FIG. 16.

As illustrated, for example, in FIG. 16 to FIG. 18, the ring 4 according to the fourth embodiment includes a frame portion 100 and the mount portion 90 that fixes and holds the gemstone 10 such as a diamond. The frame portion 100 includes a frame body portion 101, and two frame-side engaging ring portions 102 provided to the frame body portion 101. The mount portion 90 includes two mount-side engaging ring portions 94. As illustrated in FIG. 16 and FIG. 18, one of the mount-side engaging ring portions 94 and one of the frame-side engaging ring portions 102 are coupled to each other, and another one of the mount-side engaging ring portions 94 and another one of the frame-side engaging ring portions 102 are coupled to each other. The mount-side engaging ring portions 94 and the frame-side engaging ring portions 102 coupled to each other are held in contact with each other at the two contact points O.

In the ring 4 according to the fourth embodiment, a part including the frame body portion 101 and a protective member 103 described below is also referred to as the "frame." Apart including the gemstone 10 and the mount portion 90 is also referred to as the "body-to-be-suspended." A part including the two frame-side engaging ring portions 102 are also referred to as the "suspending portion." The mount-side engaging ring portions 94 are also referred to as the "first ring portions." The frame-side engaging ring portions 102 are also referred to as the "second ring portions."

Schematic configurations of the "frame," the body-to-be-suspended," and the "suspending portion" of the ring 4 according to the fourth embodiment are similar to those of the charms (1, 1a, and 1c) according to the above-described first embodiment. Thus, the ring 4 according to the fourth embodiment is also capable of protecting the two contact points O respectively from the objects that approach from the two outer ranges RE, and of preventing the unnecessary external force from being applied to these contact points O.

Further, in the ring 4 according to the fourth embodiment, the body-to-be-suspended (gemstone 10 and mount portion 90) is visible at least from the front side in the front-and-rear direction, and the frame (frame body portion 101 and protective member 103) covers the entirety of the body-to-be-suspended (gemstone 10 and mount portion 90) from the left-hand side and the right-hand side in the lateral direction. With this, the body-to-be-suspended (gemstone 10 and mount portion 90) is visible at least from the front side in the front-and-rear direction, and at the same time, the body-to-be-suspended (gemstone 10 and mount portion 90) is protected from the objects that approach from the left-hand side and the right-hand side in the lateral direction. Thus, the unnecessary external force is prevented from being applied to the body-to-be-suspended (gemstone 10 and mount portion 90) itself, and to the two contact points O of the body-to-be-suspended (gemstone 10 and mount portion 90) and the suspending portion (two frame-side engaging ring portions 102).

Still further, in the ring 4 according to the fourth embodiment, the frame (frame body portion 101 and protective member 103) covers the entirety of the body-to-be-suspended (gemstone 10 and mount portion 90) from the upper side and the lower side in the upper-and-lower direction. With this, the body-to-be-suspended (gemstone 10 and mount portion 90) is protected from the objects that approach from the upper side and the lower side in the upper-and-lower direction. Thus, the unnecessary external force is further prevented from being applied to the body-to-be-suspended (gemstone 10 and mount portion 90) itself, and to the two contact points O of the body-to-be-suspended (gemstone 10 and mount portion 90) and the suspending portion (two frame-side engaging ring portions 102).

Yet further, in the ring 4 according to the fourth embodiment, in the arbitrary planes that include the second ring portions (frame-side engaging ring portions 102) and that are perpendicular to the swing axis AX, the frame (frame body portion 101 and protective member 103) covers the entireties of the peripheries of the second ring portions (frame-side engaging ring portions 102). With this, the second ring portions (frame-side engaging ring portions 102) are protected from the objects that approach in the arbitrary directions perpendicular to the swing axis AX. Thus, the unnecessary external force is prevented from being applied to the second ring portions (frame-side engaging ring portions 102).

In addition, in the ring 4 according to the fourth embodiment, in the arbitrary planes that include the first ring portions (mount-side engaging ring portions 94) and that are perpendicular to the swing axis AX, the frame (frame body portion 101 and protective member 103) covers the entireties of the peripheries of the first ring portions (mount-side engaging ring portions 94). With this, the first ring portions (mount-side engaging ring portions 94) are protected from the objects that approach in the arbitrary directions perpendicular to the swing axis AX. Thus, the unnecessary external force is prevented from being applied to the first ring portions (mount-side engaging ring portions 94) themselves, and to the contact points O of the first ring portions (mount-side engaging ring portions 94) and the second ring portions (frame-side engaging ring portions 102).

Next, the configuration of the ring 4 according to the fourth embodiment is more specifically described.

The ring 4 according to the fourth embodiment includes an annular ring-body portion 4a, the mount portion 90 that fixes and holds the gemstone 10 such as a diamond, and the frame portion 100 that is formed integrally with the ring body portion 4a and supports the mount portion 90 and the gemstone 10. In this case, a part of the frame portion 100 serves as the protective member 103 as described below.

As illustrated in FIG. 17, the mount portion 90 includes a mount body portion 91 on which the gemstone 10 is set, a plurality of claw portions 92 that are provided to protrude from the mount body portion 91 and fix the gemstone 10, right-and-left arm portions 93 that extend from right-and-left lateral rim portions of the mount body portion 91 to the outside in the width direction of the mount portion 90, and the right-and-left mount-side engaging ring portions 94 that are arranged at distal end portions of the right-and-left arm portions 93. The right-and-left arm portions 93 each have a shape which extends from the mount body portion 91 to the outside in the right-and-left direction, and in which the mount-side engaging ring portion 94 is twisted to be arranged in a posture orthogonal to the mount body portion 91. A circular central-opening portion 94a is formed at a central portion of each of the right-and-left mount-side engaging ring portions 94.

This mount portion 90 is formed such that, when the mount portion 90 is supported by the frame portion 100 through intermediation of the mount-side engaging ring portions 94 and the frame-side engaging ring portions 102 described below, the table surface of the gemstone 10 to be fixed and held is oriented forward (oriented to a near side of the drawing sheet of FIG. 16), and that the central opening portion 94a of each of the mount-side engaging ring portions 94 is oriented in the upper-and-lower direction.

The frame portion 100 includes the frame body portion 101, the right-and-left frame-side engaging ring portions 102 that are fixed to an inner-peripheral wall surface of the frame body portion 101, and the protective member 103 that has an annular shape, is formed integrally with the frame body portion 101, and extends inward from an upper end portion of the frame body portion 101.

The frame body portion 101 is formed into a bowl shape including therein a housing region (space) that houses the mount portion 90 and the gemstone 10. The frame body portion 101 includes a bottom surface portion 101a that is arranged to face the culet of the gemstone 10, and an inner-peripheral wall-surface portion 101b that is arranged in a manner of rising from an outer rim portion of the bottom surface portion 101a, These inner-peripheral wall-surface portion 101b and bottom surface portion 101a of the frame body portion 101 are arranged away from the mount portion 90 and the gemstone 10 such that a gap is formed between the gemstone 10 and each of the inner-peripheral wall-surface portion 101b and the bottom surface portion 101a.

The right-and-left frame-side engaging ring portions 102 each include a circular central-opening portion. The frame-side engaging ring portions 102 are each inclined at an inclination angle of approximately 45° with respect to the front-and-rear direction, and fixed to a boundary part between the frame body portion 101 and the protective member 103 or to a vicinity thereof in a posture that the central opening portion is oriented in a direction obliquely inclined. In this case, although there is no particular problem as long as the frame-side engaging ring portions 102 are fixed to at least one of the frame body portion 101 and the protective member 103, when the frame-side engaging ring portions 102 are fixed to both the frame body portion 101 and the protective member 103, a fixing strength of the frame-side engaging ring portions 102 can be increased.

Note that, in this embodiment, the orientation and the posture of the frame-side engaging ring portions 102, and means for fixing the frame-side engaging ring portions 102 to the frame body portion 101 are not particularly limited. For example, the frame-side engaging ring portions 102 may be fixed to the frame body portion 101 or the protective member 103 in a posture parallel to the front-and-rear direction.

The protective member 103 is arranged to extend inward from the upper end portion of the frame body portion 101 to a central portion of the same, and obliquely downward toward a top surface portion of the frame body portion 101. Between this protective member 103 and each of the inner-peripheral wall-surface portion 101b and the bottom surface portion 101a of the frame body portion 101, there is provided a housing compartment 104 (interior space) that houses the right-and-left frame-side engaging ring portions 102 and the right-and-left mount-side engaging ring portions 94 in the state of being engaged with each other.

In such a ring 4 according to the fourth embodiment, front sides, rear sides, upper surface sides, lower surface sides, and outer-lateral-surface sides in the width direction of the frame-side engaging ring portions 102, and front sides, rear sides, upper surface sides, lower surface sides, and outer-lateral-surface sides in the width direction of the mount-side engaging ring portions 94 in the state of being coupled to each other are covered with the protective member 103 and the bowl-shaped frame body portion 101. With this, entireties of the frame-side engaging ring portions 102, and entireties of the mount-side engaging ring portions 94 are protected. In other words, as illustrated in FIG. 16 being the front view of the ring 4, the frame-side engaging ring portions 102 and the mount-side engaging ring portions 94 are at invisible positions behind the protective member 103, and can be prevented from directly receiving the unexpected external force (load) from the outside.

Thus, in the ring 4 according to the fourth embodiment, during normal use, the state in which the gemstone 10 is minutely and smoothly swingable can be stably maintained for a long duration, and the minute swing of the gemstone 10 can be prevented from being hindered by the entanglement of the threads and the like. As a result, brilliance of the gemstone 10 can look more beautiful, and hence a decorative effect and a high-quality appearance of the ring 4 can be more advantageously enhanced.

Note that, in the fourth embodiment, as long as at least the entireties of the right-and-left frame-side engaging ring portions 102 of the frame portion 100, and coupling parts of the right-and-left mount-side engaging ring portions 94 with respect to the frame-side engaging ring portions 102 are protected by the protective member 103 and the frame body portion 101, for example, ring parts out of the coupling parts of the mount-side engaging ring portions 94 with respect to the frame-side engaging ring portions 102 may be partially exposed.

Hereinabove, as the embodiments of the personal ornament, the pendants including the charms are described in the first embodiment to the third embodiment, and the ring is described in the fourth embodiment. However, the embodiments of the present invention are not limited to these examples. Specifically, the embodiments of the present invention are applicable also to various other personal ornaments having a structure in which the body-to-be-suspended (such as mount portion that fixes and holds the gemstone) is suspended to be swingable, such as a pierced earring, a non-pierced earring, a brooch, a tie clip.

Further, in the cases of the first embodiment to the fourth embodiment described above, the frame-side engaging ring portions and the mount-side engaging ring portions are each formed into a shape like a hollow ring overall. However, in the embodiments of the present invention, the frame-side engaging ring portions and the mount-side engaging ring portions may each be formed such that parts of the inner peripheral portions that can be held in contact with each other when these ring portions are coupled to each other each have a circular-arc shape, and that other parts each have a noncircular-arc shape.

In addition, the suspending structure including the body-to-be-suspended and the suspending portion is not limited to the structures using the ring portions as in the above-described embodiments at least as long as the body-to-be-suspended and the suspending portion are held in contact with each other at the two contact points, and as long as the body-to-be-suspended is suspended to be swingable about the swing axis that extends through these two contact points.

In each of the personal ornaments of the first embodiment to the fourth embodiment described above, the single body-to-be-suspended (including gemstone and mount portion) is arranged correspondingly to the single frame portion. However, as another embodiment of the present invention, a plurality of bodies to be suspended may be arranged with respect to the single frame portion.

In the examples of the first embodiment to the fourth embodiment described above, the body-to-be-suspended includes the gemstone. As still another embodiment of the present invention, the body-to-be-suspended may include various members other than the gemstone, which have light-reflecting properties.

Next, embodiments of decorative components that decorate external appearances of various articles are described.

Fifth Embodiment

Figure 19:
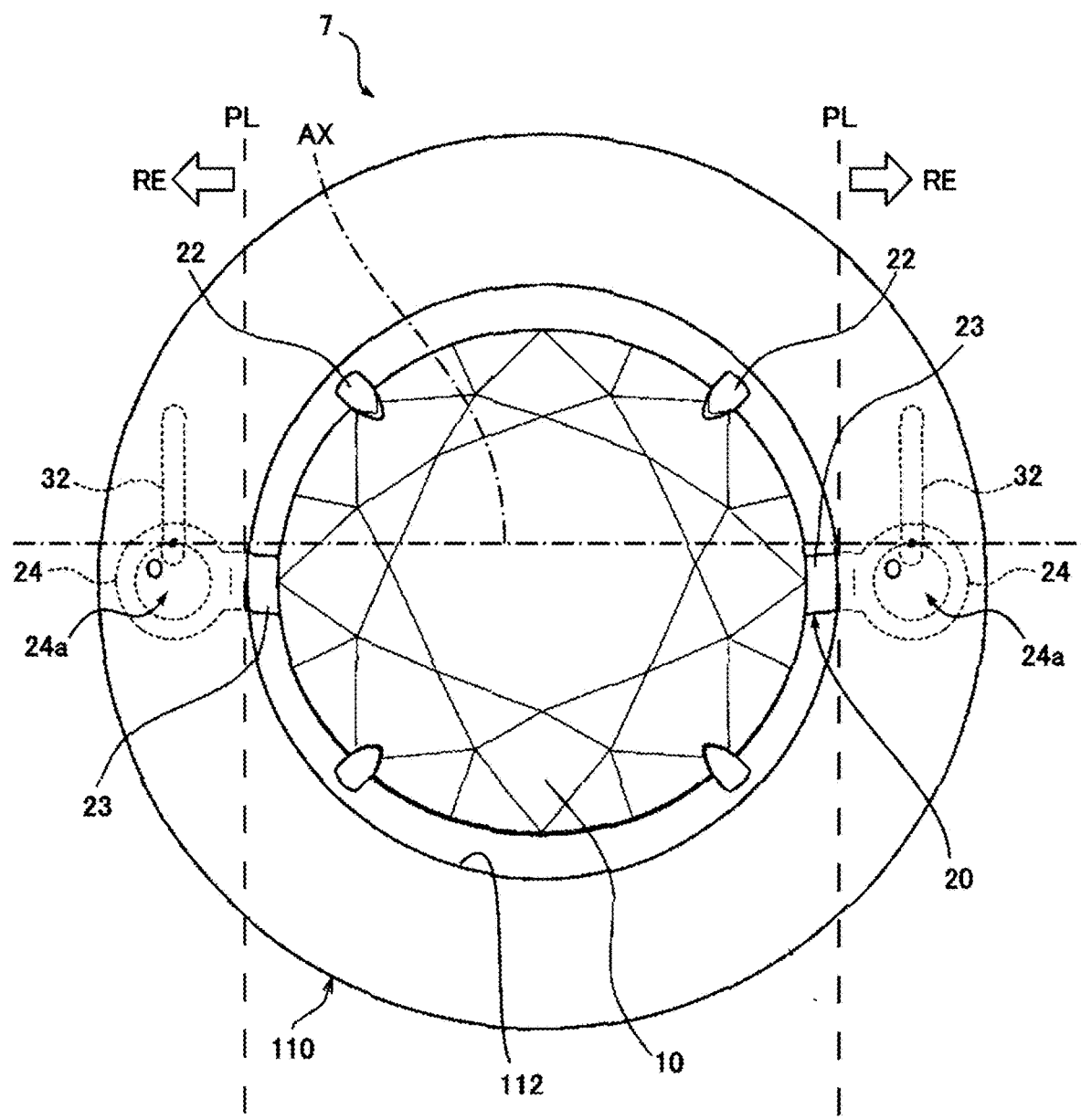
FIG. 19 is a front view illustrating an example of a decorative component according to a fifth embodiment
Figure 20:
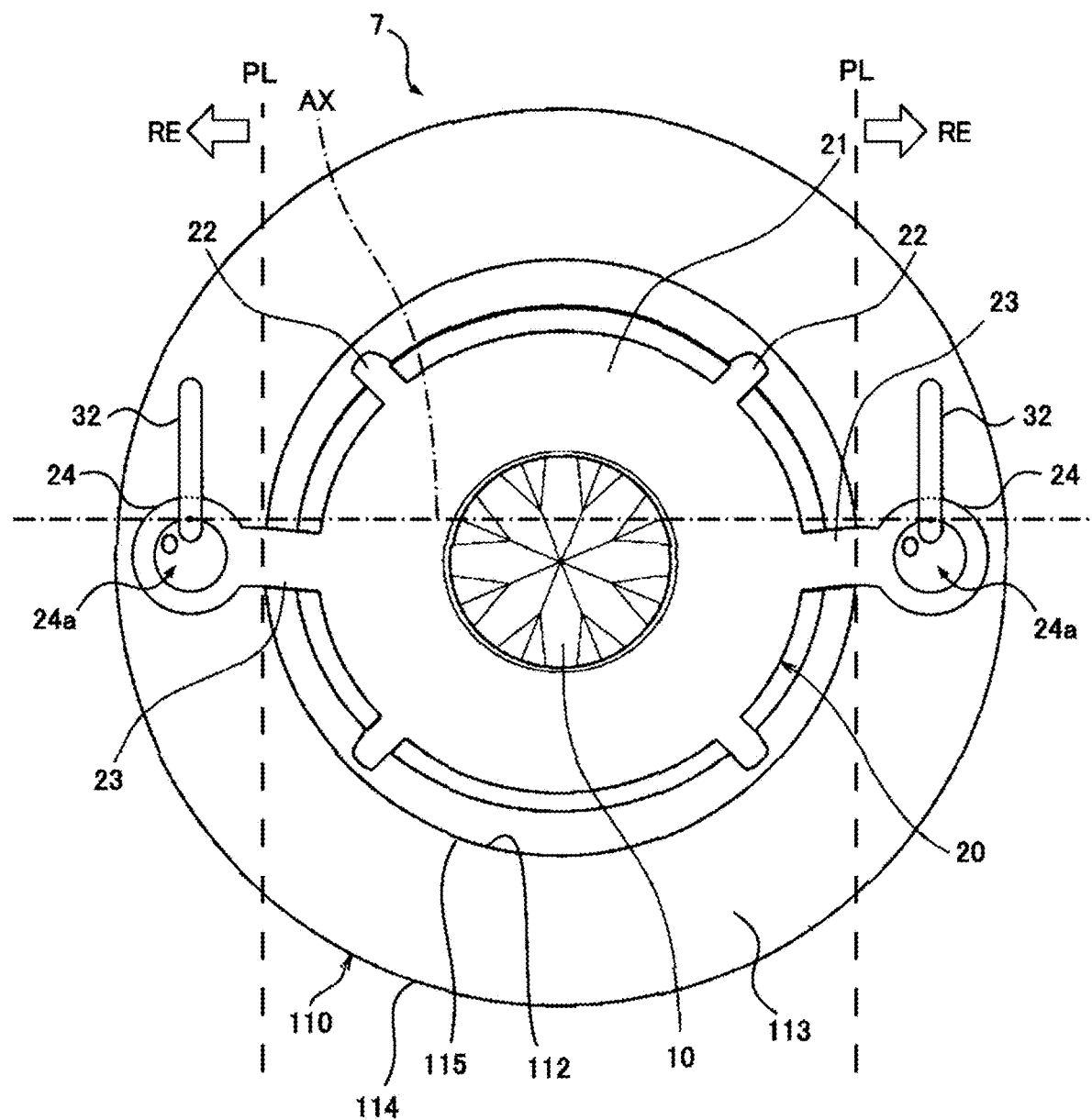
FIG. 20 is a rear view of the decorative component illustrated in FIG. 19.
Figure 21:
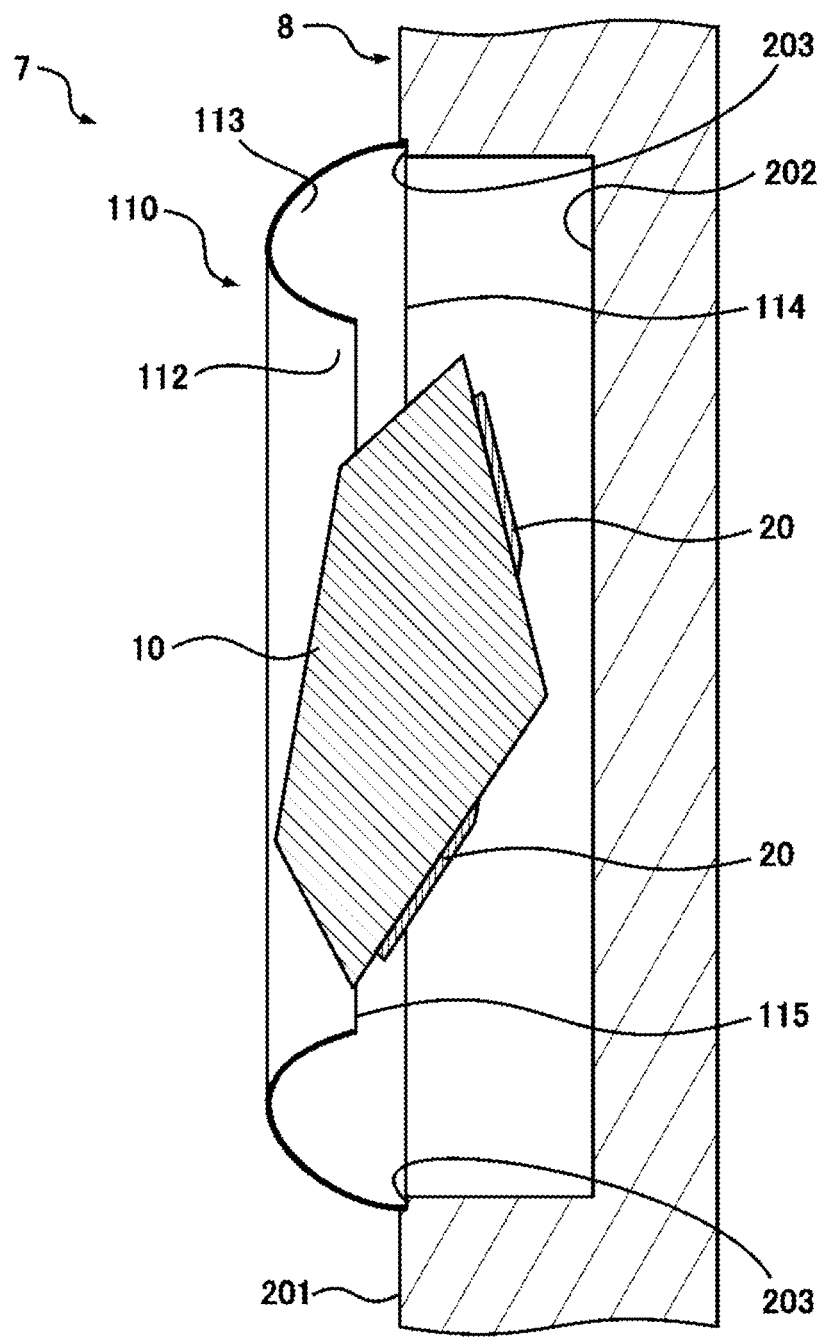
FIG. 21 is a vertical cross-sectional view taken along a center of the decorative component illustrated in FIG. 19.
Figure 22:
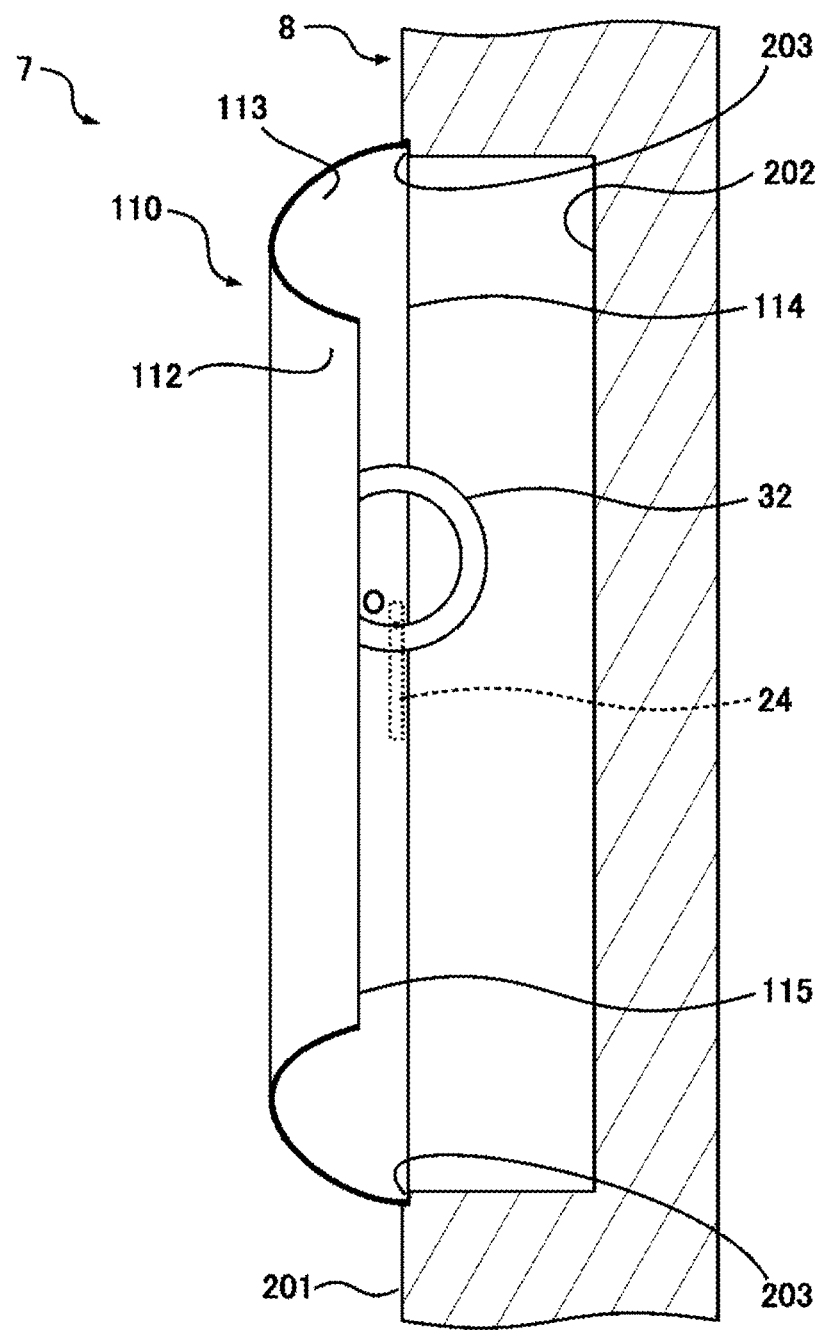
FIG. 22 is a view in which the mount portion in the cross-sectional view of FIG. 21 is omitted.

FIG. 19 is a front view illustrating an example of a decorative component according to a fifth embodiment. FIG. 20 is a rear view of a decorative component 7 illustrated in FIG. 19. FIG. 21 is a vertical cross-sectional view taken along a center of the decorative component 7 illustrated in the front view of FIG. 19. FIG. 22 is a view illustrating a state in which the mount portion 20 in the cross-sectional view of FIG. 21 is omitted. The decorative component 7 according to this embodiment is fixed to various articles (such as eyeglasses, a wristwatch, a stamp, a bag, a wallet, stationery, a key, a smartphone, a music box, a clock, a toy, a musical instrument, and sports equipment), and is used as components for decorating their external appearances.

In the description of the decorative component hereinbelow, in order that relative positional relationships between components of the decorative component are indicated, the three directions (upper-and-lower direction, lateral direction, and front-and-rear direction) are defined. The upper-and-lower direction refers to one of the directions perpendicular to the swing axis AX described below, specifically, a direction same as an upper-and-lower direction of the drawing sheets of FIG. 19 and FIG. 20 illustrating the decorative component 7. The lateral direction refers to a direction parallel to the swing axis AX described below, specifically, a direction same as a lateral direction of the drawings sheets of FIG. 19 and FIG. 20 illustrating the decorative component 7. The front-and-rear direction refers to a direction perpendicular to the upper-and-lower direction and the lateral direction, specifically, a direction perpendicular to the drawing sheets of FIG. 19 and FIG. 20 illustrating the decorative component 7. The forward direction in the front-and-rear direction refers to a direction from a depth side toward a near side of the decorative component 7 illustrated in FIG. 19, and the backward direction in the front-and-rear direction refers to a direction from the near side toward the depth side of the decorative component 7 illustrated in FIG. 19.

As illustrated, for example, in FIG. 19 to FIG. 22, the decorative component 7 according to the fifth embodiment includes a frame 110 fixed to an article 8, the mount portion 20 that fixes and holds the gemstone 10 such as a diamond, and the two frame-side engaging ring portions 32 provided to the frame 110. The mount portion 20 includes the two mount-side engaging ring portions 24. As illustrated in FIG. 19 and FIG. 20, one of the mount-side engaging ring portions 24 and one of the frame-side engaging ring portions 32 are coupled to each other, and another one of the mount-side engaging ring portions 24 and another one of the frame-side engaging ring portions 32 are coupled to each other. The mount-side engaging ring portions 24 and the frame-side engaging ring portions 32 coupled to each other are held in contact with each other at the contact points O.

Note that, in the decorative component 7 according to the fifth embodiment, the part including the gemstone 10 and the mount portion 20 is also referred to as the "body-to-be-suspended." The part including the two frame-side engaging ring portions 32 are also referred to as the "suspending portion." The mount-side engaging ring portions 24 are also referred to as the "first ring portions." The frame-side engaging ring portions 32 are also referred to as the "second ring portions."

As illustrated in FIG. 19 and FIG. 20, the suspending portion (two frame-side engaging ring portions 32) suspends the body-to-be-suspended (gemstone 10 and mount portion 20) such that the body-to-be-suspended is swingable about the imaginary swing axis AX. The suspending portion (two frame-side engaging ring portions 32) and the body-to-be-suspended (gemstone 10 and mount portion 20) are held in contact with each other at the two contact points O located on the swing axis AX.

In FIG. 19 and FIG. 20, "PL" represents the planes perpendicular to the swing axis AX, and "RE" represents the ranges (outer ranges) divided by the two planes PL. The two planes PL, which are planes defined with respect to the frame 110, are located between the two contact points O. Of the three ranges divided by the two planes PL, the two ranges each including corresponding one of the contact points O are the outer ranges RE, respectively. The two outer ranges RE are separated from each other with the two planes PL being interposed therebetween.

As illustrated in FIG. 19 to FIG. 22, in one of the outer ranges RE, which includes one of the contact points O, the frame 110 covers a part of the periphery of the one of the contact points O, the part being not covered with an outer surface 201 of the article 8. Further, in one of the outer ranges RE, which includes another one of the contact points O, the frame 110 covers a part of the periphery of the other one of the contact points O, the part being not covered with the outer surface 201 of the article 8.

Specifically, the frame 110 covers at least an entirety of the part of the periphery of the one of the contact points O as viewed from the one of the outer ranges RE, the one of the contact points O being included in the one of the outer ranges RE, the part of the periphery of the one of the contact points O being not covered with the article 8. Further, the frame 110 covers at least an entirety of the part of the periphery of the other one of the contact points O as viewed from the other one of the outer ranges RE, the other one of the contact points O being included in the other one of the outer ranges RE, the part of the periphery of the other one of the contact points O being not covered with the article 8.

In this way, in the decorative component 7 according to the fifth embodiment, the body-to-be-suspended (gemstone 10 and mount portion 20) suspended from the suspending portion (two frame-side engaging ring portions 32) enters the state of being swingable about the imaginary swing axis AX. In this swingable state, the body-to-be-suspended (gemstone 10 and mount portion 20) and the suspending portion (two frame-side engaging ring portions 32) are held in contact with each other at the two contact points O located on the swing axis AX. On the premise that the two planes PL include the two predetermined planes PL located between the two contact points O and perpendicular to the swing axis AX, of the three ranges divided by these two planes PL, the two ranges each including corresponding one of the contact points O are defined as the outer ranges RE, respectively. The contact points O included respectively in these two outer ranges RE are different from each other. In the one of the outer ranges RE, the part of the periphery of the one of the contact points O, which is not covered with the outer surface 201 of the article 8, is covered with the frame 110. In other words, in the one of the outer ranges RE, the article 8 and the frame 110 cover the periphery of the one of the contact points O. With this, the one of the contact points O is protected from the object that approaches from the one of the outer ranges RE. Thus, the unnecessary external force is prevented from being applied to the one of the contact points O. Further, in the other one of the outer ranges RE, which includes the other one of the contact points O, the part of the periphery of the other one of the contact points O, which is not covered with the article 8, is covered with the frame 110. In other words, in the other one of the outer ranges RE, the article 8 and the frame 110 cover the periphery of the other one of the contact points O. With this, the other one of the contact points O is protected from the object that approaches from the other one of the outer ranges RE. Thus, the unnecessary external force is prevented from being applied to the other one of the contact points O. In other words, the decorative component 7 according to the fifth embodiment is capable of protecting the two contact points O respectively from the objects that approach from the two outer ranges RE, and of preventing the unnecessary external force from being applied to these contact points O.

Further, in the decorative component 7 according to the fifth embodiment, the body-to-be-suspended (gemstone 10 and mount portion 20) is visible at least from the front side in the front-and-rear direction, and the frame 110 covers the entirety of the body-to-be-suspended (gemstone 10 and mount portion 20) from the left-hand side and the right-hand side in the lateral direction.

With this, the body-to-be-suspended (gemstone 10 and mount portion 20) is visible at least from the front side in the front-and-rear direction, and at the same time, the body-to-be-suspended (gemstone 10 and mount portion 20) is protected from the objects that approach from the left-hand side and the right-hand side in the lateral direction. Thus, the unnecessary external force is prevented from being applied to the body-to-be-suspended (gemstone 10 and mount portion 20) itself, and to the two contact points O of the body-to-be-suspended (gemstone 10 and mount portion 20) and the suspending portion (two frame-side engaging ring portions 32).

Still further, in the decorative component 7 according to the fifth embodiment, the frame 110 covers the entirety of the body-to-be-suspended (gemstone 10 and mount portion 20) from the upper side and the lower side in the upper-and-lower direction.

With this, the body-to-be-suspended (gemstone 10 and mount portion 20) is protected from the objects that approach from the upper side and the lower side in the upper-and-lower direction. Thus, the unnecessary external force is prevented from being applied to the body-to-be-suspended (gemstone 10 and mount portion 20) itself, and to the two contact points O of the body-to-be-suspended (gemstone 10 and mount portion 20) and the suspending portion (two frame-side engaging ring portions 32).

Yet further, in the arbitrary planes that include the second ring portions (frame-side engaging ring portions 32) and that are perpendicular to the swing axis AX, the frame 110 covers entireties of parts of the peripheries of the second ring portions (frame-side engaging ring portions 32), the parts being not covered with the article 8.

With this, the second ring portions (frame-side engaging ring portions 32) are protected from the objects that approach in the arbitrary directions perpendicular to the swing axis AX. Thus, the unnecessary external force is prevented from being applied to the second ring portions (frame-side engaging ring portions 32).

In addition, in the arbitrary planes that include the first ring portions (mount-side engaging ring portions 24) and that are perpendicular to the swing axis AX, the frame 110 covers entireties of parts of the peripheries of the first ring portions (mount-side engaging ring portions 24), the parts being not covered with the article 8.

With this, the first ring portions (mount-side engaging ring portions 24) are protected from the objects that approach in the arbitrary directions perpendicular to the swing axis AX. Thus, the unnecessary external force is prevented from being applied to the first ring portions (mount-side engaging ring portions 24) themselves, and to the contact points O of the first ring portions (mount-side engaging ring portions 24) and the second ring portions (frame-side engaging ring portions 32).

Next, the configuration of the decorative component 7 illustrated in FIG. 19 to FIG. 22 is specifically described.

The frame 110 is substantially the same as the above-described front part 36 illustrated in FIG. 1 (FIG. 1, FIG. 3, and FIG. 6). Thus, detailed description of the frame 110, and detailed description of the arrangement of the two frame-side engaging ring portions 32 in the frame 110 are omitted.

As illustrated in FIG. 19 to FIG. 22, the frame 110 overall has a shape formed by bisecting a doughnut-shaped hollow body along a plane parallel to a radial direction, and a circular rim 114 of a cut surface is fixed to a surface of the article 8 with adhesive or the like. As illustrated in FIG. 21 and FIG. 22, a recess portion 202 recessed in a columnar shape is formed in the surface of the article 8, and the frame 110 is fixed in a manner of closing the recess portion 202. In the example illustrated in FIG. 21 and FIG. 22, a step 203 is formed along a rim of an opening portion of the recess portion 202, and the rim 114 of the frame 110 is fitted to this step 203. By fitting the rim 114 of the frame 110 to the step 203, the rim 114 of the frame 110 can be easily and accurately positioned with respect to the opening portion of the recess portion 202.

As illustrated in FIG. 22, the two frame-side engaging ring portions 32 are provided to an inner surface 113 of the frame 110 arranged to cover the two contact points O. In this way, the support for the frame-side engaging ring portions 32 by the frame 110, and the protection of the contact points O by the frame 110 can be performed with a simple structure.

As illustrated in FIG. 19 and FIG. 20, the frame 110 includes an opening portion 112 that allows a part of the body-to-be-suspended (gemstone 10 and mount portion 20) to be exposed forward. With this, the part of the body-to-be-suspended (gemstone 10 and mount portion 20) to swing is easily viewed in the opening portion 112. Further, light beams reflected by the body-to-be-suspended (gemstone 10 and mount portion 20) directly reach eyes, and hence intense brilliance from the body-to-be-suspended is easily obtained.

As illustrated in FIG. 21 and FIG. 22, a rim 115 of the opening portion 112 of the frame 110 protrudes backward on the inner surface 113 side of the frame 110 that covers the contact points O. With this, as viewed from a forward side of the opening portion 112, the contact points O of the body-to-be-suspended (gemstone 10 and mount portion 20) and the suspending portion (two frame-side engaging ring portions 32) are covered with the rim 115 of the opening portion 112. Thus, the contact points O are likely to be protected from an object that approaches from the forward side of the opening portion 112.

Sixth Embodiment

Figure 23:
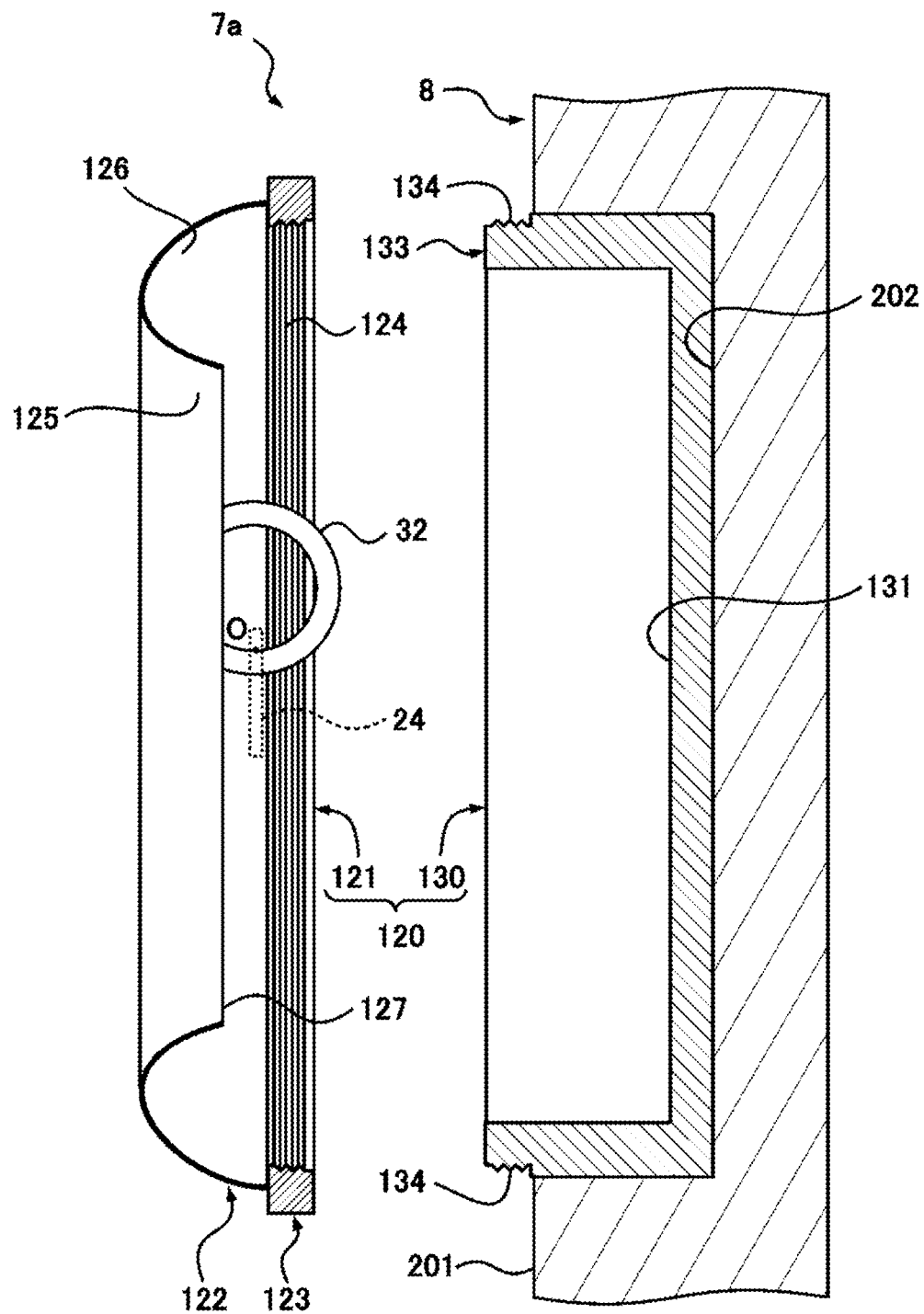
FIG. 23 is a view illustrating an example of a decorative component according to a sixth embodiment under a state in which an attachable/detachable portion is detached.
Figure 24:
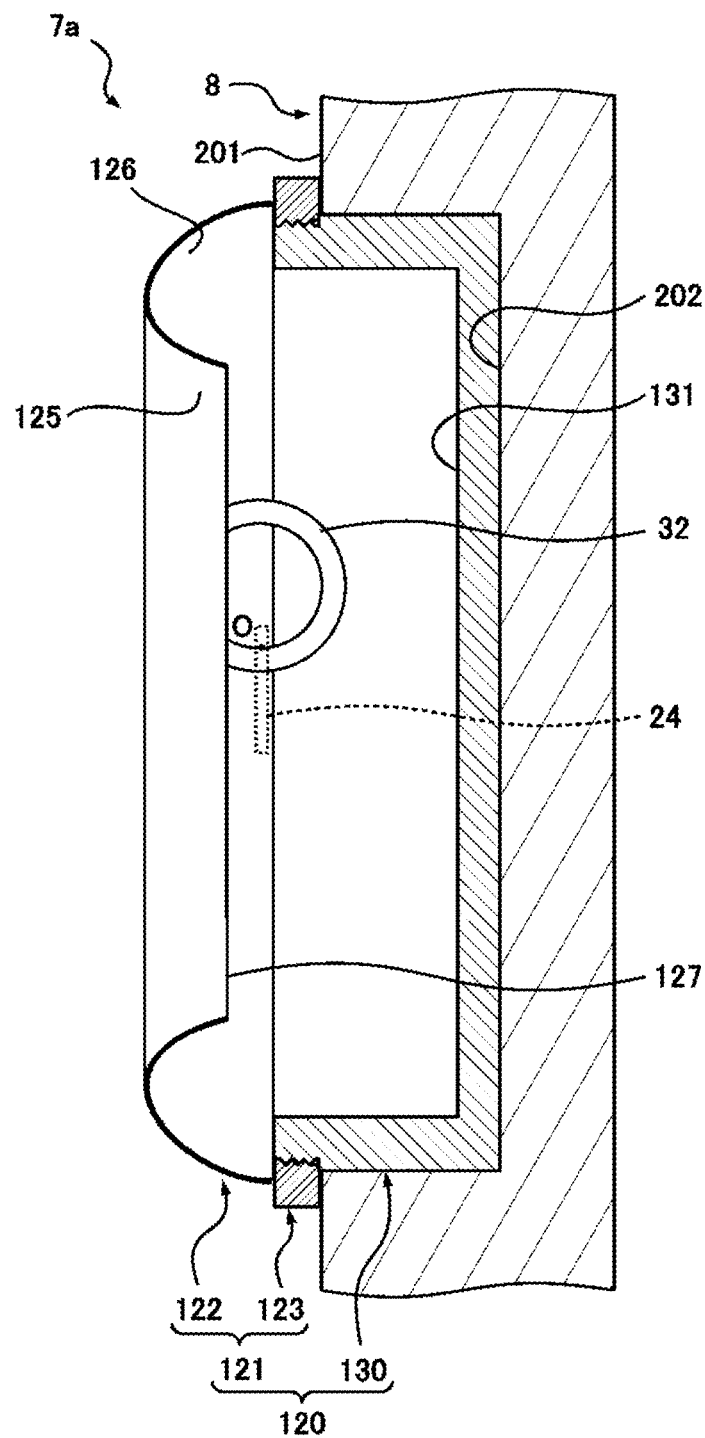
FIG. 24 is a view illustrating another example of the decorative component according to the sixth embodiment under a state in which the attachable/detachable portion is attached.

FIG. 23 is a view illustrating an example of a decorative component 7a according to a sixth embodiment under a state in which an attachable/detachable portion 121 is detached from a base portion 130. FIG. 24 is a view illustrating another example of the decorative component 7a according to the sixth embodiment under a state in which the attachable/detachable portion 121 is attached to the base portion 130. FIG. 23 and FIG. 24 are each a view corresponding to the cross-sectional view of FIG. 22 in which the mount portion 20 is not illustrated.

Three directions (upper-and-lower direction, lateral direction, and front-and-rear direction) defined with respect to the decorative component 7a illustrated in FIG. 23 are similar to those with respect to the decorative component 7 illustrated in FIG. 19 to FIG. 22. Specifically, the upper-and-lower direction of the drawing sheets of FIG. 23 and FIG. 24 corresponds to the upper-and-lower direction of the decorative component 7a, the front-and-rear direction (front-and-back direction) of the drawing sheets of FIG. 23 and FIG. 24 corresponds to the lateral direction of the decorative component 7a, and the lateral direction of the drawing sheets of FIG. 23 and FIG. 24 corresponds to the front-and-rear direction of the decorative component 7a.

As illustrated, for example, in FIG. 23 and FIG. 24, the decorative component 7a according to the sixth embodiment includes a frame 120, the mount portion 20 that fixes and holds the gemstone 10 such as a diamond, and the two frame-side engaging ring portions 32 provided to the frame 120. The frame 120 includes the base portion 130 fixed to the article 8, and the attachable/detachable portion 121 that is fixed in an attachable/detachable manner to the base portion 130. The mount portion 20 includes the two mount-side engaging ring portions 24. Similar to the above-described decorative component 7, also in the decorative component 7a according to the sixth embodiment, one of the mount-side engaging ring portions 24 and one of the frame-side engaging ring portions 32 are coupled to each other, and another one of the mount-side engaging ring portions 24 and another one of the frame-side engaging ring portions 32 are coupled to each other. The mount-side engaging ring portions 24 and the frame-side engaging ring portions 32 coupled to each other are held in contact with each other at the contact points O. Under the state in which the attachable/detachable portion 121 is attached to the base portion 130, the attachable/detachable portion 121 covers the two contact points O from the forward side.

In the decorative component 7a according to the sixth embodiment, the part including the gemstone 10 and the mount portion 20 is also referred to as the "body-to-be-suspended." The part including the two frame-side engaging ring portions 32 are also referred to as the "suspending portion." The mount-side engaging ring portions 24 are also referred to as the "first ring portions." The frame-side engaging ring portions 32 are also referred to as the "second ring portions."

Schematic configurations of the "frame," the body-to-be-suspended," and the "suspending portion" of the decorative component 7a according to the sixth embodiment are similar to those of the decorative component 7 according to the above-described fifth embodiment. Thus, the decorative component 7a according to the sixth embodiment is also capable of protecting the two contact points O respectively from the objects that approach from the two outer ranges RE, and of preventing the unnecessary external force from being applied to these contact points O.

In addition, in the decorative component 7a according to the sixth embodiment, the attachable/detachable portion 121 that covers the two contact points O is fixed in the attachable/detachable manner to the base portion 130 fixed to the article 8. With this, the attachable/detachable portion 121, the body-to-be-suspended (gemstone 10 and mount portion 20), and other components can be, for example, replaced or repaired.

Next, the configuration of the decorative component 7a illustrated in FIG. 23 and FIG. 24 is specifically described.

The attachable/detachable portion 121 includes an attachable/detachable-portion body 122 having a structure similar to that of the above-described frame 110 (FIG. 19 to FIG. 21), and a coupling portion 123.

As illustrated in FIG. 23 and FIG. 24, the attachable/detachable-portion body 122 overall has a shape formed by bisecting a doughnut-shaped hollow body along a plane parallel to a radial direction, and the ring-shaped coupling portion 123 is fixed to a circular rim of a cut surface. As illustrated in FIG. 24, the two frame-side engaging ring portions 32 are provided to an inner surface 126 of the attachable/detachable-portion body 122 arranged to cover the two contact points O. As illustrated in FIG. 23 and FIG. 24, the attachable/detachable-portion body 122 includes an opening portion 125 that allows the part of the body-to-be-suspended (gemstone 10 and mount portion 20) to be exposed forward. As illustrated in FIG. 23 and FIG. 24, a rim 127 of the opening portion 125 of the attachable/detachable-portion body 122 protrudes backward on the inner surface 126 side of the attachable/detachable-portion body 122 that covers the contact points O.

As illustrated in FIG. 23 and FIG. 24, the recess portion 202 recessed in the columnar shape is formed in the surface of the article 8, and the base portion 130 is fitted into this recess portion 202 and fixed thereto. Another recess portion 131 recessed in a columnar shape is formed in the base portion 130, and the attachable/detachable portion 121 is fixed to the base portion 130 in a manner of closing this recess portion 131. A ring-shaped coupling portion 133 is formed along a rim of an opening portion of the recess portion 131 of the base portion 130.

The ring-shaped coupling portion 123 of the attachable/detachable portion 121 and the ring-shaped coupling portion 133 of the base portion 130 are coupled to (threadedly engaged with) each other with a screw structure. In the example illustrated in FIG. 23, a screw thread 124 is formed on an inner peripheral surface of the coupling portion 123 of the attachable/detachable portion 121, and another screw thread 134 is formed also on an outer peripheral surface of the coupling portion 133 of the base portion 130. By inserting and turning the coupling portion 133 of the base portion 130 into the coupling portion 123 of the attachable/detachable portion 121, the coupling portion 123 and the coupling portion 133 are threadedly engaged with each other. With this, the attachable/detachable portion 121 is fixed to the base portion 130.

In this way, in the decorative component 7a according to the sixth embodiment, the ring-shaped coupling portion 123 of the attachable/detachable portion 121 and the ring-shaped coupling portion 133 of the base portion 130 can be coupled to each other with the screw structure. In addition, the part of the body-to-be-suspended (gemstone 10 and mount portion 20) is exposed forward through the opening portion 125 formed through the attachable/detachable-portion body 122 of the attachable/detachable portion 121. Thus, the function to form the space that houses the suspending portion (frame-side engaging ring portions 32) and the body-to-be-suspended (gemstone 10 and mount portion 20), and to protect the contact points O thereof, the function to make the body-to-be-suspended (gemstone 10 and mount portion 20) to swing easily viewed, and the function to facilitate the replacement and the repair of the suspending portion (frame-side engaging ring portions 32) and the body-to-be-suspended (gemstone 10 and mount portion 20) can be exerted at once with a significantly simple configuration.

Note that, the structure that couples the attachable/detachable portion and the base portion to each other is not limited to the above-described screw structure, and may be, for example, a coupling (snap-fit) structure that utilizes elastic force.

Seventh Embodiment

Figure 25:
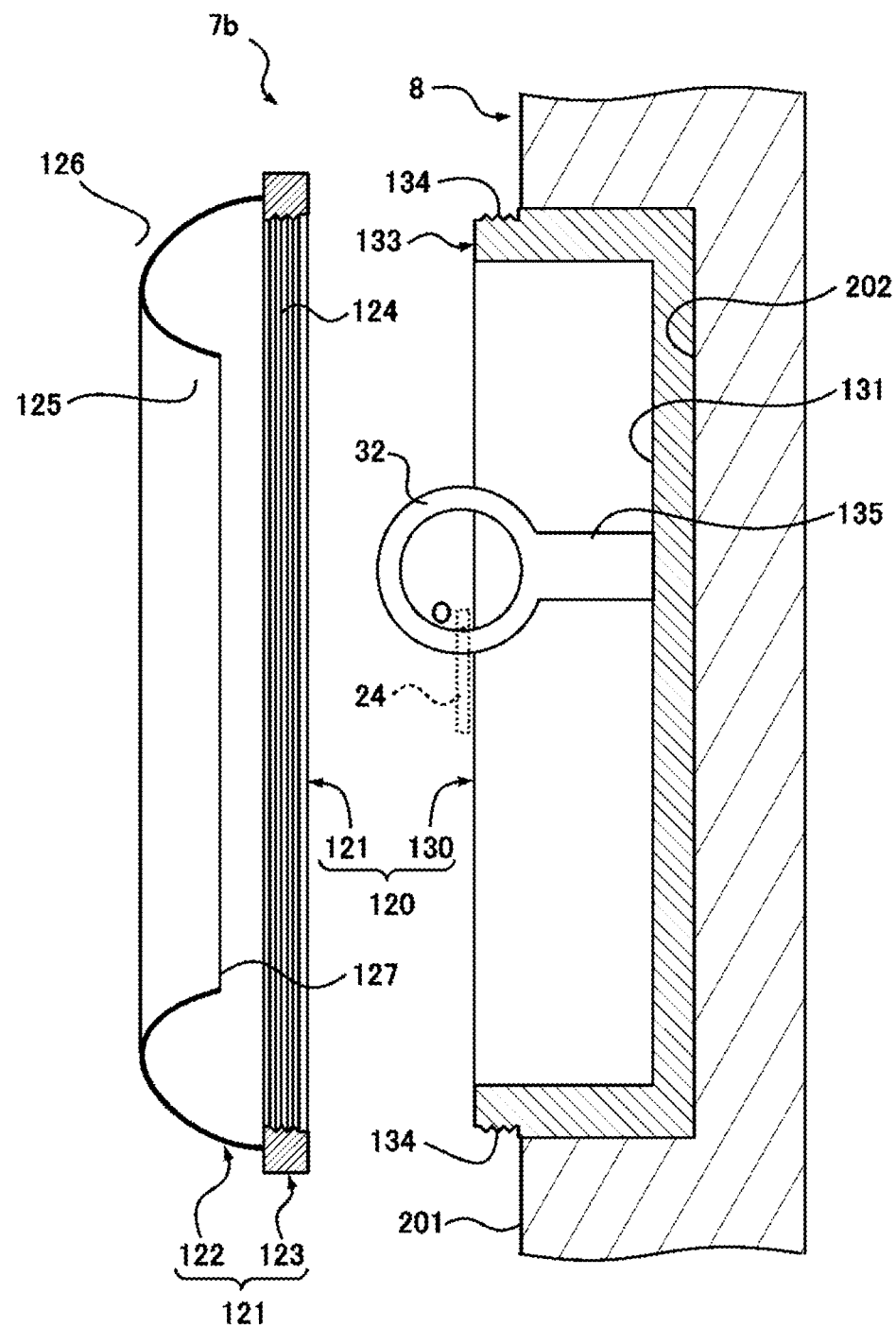
FIG. 25 is a view illustrating an example of a decorative component according to a seventh embodiment under the state in which the attachable/detachable portion is detached.
Figure 26:
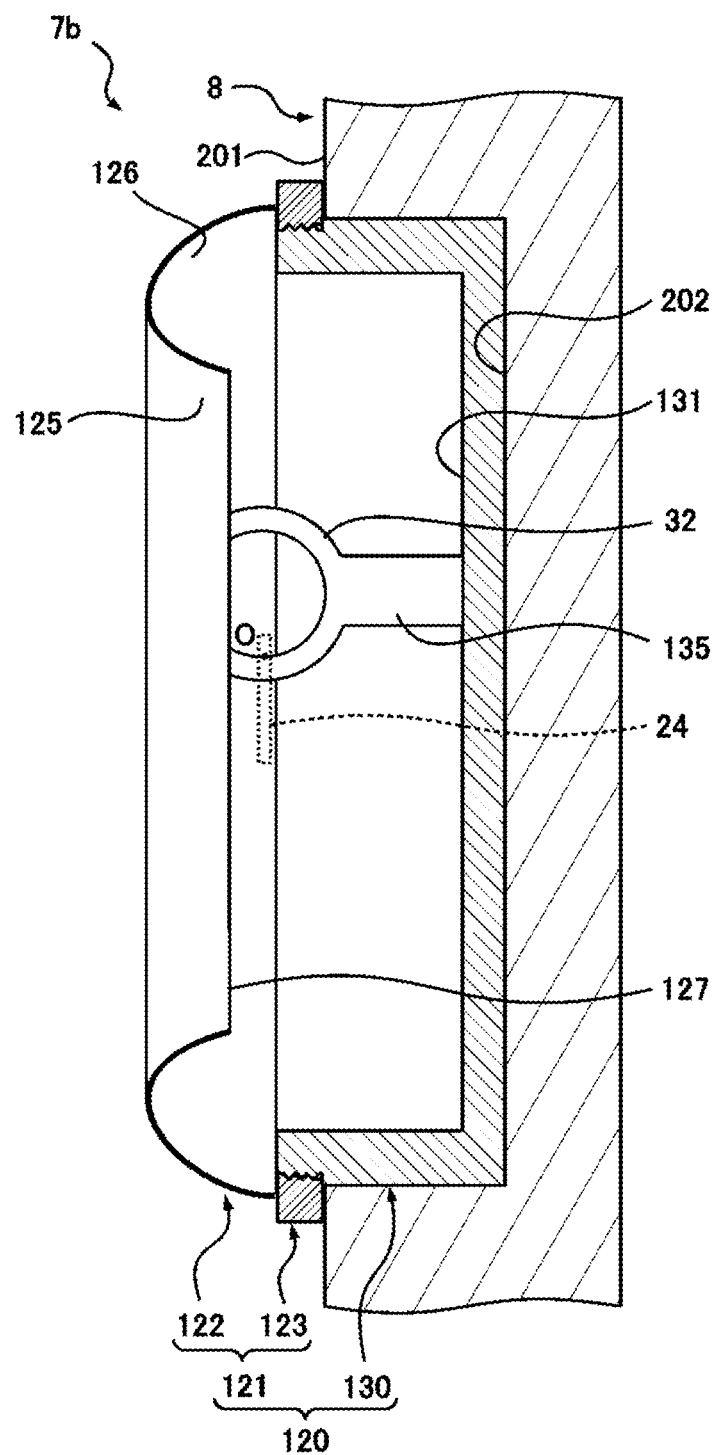
FIG. 26 is a view illustrating another example of the decorative component according to the seventh embodiment under the state in which the attachable/detachable portion is attached.

FIG. 25 is a view illustrating an example of a decorative component 7b according to a seventh embodiment under the state in which the attachable/detachable portion 121 is detached from the base portion 130. FIG. 26 is a view illustrating another example of the decorative component 7b according to the seventh embodiment under the state in which the attachable/detachable portion 121 is attached to the base portion 130. FIG. 25 and FIG. 26 are each a view corresponding to the cross-sectional view of FIG. 22 in which the mount portion 20 is not illustrated.

The decorative component 7b according to the seventh embodiment has the same configuration as that of the above-described decorative component 7a according to the sixth embodiment except that the fixing position of the suspending portion (two frame-side engaging ring portions 32) of the decorative component 7a according to the sixth embodiment is changed from the attachable/detachable portion 121 to the base portion 130. In the examples illustrated in FIG. 25 and FIG. 26, the decorative component 7b includes two support portions 135 for enabling the two frame-side engaging ring portions 32 to be supported by the base portion 130.

In the decorative component 7b according to the seventh embodiment, since the suspending portion (two frame-side engaging ring portions 32) is supported by the base portion 130, even when the attachable/detachable portion 121 drops, the body-to-be-suspended (gemstone 10 and mount portion 20) is retained by the base portion 130. Thus, the body-to-be-suspended (gemstone 10 and mount portion 20) is prevented from being lost even in case of the drop of the attachable/detachable portion 121.

Eighth Embodiment

Figure 27:
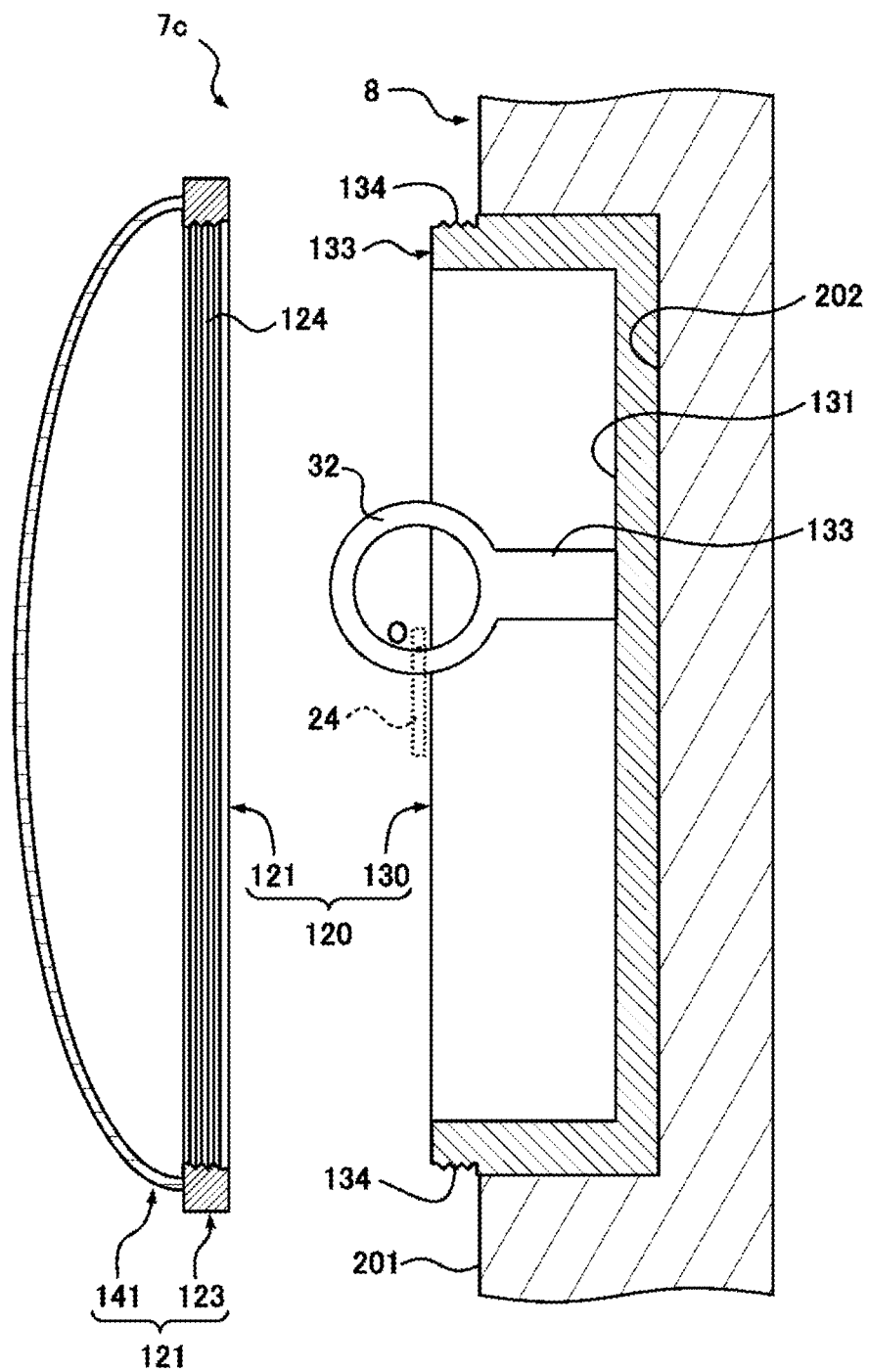
FIG. 27 is a view illustrating an example of a decorative component according to an eight embodiment under the state in which the attachable/detachable portion is detached.
Figure 28:
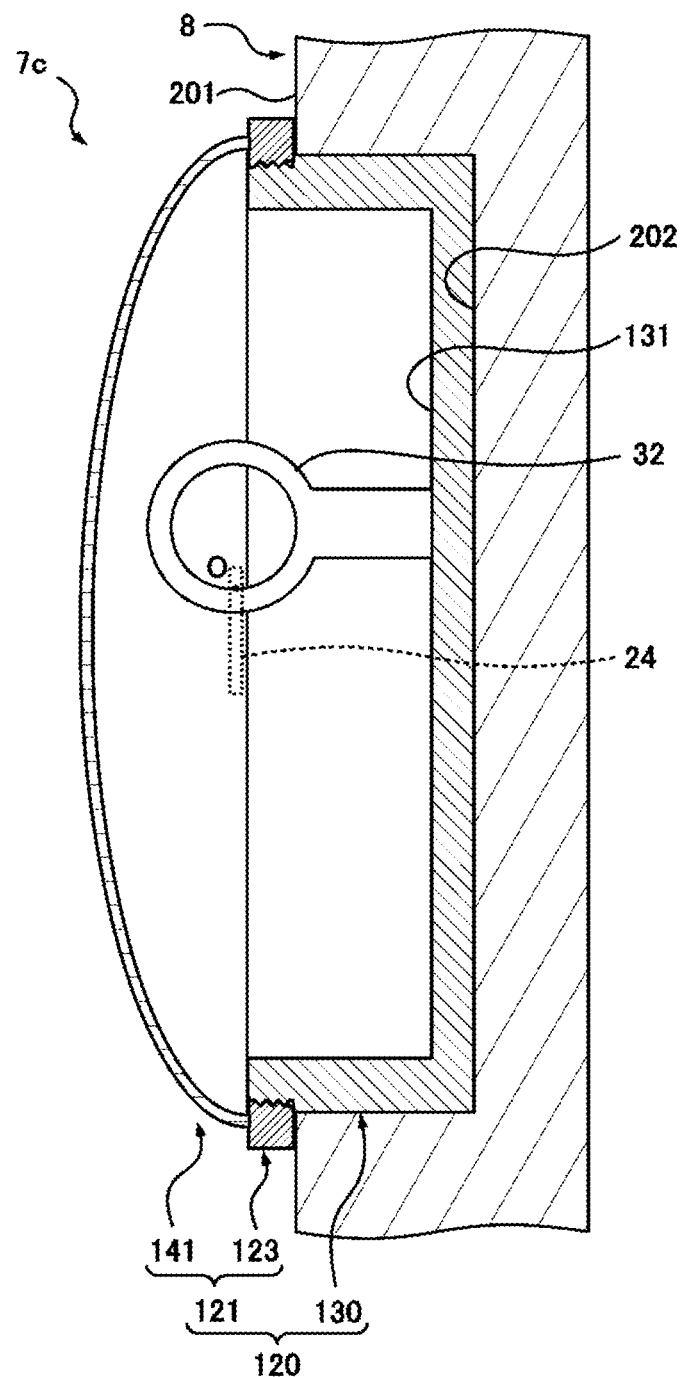
FIG. 28 is a view illustrating another example of the decorative component according to the eighth embodiment under the state in which the attachable/detachable portion is attached.

FIG. 27 is a view illustrating an example of a decorative component 7c according to an eighth embodiment under the state in which the attachable/detachable portion 121 is detached from the base portion 130. FIG. 28 is a view illustrating another example of the decorative component 7c according to the eighth embodiment under the state in which the attachable/detachable portion 121 is attached to the base portion 130. FIG. 25 and FIG. 26 are each a view corresponding to the cross-sectional view of FIG. 22 in which the mount portion 20 is not illustrated.

The decorative component 7c according to the eighth embodiment has the same configuration as that of the above-described decorative component 7b according to the seventh embodiment except that the attachable/detachable-portion body 122 of the decorative component 7b according to the seventh embodiment is replaced with a transparent cover member 141. The transparent cover member 141 is a member made, for example, of a transparent resin or glass. Under the state in which the attachable/detachable portion 121 is attached to the base portion 130, the entirety of the body-to-be-suspended (gemstone 10 and mount portion 20) is covered with the transparent cover member 141. Thus, the body-to-be-suspended (gemstone 10 and mount portion 20) is made visible, and in this state, the unnecessary external force can be prevented from being applied to the contact points O. In addition, dust or the like can be prevented from adhering to the contact points O.

Ninth Embodiment

FIG. 29A to FIG. 29C, FIG. 30A to FIG. 30F, and FIG. 31A to FIG. 31D are views illustrating examples of articles according to a ninth embodiment.

Figure 29A:
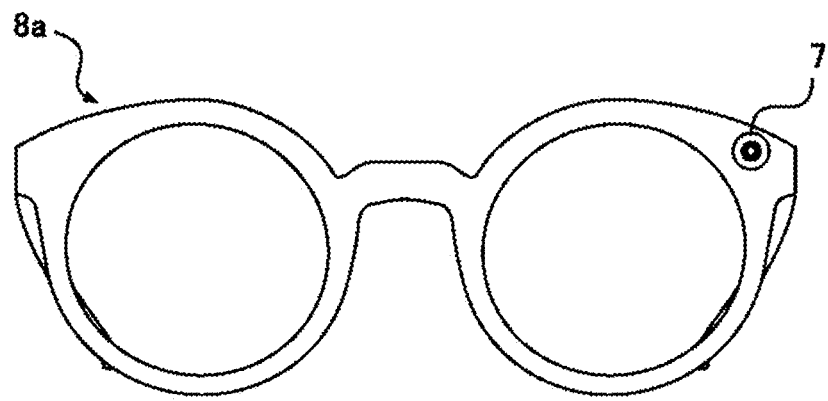
FIG. 29A is a view illustrating examples of articles according to a ninth embodiment.

FIG. 29A illustrates an example of eyeglasses 8a including the decorative component 7.

Figure 29B:
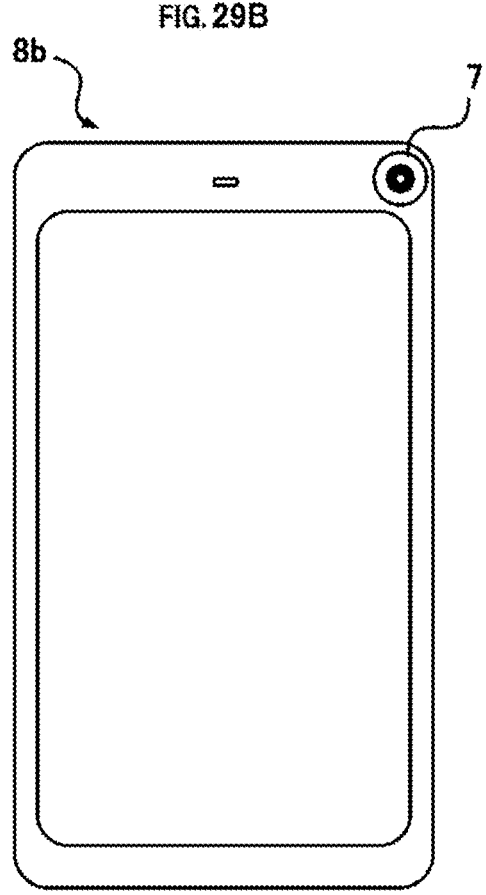
FIG. 29B is a view illustrating examples of articles according to a ninth embodiment.

FIG. 29B illustrates an example of a smartphone 8b including the decorative component 7.

Figure 29C:
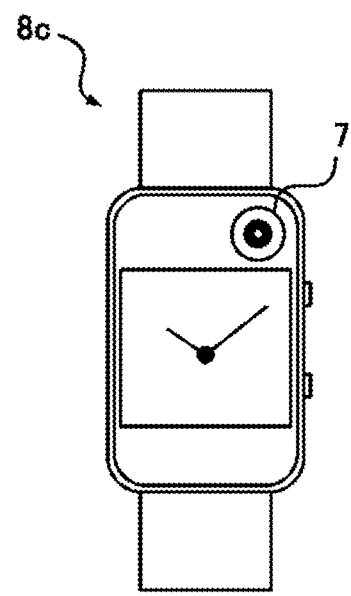
FIG. 29C is a view illustrating examples of articles according to a ninth embodiment.

FIG. 29C illustrates an example of a wristwatch 8c including the decorative component 7.

Figure 30A:
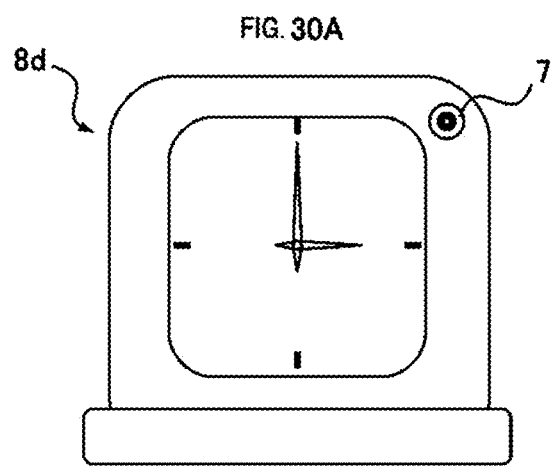
FIG. 30A is a view illustrating other examples of the articles according to the ninth embodiment.

FIG. 30A illustrates an example of a clock 8d including the decorative component 7.

Figure 30B:
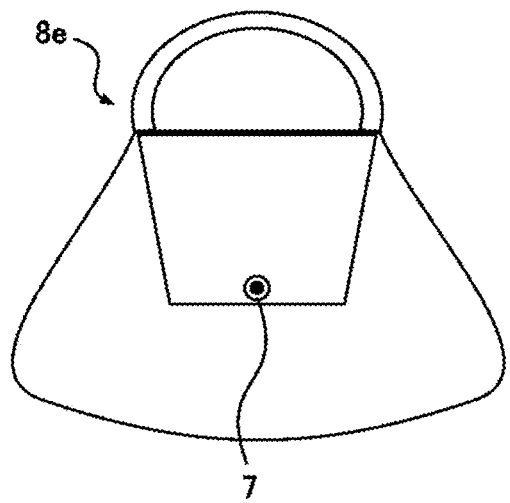
FIG. 30B is a view illustrating other examples of the articles according to the ninth embodiment.

FIG. 30B illustrates an example of a bag 8e including the decorative component 7.

Figure 30C:
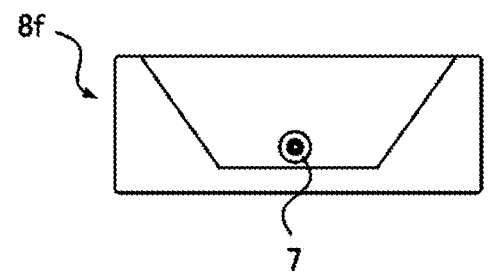
FIG. 30C is a view illustrating other examples of the articles according to the ninth embodiment.

FIG. 30C illustrates an example of a wallet 8f including the decorative component 7.

Figure 30D:
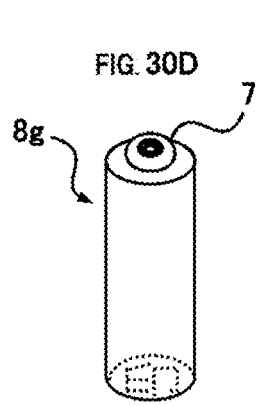
FIG. 30D is a view illustrating other examples of the articles according to the ninth embodiment.

FIG. 30D illustrates an example of a stamp 8g including the decorative component 7.

Figure 30E:
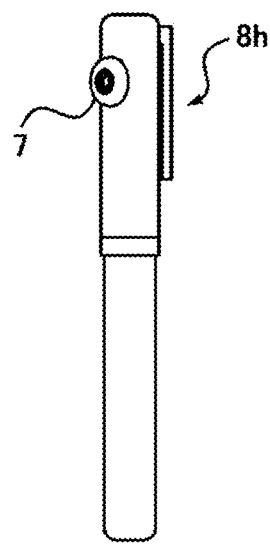
FIG. 30E is a view illustrating other examples of the articles according to the ninth embodiment.

FIG. 30E illustrates an example of stationery (pen) 8h including the decorative component 7.

Figure 30F:
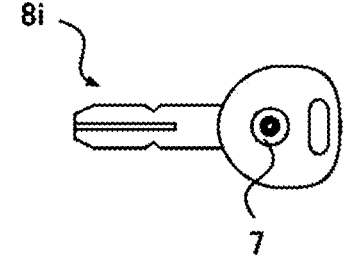
FIG. 30F is a view illustrating other examples of the articles according to the ninth embodiment.

FIG. 30F illustrates an example of a key 8i including the decorative component 7.

Figure 31A:
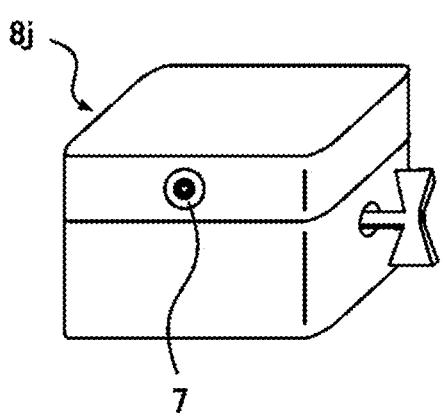
FIG. 31A is a view illustrating still other examples of the articles according to the ninth embodiment

FIG. 31A illustrates an example of a music box 8j including the decorative component 7.

Figure 31B:
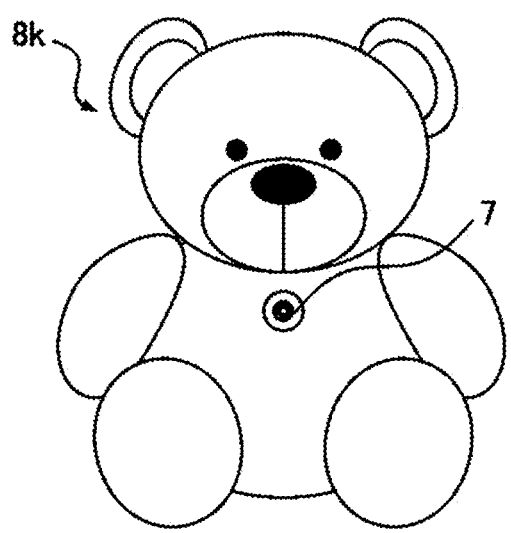
FIG. 31B is a view illustrating still other examples of the articles according to the ninth embodiment

FIG. 31B illustrates an example of a toy (doll) 8k including the decorative component 7.

Figure 31C:
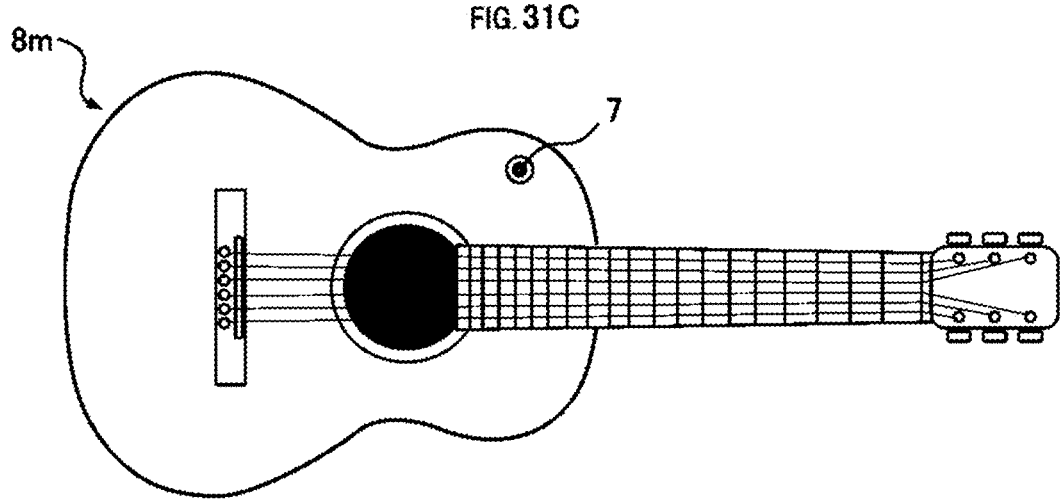
FIG. 31C is a view illustrating still other examples of the articles according to the ninth embodiment

FIG. 31C illustrates an example of a musical instrument (guitar) 8m including the decorative component 7.

Figure 31D:
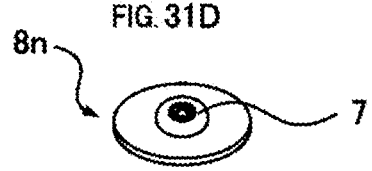
FIG. 31D is a view illustrating still other examples of the articles according to the ninth embodiment
Figure 32:
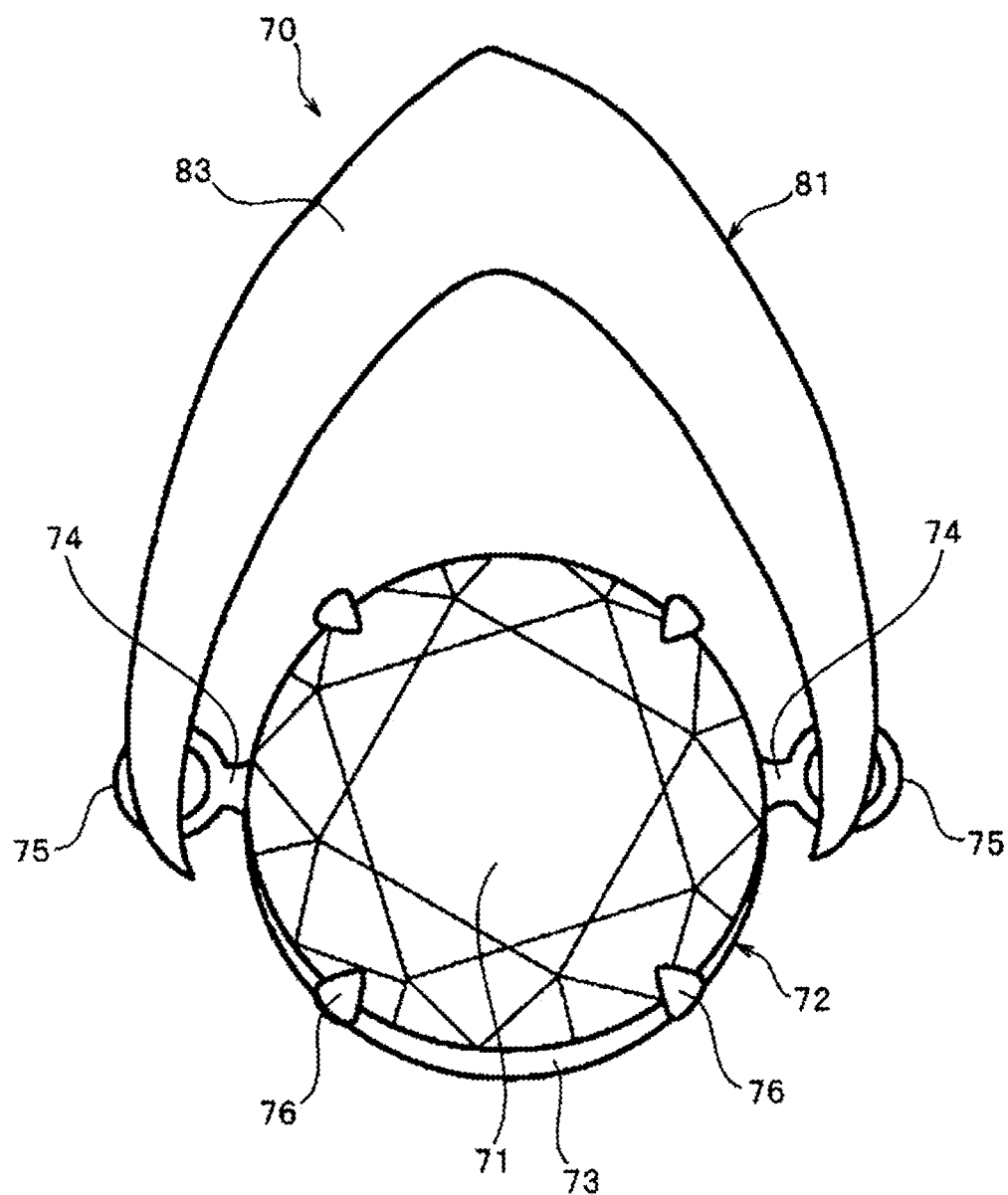
FIG. 32 is a front view of a related-art charm.
Figure 33:
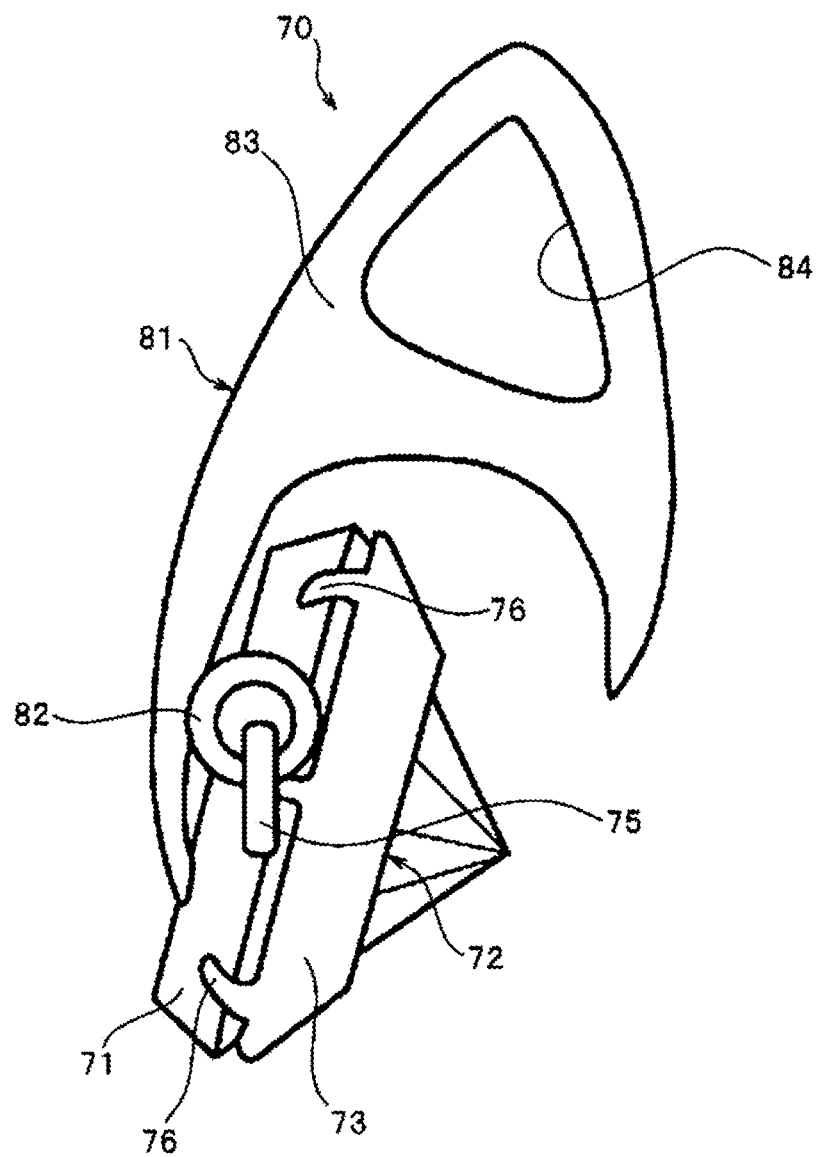
FIG. 33 is a side view of the related-art charm.

FIG. 31D illustrates an example of sports equipment (golf ball marker) 8n including the decorative component 7.

Note that, these exemplary articles are merely examples, and the decorative component according to this embodiment may be attached to various other articles.

Below, Appendices 1 to 21 that relate to the personal ornaments according to the embodiments of the present invention are disclosed. The decorative components according to the embodiments of the present invention have configurations similar to those of personal ornaments according to Appendices 1 to 21, specifically, the frame portions or the frames may be fixed to the articles.

APPENDIX 1

A personal ornament, including:
a mount portion that fixes and holds a gemstone; and
a frame portion that supports the mount portion,
the mount portion including a pair of right-and-left mount-side engaging ring portions that are arranged at positions opposite to each other across the gemstone,
the frame portion including a pair of right-and-left frame-side engaging ring portions to which the pair of right-and-left mount-side engaging ring portions are respectively coupled and engaged,
the pair of right-and-left mount-side engaging ring portions being coupled respectively to the pair of right-and-left frame-side engaging ring portions such that the mount portion and the gemstone are supported to be swingable with respect to the frame portion, the personal ornament being characterized by including
a protective member that protects, from an outside, at least
the pair of right-and-left frame-side engaging ring portions, and
coupling parts of the pair of right-and-left mount-side engaging ring portions with respect to the pair of right-and-left frame-side engaging ring portions under the state in which the pair of right-and-left mount-side engaging ring portions and the pair of right-and-left frame-side engaging ring portions are coupled to each other.

This personal ornament includes the mount portion that fixes and holds the gemstone, and the frame portion that supports the mount portion such that the mount portion is swingable. The mount portion includes the pair of right-and-left mount-side engaging ring portions which are arranged at the positions opposite to each other across the gemstone and at least a part of each of which is formed into a circular-arc shape (preferably, annular shape). The frame portion includes the pair of right-and-left frame-side engaging ring portions to which the mount-side engaging ring portions are respectively coupled and at least a part of each of which is formed into a circular-arc shape (preferably, annular shape). Note that, examples of the gemstone that is used in the personal ornament include not only natural gemstones (natural minerals) such as a diamond and a sapphire, but also synthetic gemstones (artificial gemstones) that use synthetic minerals, and imitation gemstones that use glass or the like.

Further, this personal ornament includes the protective member that surrounds and protects, from the outside, the mount-side engaging ring portions of the mount portion and the frame-side engaging ring portions of the frame portion under a state in which these mount-side engaging ring portions and frame-side engaging ring portions are coupled to each other in a manner that their respective inner rim portions are held in contact with each other.

In this case, the protective member is formed to protect, from the outside, at least the frame-side engaging ring portions and the coupling parts of the mount-side engaging ring portions with respect to the frame-side engaging ring portions. Note that, the above-described coupling parts of the mount-side engaging ring portions refer to ring parts of the mount-side engaging ring portions, to which the frame-side engaging ring portions are coupled and held in contact. These coupling parts (ring parts) include ranges (regions) in which the inner rim portions of the frame-side engaging ring portions are held in sliding contact when the gemstone is minutely swung as described below.

Further, the protective member is arranged on the outside of the mount-side engaging ring portions and the frame-side engaging ring portions in the coupled state and out of a swingable range of the mount portion so as to protect these ring portions without interfering with the mount portion to swing. Specifically, the protective member is arranged to protect at least a front side, a rear side, an upper surface side, a lower surface side, and an outer-lateral-surface side in a width direction of each of the above-described coupling parts of the frame-side engaging ring portions and the mount-side engaging ring portions. In this case, the protective member may protect the mount-side engaging ring portions and the frame-side engaging ring portions only by the protective member itself. Alternatively, the protective member and a part of the frame portion that is formed separately from the protective member may protect the mount-side engaging ring portions and the frame-side engaging ring portions.

When a personal ornament includes such a protective member, the mount portion is stably supported to be swingable with respect to the frame portion through intermediation of the mount-side engaging ring portions and the frame-side engaging ring portions. Further, at least the above-described coupling parts of the mount-side engaging ring portions and the frame-side engaging rings are covered with the protective member so as not to be exposed to the outside. In this way, with a simple structure, coupling structure parts at which the mount-side engaging ring portions and the frame-side engaging ring portions are coupled to each other such that the gemstone can minutely swing can be prevented from receiving unexpected external force, for example, by direct collision against other objects.

Thus, during normal use of the personal ornament, the above-described coupling structure parts of the mount-side engaging ring portions and the frame-side engaging ring portions can be advantageously prevented from being damaged and deformed. Thus, shapes of these parts can be stably maintained. As a result, problems due to the deformation of the mount-side engaging ring portions and the frame-side engaging ring portions, such as a problem that the minute swinging movement of the gemstone cannot be performed any longer, and a problem that the mount portion is disengaged from the frame portion, can be prevented. With this, a state in which the mount portion and the gemstone are minutely and smoothly swingable can be stably maintained for a long duration.

Further, by protecting the mount-side engaging ring portions and the frame-side engaging ring portions with the protective member, hair strands, threads, and the like can be prevented from being entangled in the mount-side engaging ring portions and the frame-side engaging ring portions. With this, handling properties of the personal ornament can be increased, and the swinging movement of the mount portion and the gemstone can be prevented from being hindered by the entanglement of the threads and the like.

Still further, the mount-side engaging ring portions and the frame-side engaging ring portions can be covered with the protective member so as not to be visible or difficult to view from the outside. Thus, restriction on design of the personal ornament is relaxed, and hence a degree of freedom in design can be increased. With this, variations in design can be easily increased.

APPENDIX 2

The personal ornament according to Appendix 1, in which
  entireties of the pair of right-and-left frame-side engaging ring portions, and
  entireties of the pair of right-and-left mount-side engaging ring portions are protected by the protective member.

In this personal ornament, at least a front side, a rear side, an upper surface side, a lower surface side, and an outer-lateral-surface side in the width direction of each of the entireties of the mount-side engaging ring portions, and at least a front side, a rear side, an upper surface side, a lower surface side, and an outer-lateral-surface side in the width direction of each of the entireties of the frame-side engaging ring portions in the coupled state can be stably protected by being covered with the protective member so as not to be exposed to the outside. Thus, the mount-side engaging ring portions and the frame-side engaging ring portions in the coupled state can be reliably prevented from receiving the unexpected external force, for example, by the direct collision against other objects. In addition, the state in which the mount portion and the gemstone are minutely swingable can be more stably maintained for a long duration.

APPENDIX 3

The personal ornament according to Appendix 1, in which
  at least parts out of the coupling parts of the pair of right-and-left mount-side engaging ring portions are exposed.

In this way, it is also possible to protect the frame-side engaging ring portions and the mount-side engaging ring portions with the protective member with at least the parts out of the coupling parts of the mount-side engaging ring portions being exposed. Also with this, the state in which the mount portion and the gemstone are minutely swingable can be stably maintained for a long duration.

APPENDIX 4

The personal ornament according to any one of Appendices 1 to 3, in which
  the protective member includes:
  a front part that protects
    fronts of the pair of right-and-left mount-side engaging ring portions, and
    fronts of the pair of right-and-left frame-side engaging ring portions; and
  a rear part that protects
    rears of the pair of right-and-left mount-side engaging ring portions, and rears of the pair of right-and-left frame-side engaging ring portions, the rear part being fixed to the front part.

In this personal ornament, the protective member includes the front part (first part) that is arranged on the front sides of the mount-side engaging ring portions and the front sides of the frame-side engaging ring portions, and that protects these ring portions, and the rear part (second part) that is arranged on the rear sides of the mount-side engaging ring portions and the rear sides of the frame-side engaging ring portions, that protects these ring portions, and that is fixed to the front part.

By using the protective member including such a front part and a rear part, the protective member can be formed with a simple structure. Further, the right-and-left mount-side engaging ring portions provided to the mount portion are coupled respectively to the right-and-left frame-side engaging ring portions arranged in the frame portion, and then the front part and the rear part are fixed to each other such that these ring portions are protected. In this way, the protective member can be formed. With this, personal ornaments in which the mount portion and the gemstone are arranged to be swingable, and in which the mount-side engaging ring portions and the frame-side engaging ring portions are protected by the protective member can be easily and stably manufactured.

APPENDIX 5

The personal ornament according to Appendix 4, in which the front part and the rear part have front-back symmetrical shapes.

In this personal ornament, since the front part and the rear part have the front-back symmetrical shapes, parts (components) having the same shape and made of the same material can be used as the front part and the rear part. With this, the front part and the rear part of the protective member can be prepared at low cost. In addition, at a time when the protective member is attached (assembled) to the personal ornament, the front part and the rear part are not confused with each other. Thus, the operation of attaching the protective member can be prevented from being complicated, and hence the attachment operation can be efficiently performed. Note that, parts having shapes completely different from each other, or parts made of materials completely different from each other may be used as the front part and the rear part.

APPENDIX 6

The personal ornament according to any one of Appendices 1 to 5, in which the protective member has a single integral shape that protects, at once,
  one of the pair of right-and-left mount-side engaging ring portions and one of the pair of right-and-left frame-side engaging ring portions, the ones being coupled to each other, and
  another one of the pair of right-and-left mount-side engaging ring portions and another one of the pair of right-and-left frame-side engaging ring portions, the other ones being coupled to each other.

In this personal ornament, the protective member is formed to have the single integral shape that protects, at once, the pair of mount-side engaging ring portions and the pair of frame-side engaging ring portions arranged on the right and left, specifically, the one of the mount-side engaging ring portions and the one of the frame-side engaging ring portions, the ones being coupled to each other, and the other one of the mount-side engaging ring portions and the other one of the frame-side engaging ring portions, the other ones being coupled to each other. In this way, the protective member can be formed with a simple structure. Further, the protective member can be easily and stably attached on the outside of the right-and-left mount-side engaging ring portions and the right-and-left frame-side engaging ring portions. With this, the mount-side engaging ring portions and the frame-side engaging ring portions can be stably protected.

APPENDIX 7

The personal ornament according to any one of Appendices 1 to 6, in which the protective member forms at least a part of the frame portion, and the pair of right-and-left frame-side engaging ring portions are fixed to an inner surface of the protective member.

In this personal ornament, the protective member is formed to serve as at least the part of the frame portion, specifically, to serve as a frame body portion of the frame portion. In this case, the frame-side engaging ring portions are fixed to the inner surface of the protective member. With this, the frame portion can be formed with a simple structure, and the mount-side engaging ring portions and the frame-side engaging ring portions in the coupled state can be reliably protected by the protective member to serve as the frame portion. Note that, the protective member need not necessarily be formed as the part of the frame portion, and the frame portion may be formed separately from the protective member as a member including the frame body portion and the frame-side engaging ring portions.

APPENDIX 8

The personal ornament according to any one of Appendices 1 to 7, in which the protective member has a hollow shape.

In this personal ornament, the protective member has the hollow shape. With this, the mount-side engaging ring portions and the frame-side engaging ring portions in the coupled state can be protected by being stably housed in the protective member. Further, the hollow protective member can be stably formed, for example, by performing press working or the like on a thin metal sheet, and material cost thereof can be reduced to be lower, for example, than that of a solid protective member.

APPENDIX 9

A personal ornament, including:
  a mount portion that fixes and holds a gemstone; and
  a frame portion that supports the mount portion,
  the mount portion including a pair of right-and-left mount-side engaging ring portions that are arranged at positions opposite to each other across the gemstone,
  the frame portion including a pair of right-and-left frame-side engaging ring portions to which the pair of right-and-left mount-side engaging ring portions are respectively coupled and engaged,
  the pair of right-and-left mount-side engaging ring portions being coupled respectively to the pair of right-and-left frame-side engaging ring portions such that the mount portion and the gemstone are supported to be swingable with respect to the frame portion, the personal ornament being characterized in that the frame portion includes a housing compartment that houses therein and protects, from an outside, at least the pair of right-and-left frame-side engaging ring portions, and coupling parts of the pair of right-and-left mount-side engaging ring portions with respect to the pair of right-and-left frame-side engaging ring portions under the state in which the pair of right-and-left mount-side engaging ring portions and the pair of right-and-left frame-side engaging ring portions are coupled to each other.

This personal ornament includes the mount portion that fixes and holds the gemstone, and the frame portion that supports the mount portion such that the mount portion is swingable. The mount portion includes the pair of right-and-left mount-side engaging ring portions which are arranged at the positions opposite to each other across the gemstone and at least a part of each of which is formed into a circular-arc shape (preferably, annular shape). The frame portion includes the pair of right-and-left frame-side engaging ring portions to which the mount-side engaging ring portions are respectively coupled and at least a part of each of which is formed into a circular-arc shape (preferably, annular shape).

The frame portion includes the housing compartment that houses therein and protects, from the outside, at least the frame-side engaging ring portions, and the coupling parts of the mount-side engaging ring portions with respect to the frame-side engaging ring portions under the state in which the mount-side engaging ring portions of the mount portion and the frame-side engaging ring portions of the frame portion are coupled to each other in the manner that their respective inner rim portions are held in contact with each other. In this case, the frame portion including the housing compartment is arranged on the outside of the mount-side engaging ring portions and the frame-side engaging ring portions in the coupled state and out of the swingable range of the mount portion so as to protect these ring portions without interfering with the mount portion to swing.

When the frame portion of a personal ornament includes such a housing compartment, the mount portion is stably supported to be swingable with respect to the frame portion through intermediation of the mount-side engaging ring portions and the frame-side engaging ring portions. Further, at least the above-described coupling parts of the mount-side engaging ring portions and the frame-side engaging ring portions are protected by being housed in the housing compartment of the frame portion so as not to be exposed to the outside. In this way, with a simple structure, the coupling structure parts at which the mount-side engaging ring portions and the frame-side engaging ring portions are coupled to each other such that the gemstone can minutely swing can be prevented from receiving the unexpected external force, for example, by the direct collision against other objects.

Thus, during normal use of the personal ornament, the above-described coupling structure parts of the mount-side engaging ring portions and the frame-side engaging ring portions can be advantageously prevented from being damaged and deformed. Thus, the shapes of these parts can be stably maintained. As a result, the problems due to the deformation of the mount-side engaging ring portions and the frame-side engaging ring portions, such as the problem that the minute swinging movement of the gemstone cannot be performed any longer, and the problem that the mount portion is disengaged from the frame portion, can be prevented. With this, the state in which the mount portion and the gemstone are minutely and smoothly swingable can be stably maintained for a long duration.

Further, when the mount-side engaging ring portions and the frame-side engaging ring portions are protected by being housed in the housing compartment of the frame portion, hair strands, threads, and the like can be prevented from being entangled in the mount-side engaging ring portions and the frame-side engaging ring portions. With this, the handling properties of the personal ornament can be increased, and the swinging movement of the mount portion and the gemstone can be prevented from being hindered by the entanglement of the threads and the like.

Still further, the mount-side engaging ring portions and the frame-side engaging ring portions can be hidden by being held in the housing compartment of the frame portion so as not to be visible or difficult to view from the outside. Thus, the restriction on the design of the personal ornament is relaxed, and hence the degree of freedom in design can be increased. With this, the variations in design can be easily increased.

APPENDIX 10

The personal ornament according to Appendix 9, in which
entireties of the pair of right-and-left frame-side engaging ring portions, and
entireties of the pair of right-and-left mount-side engaging ring portions are housed in the housing compartment.

In this personal ornament, the entireties of the frame-side engaging ring portions, and the entireties of the mount-side engaging ring portions are housed in the housing compartment of the frame portion. With this, the entireties of the frame-side engaging ring portions, and the entireties of the mount-side engaging ring portions are protected by the frame portion. In this way, at least a front side, a rear side, an upper surface side, a lower surface side, and an outer-lateral-surface side in the width direction of each of the entireties of the mount-side engaging ring portions, and at least a front side, a rear side, an upper surface side, a lower surface side, and an outer-lateral-surface side in the width direction of each of the entireties of the frame-side engaging ring portions in the coupled state can be stably protected so as not to be exposed to the outside. Thus, the mount-side engaging ring portions and the frame-side engaging ring portions in the coupled state can be reliably prevented from receiving the unexpected external force, for example, by the direct collision against other objects. In addition, the state in which the mount portion and the gemstone are minutely swingable can be more stably maintained for a long duration.

APPENDIX 11

The personal ornament according to Appendix 9, in which
at least parts out of the coupling parts of the pair of right-and-left mount-side engaging ring portions are exposed.

In this way, it is also possible to house the frame-side engaging ring portions and the mount-side engaging ring portions within the housing compartment of the frame portion with at least the parts out of the coupling parts of the mount-side engaging ring portions being exposed. Also with this, the state in which the mount portion and the gemstone are minutely swingable can be stably maintained for a long duration.

APPENDIX 12

The personal ornament according to any one of Appendices 9 to 11, in which
a frame body portion of the frame portion includes:
a front part that protects
fronts of the pair of right-and-left mount-side engaging ring portions, and
fronts of the pair of right-and-left frame-side engaging ring portions; and
a rear part that protects
rears of the pair of right-and-left mount-side engaging ring portions, and
rears of the pair of right-and-left frame-side engaging ring portions, the rear part being fixed to the front part,
the front part and the rear part have front-back symmetrical shapes, and
the frame body portion has a hollow shape that forms the housing compartment.

When the frame body portion of the frame portion includes the front part and the rear part in this way, the right-and-left mount-side engaging ring portions are coupled respectively to the right-and-left frame-side engaging ring portions, and then the front part and the rear part are fixed to each other such that these ring portions are protected. In this way, the frame body portion can be formed. Thus, the mount-side engaging ring portions and the frame-side engaging ring portions can be stably protected with a simple structure. Further, the hollow frame-body portion can be stably formed, for example, by performing the press working or the like on a thin metal sheet, and material cost thereof can be reduced to be lower, for example, than that of a solid frame-body portion.

APPENDIX 13

The personal ornament according to any one of Appendices 1 to 12, in which
the frame portion includes an insertion opening portion that allows a part of the mount portion to be inserted therethrough, and
the insertion opening portion
allows the mount portion and the gemstone to swing, and
has a size that restricts a swing range of the mount portion and the gemstone.

With this configuration, the state in which the mount portion and the gemstone are minutely and smoothly swingable can be stably maintained. Further, since the swing range of the mount portion and the gemstone is restricted by the frame portion, the gemstone can be properly swung in a range in which the gemstone looks beautifully sparkly as viewed from the front. With this, a decorative effect by the swing can be more advantageously obtained.

APPENDIX 14

The personal ornament according to any one of Appendices 1 to 13, in which,
in a front view of the personal ornament, the frame portion has a shape which surrounds an outer periphery of the gemstone held by the mount portion, and in which a gap is formed between the frame portion and the gemstone.

With this configuration, a periphery of the mount portion and the periphery of the gemstone can be protected overall by the frame portion (protective member). Further, with respect to the frame portion arranged in vicinities of the outer peripheries of the mount portion and the gemstone, the gemstone looks floating in the air, and the mount portion and the gemstone minutely swing. With this, the swing of the gemstone is likely to be emphasized. As a result, brilliance of the gemstone held by the mount portion can look more beautiful, and hence the decorative effect and a high-quality appearance of the personal ornament can be more advantageously enhanced. Further, the personal ornament can have an unprecedented brand-new image (sense of beauty). In addition, since the frame portion is arranged around the mount portion and the gemstone, at the time when the mount portion and the gemstone swing, the mount portion and the gemstone can be prevented from coming into contact with clothes or the like of a user. With this, the swing of the mount portion and the gemstone can be restrained from being interrupted by the contact with the clothes or the like.

APPENDIX 15

The personal ornament according to any one of Appendices 1 to 14, in which,
in a side view of the personal ornament, in a front-and-back direction of the personal ornament, a back-side end surface of the frame portion is arranged at a position further on a back side with respect to a position of a back-surface-side distal end portion of the swingable gemstone.

With this configuration, under a state in which the personal ornament is suspended by gravity, or during normal use of the personal ornament, when the personal ornament is viewed from its lateral surface side, in the front-and-back direction of the personal ornament, the back-side end surface of the frame portion is arranged at the position further on the back side with respect to the position of the back-surface-side distal end portion of the swingable gemstone. With this, at a time when the personal ornament is worn, the gemstone (specifically, back-surface-side distal end portion of the gemstone) can be prevented from coming into direct contact with the close or the like. Thus, the swing of the mount portion and the gemstone can be more advantageously restrained from being interrupted by the contact with the clothes or the like. In this way, the swing of the mount portion and the gemstone can be naturally continued for a long duration.

APPENDIX 16

A personal ornament, including:
a frame;
a body-to-be-suspended including two first ring portions; and
a suspending portion provided to the frame and including two second ring portions,
one of the two first ring portions and one of the two second ring portions being coupled to each other and held in contact with each other at one of two contact points,
another one of the two first ring portions and another one of the two second ring portions being coupled to each other and held in contact with each other at another one of the two contact points,
the suspending portion suspending the body-to-be-suspended such that the body-to-be-suspended is swingable about an imaginary swing axis,
the body-to-be-suspended and the suspending portion being held in contact with each other at the two contact points located on the imaginary swing axis,
predetermined two planes that are located between the two contact points and that are perpendicular to the imaginary swing axis dividing three ranges including two ranges which respectively include one of the two contact points and the other one of the two contact points and which are respectively defined as outer ranges, the frame covering at least an entirety of a periphery of the one of the two contact points as viewed from one of the outer ranges, the one of the two contact points being included in the one of the outer ranges, and covering at least an entirety of a periphery of the other one of the two contact points as viewed from another one of the outer ranges, the other one of the two contact points being included in the other one of the outer ranges.

In this personal ornament, the body-to-be-suspended suspended from the suspending portion enters the state of being swingable about the imaginary swing axis. In this swingable state, the body-to-be-suspended and the suspending portion are held in contact with each other at the two contact points located on the swing axis. In other words, the body-to-be-suspended enters the state of being swingable about the swing axis that extends through the contact point of the one of the first ring portions and the one of the second ring portions coupled to each other, and through the contact point of the other one of the first ring portions and the other one of the second ring portions coupled to each other. On the premise that the two predetermined planes are located between the two contact points and are perpendicular to the swing axis, of the three ranges divided by these two planes, the two ranges each including corresponding one of the contact points are defined as the outer ranges, respectively. The contact points included respectively in these two outer ranges are different from each other. In the one of the outer ranges, which includes the one of the contact points, the frame covers the periphery of the one of the contact points. With this, the one of the contact points is protected from an object that approaches from the one of the outer ranges. Thus, unnecessary external force is prevented from being applied to the one of the contact points. Further, in the other one of the outer ranges, which includes the other one of the contact points, the frame covers the periphery of the other one of the contact points. With this, the other one of the contact points is protected from an object that approaches from the other one of the outer ranges. Thus, the unnecessary external force is prevented from being applied to the other one of the contact points.

APPENDIX 17

The personal ornament according to Appendix 16, in which, when one of directions perpendicular to the imaginary swing axis is defined as an upper-and-lower direction, when a direction parallel to the imaginary swing axis is defined as a lateral direction, and when a direction perpendicular to the upper-and-lower direction and the lateral direction is defined as a front-and-rear direction, the body-to-be-suspended is visible at least from a front side in the front-and-rear direction, and the frame covers an entirety of the body-to-be-suspended from a left-hand side and a right-hand side in the lateral direction.

With this, the body-to-be-suspended is visible at least from the front side in the front-and-rear direction, and at the same time, the body-to-be-suspended is protected from objects that approach from the left-hand side and the right-hand side in the lateral direction. Thus, the unnecessary external force is prevented from being applied to the body-to-be-suspended itself, and to the two contact points of the body-to-be-suspended and the suspending portion.

APPENDIX 18

The personal ornament according to Appendix 17, in which the frame covers the entirety of the body-to-be-suspended from an upper side and a lower side in the upper-and-lower direction.

With this, the body-to-be-suspended is protected from objects that approach from the upper side and the lower side in the upper-and-lower direction. Thus, the unnecessary external force is prevented from being applied to the body-to-be-suspended itself, and to the two contact points of the body-to-be-suspended and the suspending portion.

APPENDIX 19

The personal ornament according to any one of Appendices 16 to 18, in which, in arbitrary planes that include the two second ring portions and that are perpendicular to the imaginary swing axis, the frame covers entireties of peripheries of the two second ring portions.

With this, the second ring portions are protected from objects that approach in directions perpendicular to the swing axis. Thus, the unnecessary external force is prevented from being applied to the second ring portions.

APPENDIX 20

The personal ornament according to any one of Appendices 16 to 19, in which, in arbitrary planes that include the two first ring portions and that are perpendicular to the imaginary swing axis, the frame covers entireties of peripheries of the two first ring portions.

With this, the first ring portions are protected from the objects that approach in directions perpendicular to the swing axis. Thus, the unnecessary external force is prevented from being applied to the first ring portions themselves, and to the contact points of the first ring portions and the second ring portions.

The invention claimed is:

1. A decorative component that decorates an external appearance of an article, the decorative component comprising:
    a frame fixed to the article;
    a body-to-be-suspended including two first ring portions; and
    a suspending portion provided to the frame and including two second ring portions,
    one of the two first ring portions and one of the two second ring portions being coupled to each other and held in contact with each other at one of two contact points,
    another one of the two first ring portions and another one of the two second ring portions being coupled to each other and held in contact with each other at another one of the two contact points,
    the suspending portion suspending the body-to-be-suspended such that the body-to-be-suspended is swingable about an imaginary swing axis, the body-to-be-suspended and the suspending portion being held in contact with each other at the two contact points located on the imaginary swing axis,
predetermined two planes that are located between the two contact points and that are perpendicular to the imaginary swing axis dividing three ranges including two ranges which respectively include one of the two contact points and the other one of the two contact points and which are respectively defined as outer ranges,
the frame
  covering one of the two contact points as viewed from one of the outer ranges, the one of the two contact points being included in the one of the outer ranges, the one of the two contact points being not covered with the article, and
  covering the other one of the two contact points as viewed from another one of the outer ranges, the other one of the two contact points being included in the other one of the outer ranges, the other one of the two contact points being not covered with the article;
wherein an attachable/detachable portion of the frame includes
  an attachable/detachable-portion body that overall has a shape formed by bisecting a doughnut-shaped hollow body along a plane parallel to a radial direction, and
  a ring-shaped first coupling portion fixed to a rim of a cut surface of the plane of the attachable/detachable-portion body,
a base portion of the frame includes
  a recess portion recessed in a columnar shape, and
  a ring-shaped second coupling portion formed along a rim of an opening portion of the recess portion,
the attachable/detachable-portion body includes an opening portion that allows a part of the body-to-be-suspended to be exposed to an outside; and
wherein, when one of directions perpendicular to the imaginary swing axis is defined as an upper-and-lower direction,
when a direction parallel to the imaginary swing axis is defined as a lateral direction, and
when a direction perpendicular to the upper-and-lower direction and the lateral direction is defined as a front-and-rear direction,
  the opening portion allows the part of the body-to-be-suspended to be exposed forward, and
  a rim of the opening portion that allows the part of the body-to-be-suspended to be exposed forward protrudes backward on the inner surface side of the frame that covers the two contact points.

2. The decorative component according to claim 1, wherein,
  when one of a direction perpendicular to the imaginary swing axis is defined as an upper-and-lower direction,
  when a direction parallel to the imaginary swing axis is defined as a lateral direction, and
  when a direction perpendicular to the upper-and-lower direction and the lateral direction is defined as a front-and-rear direction,
    the body-to-be-suspended is visible at least from a front side in the front-and-rear direction, and
    the frame covers an entirety of the body-to-be-suspended from a left-hand side and a right-hand side in the lateral direction.

3. The decorative component according to claim 2, wherein
  the frame covers the entirety of the body-to-be-suspended from an upper side and a lower side in the upper-and-lower direction.

4. The decorative component according to claim 1, wherein the frame covers parts of peripheries of the two second ring portions, the parts being not covered with the article.

5. The decorative component according to of claim 1, wherein the frame covers parts of peripheries of the two first ring portions, the parts being not covered with the article.

6. The decorative component according to claim 1, wherein
  the two second ring portions are provided to an inner surface of the frame that covers the two contact points.

7. The decorative component according to claim 1, wherein
  the frame includes
    the base portion fixed to the article, and
    the attachable/detachable portion that covers the two contact points and that is fixed in an attachable/detachable manner to the base portion, and
  the suspending portion is provided to the base portion or the attachable/detachable portion.

8. The decorative component according to claim 7, wherein
  the ring-shaped first coupling portion and the ring-shaped second coupling portion are coupled to each other with a screw structure.

9. The decorative component according to claim 1, wherein
  the frame includes an opening portion that allows a part of the body-to-be-suspended to be exposed to an outside.

10. The decorative component according to claim 1, wherein
  the frame includes at least a transparent part, and
  at least the part of the body-to-be-suspended is visible through the transparent part of the frame.

11. The article comprising the decorative component according to claim 1.

12. The article according to claim 11, wherein
  the article is
    eyeglasses,
    a wristwatch,
    a clock,
    a stamp,
    a bag,
    a wallet,
    stationery,
    a key,
    a smartphone,
    a music box,
    a toy,
    a musical instrument, or
    sports equipment.

* * * * *